(12) United States Patent
Sugita et al.

(10) Patent No.: US 10,985,642 B2
(45) Date of Patent: Apr. 20, 2021

(54) POWER TRANSMISSION DEVICE

(71) Applicant: SANYO DENKI CO., LTD., Tokyo (JP)

(72) Inventors: Satoshi Sugita, Tokyo (JP); Yuqi Tang, Tokyo (JP); Yasushi Misawa, Tokyo (JP); Shigenori Miyairi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 522 days.

(21) Appl. No.: 15/705,747

(22) Filed: Sep. 15, 2017

(65) Prior Publication Data

US 2018/0006544 A1    Jan. 4, 2018

Related U.S. Application Data

(62) Division of application No. 14/171,862, filed on Feb. 4, 2014, now abandoned.

(30) Foreign Application Priority Data

Feb. 5, 2013    (JP) .............................. JP2013-020641

(51) Int. Cl.
*H02K 49/10*    (2006.01)
*H02K 16/00*    (2006.01)
(Continued)

(52) U.S. Cl.
CPC ............. *H02K 49/102* (2013.01); *F03D 9/25* (2016.05); *F03D 15/00* (2016.05); *F04D 29/05* (2013.01); *H02K 16/005* (2013.01); *Y02E 10/72* (2013.01)

(58) Field of Classification Search
CPC ...... H02K 16/005; H02K 16/02; H02K 49/10; H02K 49/102; H02K 49/104; H02K 23/60; F04D 29/05; F16H 49/005
(Continued)

(56) References Cited

U.S. PATENT DOCUMENTS

2008/0030091 A1*    2/2008    Unseld ................. H02K 49/065
                                                              310/106
2011/0037333 A1    2/2011    Atallah et al.
(Continued)

FOREIGN PATENT DOCUMENTS

CN    201918876 U    8/2011
CN    102324821 A *    1/2012
(Continued)

OTHER PUBLICATIONS

CN-102324821-A (English Translation) (Year: 2012).*
(Continued)

*Primary Examiner* — Quyen P Leung
*Assistant Examiner* — Alexander Moraza
(74) *Attorney, Agent, or Firm* — Polsinelli PC

(57) ABSTRACT

A power transmission device includes: a high speed magnet rotor which includes a magnet array which is magnetized in a radial direction; a low speed magnet rotor which includes a magnet array which is magnetized in a circumferential direction; and an inductor rotor which allows magnetic fluxes from the magnet array of the high speed magnet rotor to pass, and the high speed magnet rotor, the low speed magnet rotor and the inductor rotor are concentrically arranged and the magnet array of the low speed magnet rotor is formed such that homopolar surfaces of neighboring magnets face each other in the circumferential direction.

10 Claims, 28 Drawing Sheets

(51) Int. Cl.
*F03D 9/25* (2016.01)
*F03D 15/00* (2016.01)
*F04D 29/05* (2006.01)

(58) Field of Classification Search
USPC ......... 310/103–123, 156, 92, 99; 290/44, 55
See application file for complete search history.

(56) References Cited

U.S. PATENT DOCUMENTS

| | | |
|---|---|---|
| 2011/0057456 A1 | 3/2011 | Atallah et al. |
| 2012/0074930 A1 | 3/2012 | Sugita et al. |
| 2013/0113317 A1* | 5/2013 | Englert ............... H02K 49/106 310/103 |
| 2013/0320795 A1 | 12/2013 | Enomoto et al. |
| 2014/0049124 A1* | 2/2014 | Gandhi ................. H02K 15/03 310/46 |
| 2014/0167546 A1 | 6/2014 | Sutani et al. |
| 2014/0210291 A1* | 7/2014 | Bird .................... H02K 49/102 310/103 |
| 2015/0061649 A1 | 3/2015 | Sugita et al. |

FOREIGN PATENT DOCUMENTS

| | | |
|---|---|---|
| CN | 102324821 A | 1/2012 |
| JP | 2012-075291 A | 4/2012 |
| JP | 2012-163186 A | 8/2012 |
| WO | 2012/114368 A1 | 8/2012 |
| WO | 2013/011809 A1 | 1/2013 |

OTHER PUBLICATIONS

Li, Xianglin et al. An Improved Coaxial Magnetic Gear Using Flux Focusing, 2011.
Toliyat, Hamdi A. et al. Handbook of Electric Motors, Second Edition, 2004, pp. 308, 372.
Communication dated Apr. 19, 2017 issued in the corresponding European Patent Application No. 14152942.0.
Office Action dated Sep. 6, 2016 from Japanese Patent Application No. 2013-020641, pp. 1-6.

* cited by examiner

POWER TRANSMISSION DEVICE

CROSS-REFERENCE TO RELATED APPLICATION

This application is a divisional of U.S. patent application Ser. No. 14/171,862 entitled POWER TRANSMISSION DEVICE and filed on Feb. 4, 2014, which claims priority to Japanese Application No. 2013-020641, filed Feb. 5, 2013, the entireties of which are incorporated herein by reference.

BACKGROUND

1. Technical Field

The present invention relates to a power transmission device which uses magnetism.

2. Description of Related Arts

In the past, a power transmission device which is generally used uses a mechanical gear mechanism whose gears of a drive shaft and a driven shaft enmesh with each other. A power transmission device which uses a gear mechanism transmits power while gears directly contact each other, and therefore causes noise and vibration and hardly has a long service life. Further, a power transmission device which uses a gear mechanism needs to be maintained on a regular basis to suppress an increase of noise and vibration due to a secular change and minimize abrasion of gears. Maintenance of a power transmission device which uses a gear mechanism is limited needs to be taken into account, and therefore the place to install the power transmission device is limited and the degree of freedom of design is restricted.

In recent years, a technique which can overcome the above various drawbacks which a power transmission device which uses a gear mechanism has as a fate and which relates to, for example, a non-contact power transmission device which uses magnetism is gaining attention.

Following US 2011/0057456 discloses a magnetic accelerating/decelerating device which has magnetic gears as a non-contact power transmission device. The magnetic accelerating/decelerating device according to US 2011/0057456 includes a high speed rotor which includes a magnet array on an inner side, includes an inductor which includes a magnetic pole array on an outer side of the high speed rotor and includes a low speed rotor which includes a magnet array on an outer side of the inductor. This magnetic accelerating/decelerating device forms, in the high speed rotor and the low speed rotor, closed magnetic fields which pass through the high speed rotor, the low speed rotor and the inductor by a magnet polarized along a rotation axis direction of the high speed rotor and the low speed rotor. The closed magnetic fields are formed along a radial direction and a circumferential direction by magnetic fluxes which pass through a portion at which three of a magnet of the high speed rotor, a magnet of the low speed rotor and a convex portion of a magnetic body of the inductor oppose to each other. This magnetic accelerating/decelerating device rotates driven shafts other than drive shafts using a restoring force of the magnetic fields produced when a balance of the closed magnetic field is lost due to rotation of the drive shaft of one of the high speed rotor, the low speed rotor and the inductor.

A restoring force of the magnetic field differs depending on a magnetic field intensity (magnetic flux density as the number of magnetic force lines per unit area). The restoring force of the magnetic field is greater when the magnetic field intensity is higher. When the restoring force of the magnetic field is greater, an allowable torque of shaft power which can be transmitted between the drive shafts and the driven shafts becomes greater. Hence, the number of magnetic force lines which form closed magnetic fields needs to be increased per unit area to generate a greater allowable torque.

SUMMARY

The magnetic accelerating/decelerating device disclosed in US 2011/0057456 is a magnetic accelerating/decelerating device of a surface magnet type, and therefore the magnetic field intensity of the closed magnetic field is determined based on the number of magnetic force lines which pass through a portion at which the magnet of the high speed rotor and the magnet of the low speed rotor oppose to each other. Although there are also magnetic force lines which pass through a portion of the magnet of the high speed rotor which does not oppose to the magnet of the low speed rotor, the magnetic force lines contribute little to the above magnetic field intensity of the closed magnetic field.

However, according to the magnetic accelerating/decelerating device disclosed in US 2011/0057456, an area in which the magnet of the high speed rotor and the magnet of the low speed rotor oppose to each other needs to be made larger to further increase the allowable torque, and therefore the magnetic accelerating/decelerating device inevitably becomes larger. Currently, miniaturization of the magnetic accelerating/decelerating device is demanded, and therefore the invention disclosed in US 2011/0057456 cannot be adopted.

In addition, when an area in which a magnet of a high speed magnet rotor and a magnet of a low speed rotor oppose to each other is increased in a small magnetic accelerating/decelerating device, a pitch between the magnets of the low speed rotor inevitably becomes longer. When the pitch becomes longer, the number of magnets of the low speed rotor which can be arranged on the same circumference decreases, and therefore the acceleration and deceleration ratio of the magnetic accelerating/decelerating device cannot be increased. Therefore, even when a higher acceleration and deceleration ratio needs to be achieved, the invention disclosed in US 2011/0057456 cannot be adopted.

In light of the above situation, a purpose of the present invention is to provide a power transmission device which is small and can achieve a greater allowable torque and a wide range of an acceleration and deceleration ratio.

A power transmission device according to the present invention which achieves the above purpose includes a high speed magnet rotor, a low speed magnet rotor and an inductor rotor.

The high speed magnet rotor includes a magnet array which is magnetized in a radial direction. The low speed magnet rotor includes a magnet array which is magnetized in a circumferential direction. The inductor rotor allows magnetic fluxes of the magnet array of the high speed magnet rotor to pass. The high speed magnet rotor, the low speed magnet rotor and the inductor rotor are concentrically arranged. The magnet array of the low speed magnet rotor is formed such that homopolar surfaces of neighboring magnets face each other in the circumferential direction.

The magnet array of the low speed magnet rotor aligns the magnetic fluxes which pass through the low speed magnet rotor. Hence, most of magnetic fluxes which pass through the low speed magnet rotor pass in an aligned state, and leakage magnetic fluxes decrease.

In the power transmission device according to the present invention, homopolar surfaces of neighboring magnets of the magnet array of the low speed magnet rotor face each other in the circumferential direction, so that most of magnetic fluxes which pass through the low speed magnet rotor pass in an aligned state and leakage magnetic fluxes decrease.

Consequently, it is possible to provide a power transmission device which is small and can achieve a greater allowable torque and a wide range of an acceleration and deceleration ratio.

DETAILED DESCRIPTION

Figure 1:
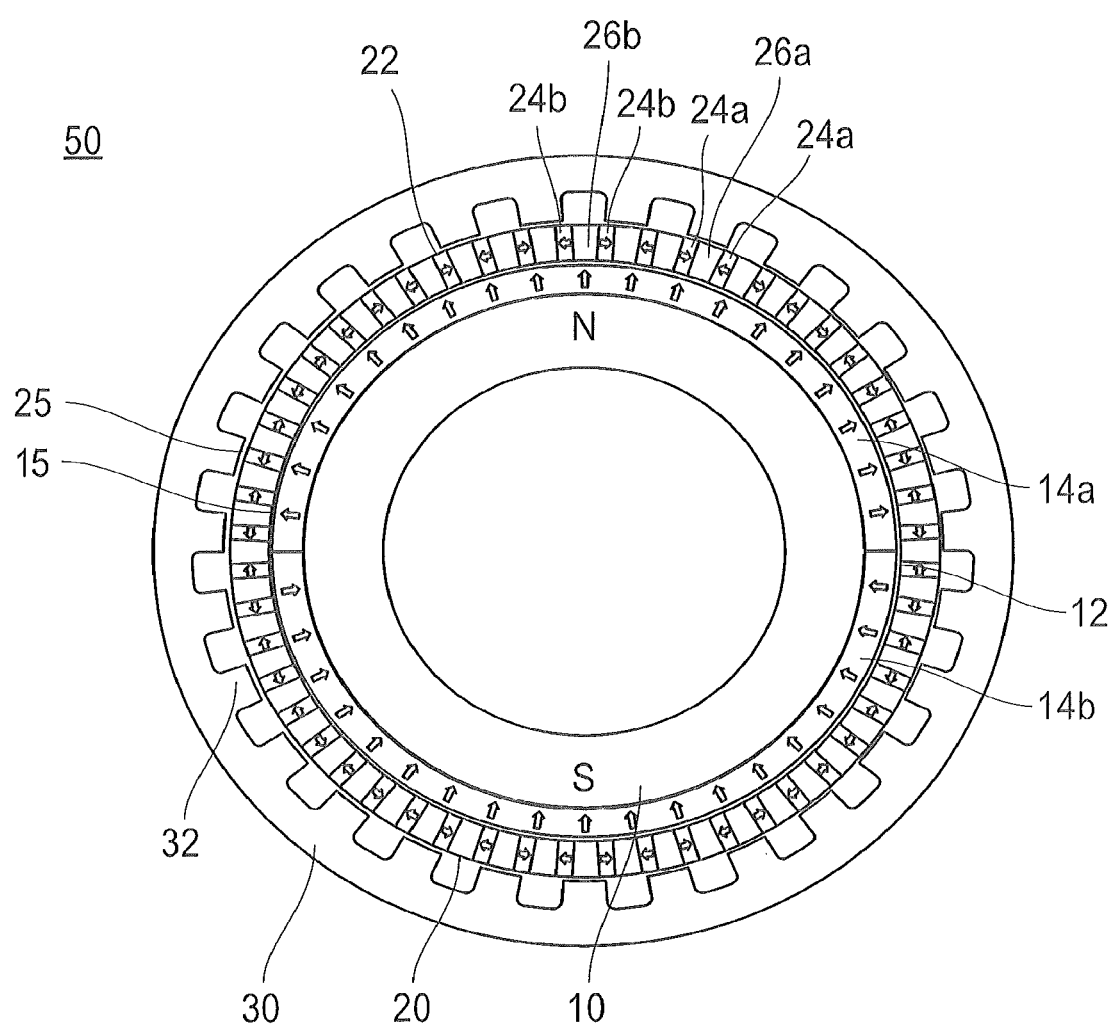
FIG. 1 is a configuration diagram of a power transmission device according to a first embodiment.

Hereinafter, a configuration and an operation of a power transmission device according to the present invention will be described in [First Embodiment] to [Eleventh Embodiment] with reference to the accompanying drawings. In addition, upon description of members illustrated in each figure, same members will be assigned the same reference numerals, and overlapped description will be omitted. Further, a dimension ratio of the members in each figure is exaggerated for the sake of description in some cases, and is different from an actual dimension ratio in some cases.

First Embodiment

Figure 2:
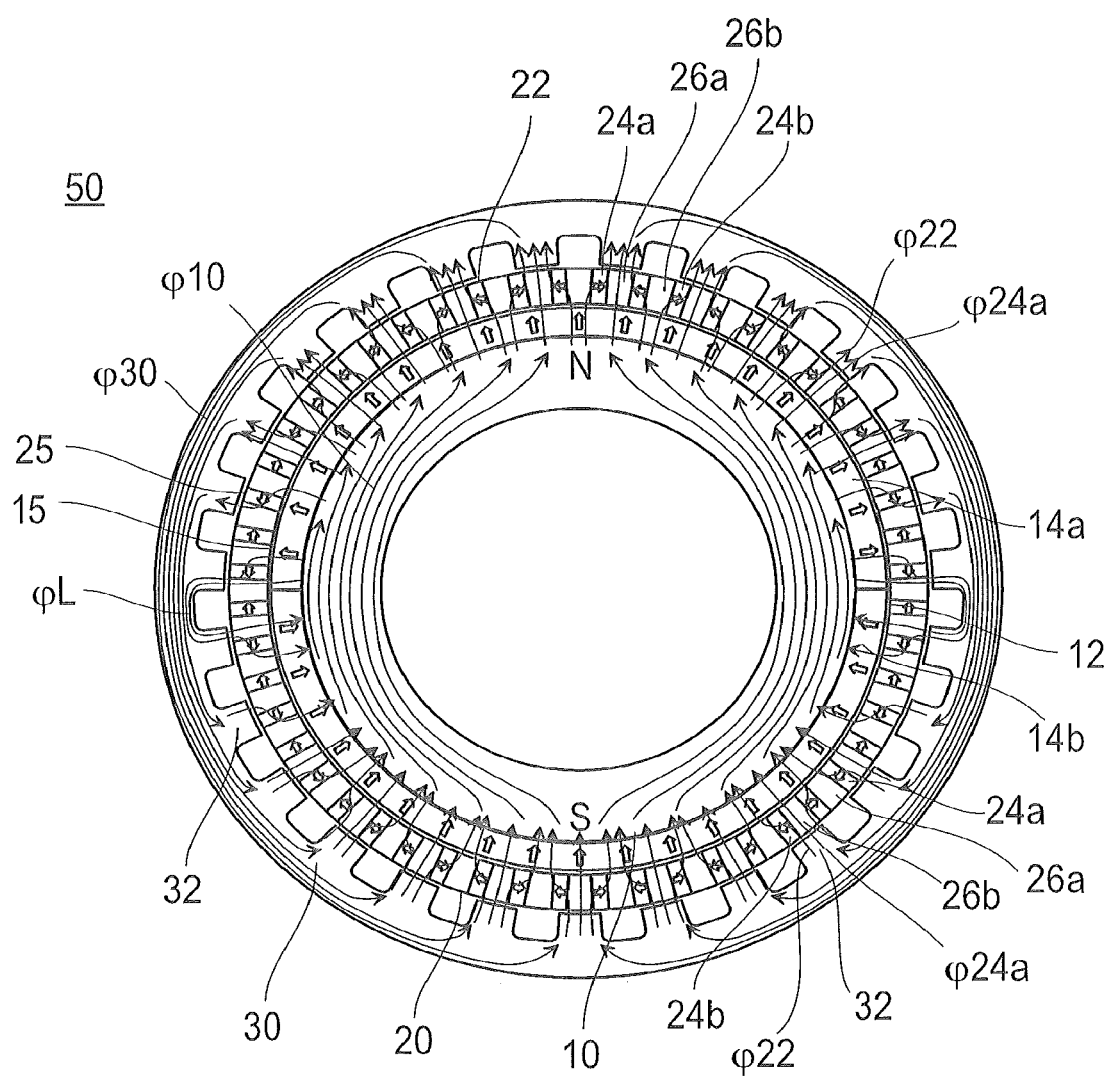
FIG. 2 is an explanatory view of closed magnetic fields formed in the power transmission device in FIG. 1.
Figure 3:
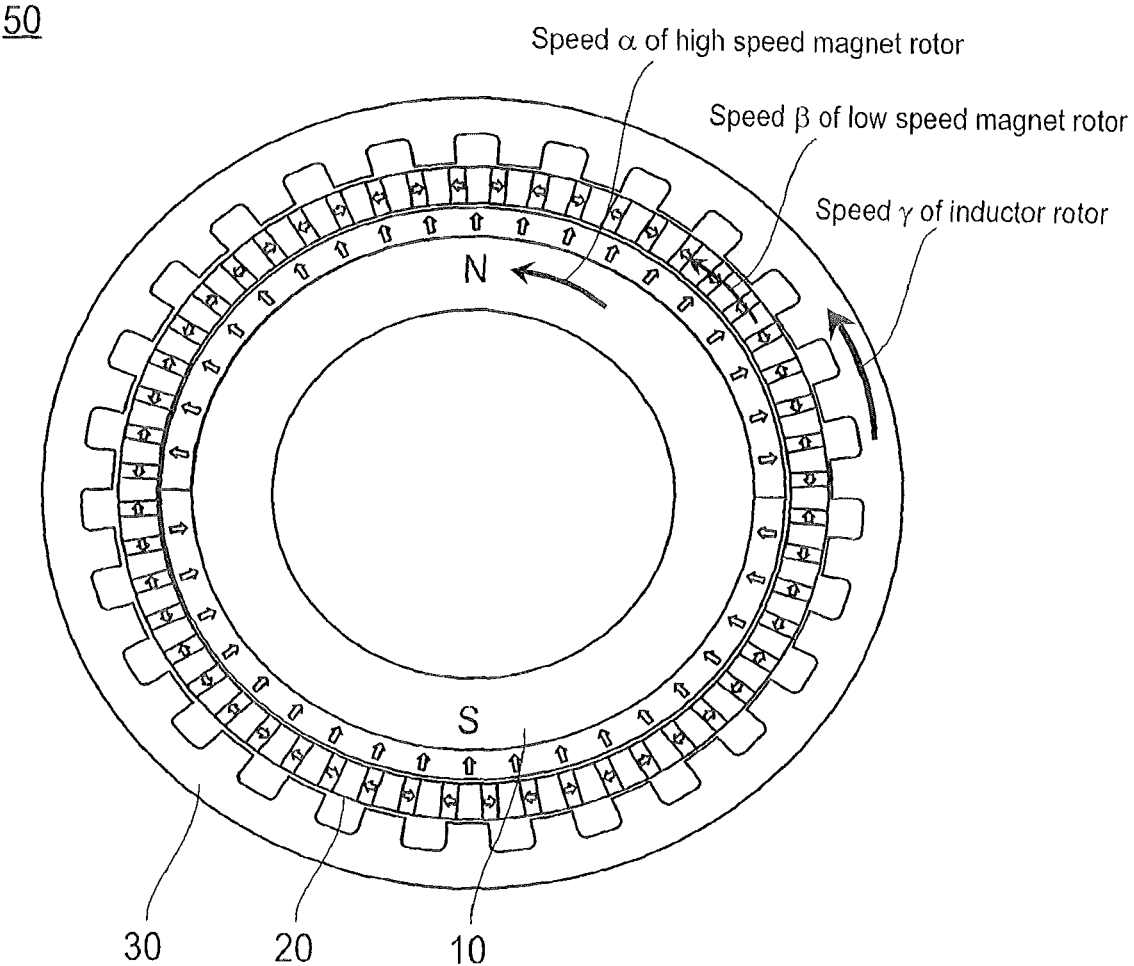
FIG. 3 is an explanatory view of power transmission of the power transmission device.

FIG. 1 is a configuration diagram of a power transmission device according to the first embodiment. FIG. 2 is an explanatory view of closed magnetic fields formed in the power transmission device in FIG. 1. FIG. 3 is an explanatory view of power transmission of the power transmission device. FIGS. 4 to 6 are explanatory views of a mechanism of power transmission of the power transmission device in FIG. 1. Hereinafter, a configuration and an operation of the power transmission device according to the present embodiment will be described.

<Configuration of Power Transmission Device>

FIG. 1 is a configuration diagram of the power transmission device according to the present embodiment, and illustrates a cross section obtained by cutting the power transmission device in a direction orthogonal to a rotation axis direction of the power transmission device. In addition, directions of arrows illustrated in FIG. 1 are magnetizing directions of permanent magnets, and arrow directions of the arrows indicate the N pole and base directions of the arrows indicate the S pole.

A power transmission device 50 includes a high speed magnet rotor 10, a low speed magnet rotor 20 and an inductor rotor 30. The high speed magnet rotor 10, the low speed magnet rotor 20 and the inductor rotor 30 are concentrically arranged. In the present embodiment, the high speed magnet rotor 10 of the smallest diameter is arranged on an innermost side, and the inductor rotor 30 of the largest diameter is arranged on an outermost side. The low speed magnet rotor 20 is arranged between the high speed magnet rotor 10 and the inductor rotor 30 such that the high speed magnet rotor 10 and a gap 15 are formed and the inductor rotor 30 and a gap 25 are formed. The high speed magnet rotor 10, the low speed magnet rotor 20 and the inductor rotor 30 are rotatably supported independently. In the present embodiment, the inductor rotor 30 is fixed so as not to rotate, and the high speed magnet rotor 10 and the low speed magnet rotor 20 are rotatably supported.

The high speed magnet rotor 10 includes a magnet array 12 which has two semicircular permanent magnets 14a and 14b which are magnetized in the radial direction. An inner periphery side of the permanent magnet 14a is magnetized as the S pole and the outer periphery side is magnetized as the N pole, and the inner periphery side of the permanent magnet 14b is magnetized as the N pole and the outer periphery side is magnetized as the S pole. Hence, the high speed magnet rotor 10 includes a pair of the N pole on the upper side and the S pole on the lower side in FIG. 1.

In addition, although FIG. 1 illustrates the two semicircular permanent magnets 14a and 14b as an example, one annular permanent magnet which is magnetized such that an outer side of a half area is the N pole and an outer side of the other half area is the S pole.

Further, although FIG. 1 illustrates as an example that the number of poles of the high speed magnet rotor 10 is two, the number of poles of the high speed magnet rotor 10 may be two and, in addition, 2a (a is a natural number equal to or more than two) as described in the second and subsequent embodiments. When the poles the number of which is 2a are provided in the high speed magnet rotor 10, closed magnetic fields which are described below are formed in 2a areas of the high speed magnet rotor 10.

The high speed magnet rotor 10 is formed using a magnetic body such as a magnetic steel sheet, ferrosilicon, carbon silicon, electromagnetic stainless steel, a powder magnetic core or an amorphous core.

Fifty two concave portions are formed in the low speed magnet rotor 20 at fixed intervals and in the circumferential direction. In the respective concave portions, fifty two permanent magnets 24a, 24b and . . . magnetized in the circumferential direction are embedded. When the permanent magnets 24a, 24b and . . . are embedded in the concave portions, the permanent magnets 24a, 24b and . . . and magnetic body portions 26a, 26b and . . . are alternately arranged in the low speed magnet rotor 20 in the circumferential direction.

The low speed magnet rotor 20 includes a magnet array 22 which is magnetized in a circumferential direction. The magnet array 22 aligns the magnetic fluxes which pass through the low speed magnet rotor 20. The magnet array 22 allows most of magnetic fluxes which pass through the low speed magnet rotor 20 to pass in an aligned state, and leakage magnetic fluxes decrease. In the magnet array 22 of the low speed magnet rotor 20, homopolar surfaces (N pole side) of the neighboring permanent magnets 24a and 24a face across through the magnetic body portions 26a and in the circumferential direction, and homopolar surfaces (S pole side) of the neighboring permanent magnets 24b and 24b face across through the magnetic body portions 26b and in the circumferential direction. As to magnetizing directions of the permanent magnets of the low speed magnet rotor 20, arrow directions of the arrows indicate the N pole and base directions of the arrows indicate the S pole. Hence, the two permanent magnets 24a whose N poles face each other are arranged beside the magnetic body portion 26a, and the two permanent magnets 24b whose S poles face each other are arranged beside the magnetic body portion 26b.

In the low speed magnet rotor 20, the magnetic body portions 26a which are sandwiched by the N pole permanent permanents 24a facing each other and the magnetic body portions 26b which are sandwiched by the S pole permanent magnets 24b facing each other are alternately arranged in the circumferential direction of the low speed magnet rotor 20. The fifty two permanent magnets 24a, 24b and . . . are embedded in the low speed magnet rotor 20, and so fifty six magnetic poles are formed.

Although FIG. 1 illustrates that the low speed magnet rotor 20 includes the fifty six magnetic poles, the low speed magnet rotor 20 may include the fifty six magnetic poles and, in addition, 2b (b is a natural number greater than a: a<b) magnetic poles as described in the second and subsequent embodiments. When the 2b magnetic poles are provided in the low speed magnet rotor 20, the low speed magnet rotor 20 aligns, in "b" areas, magnetic fluxes which pass through the low speed magnet rotor 20 from the high speed magnet rotor 10.

Similar to the high speed magnet rotor 10, the low speed magnet rotor 20 is formed using a magnetic body such as a magnetic steel sheet, ferrosilicon, carbon silicon, electromagnetic stainless steel, a powder magnetic core or an amorphous core.

The inductor rotor 30 allows the magnetic fluxes from the magnet array 12 of the high speed magnet rotor 10 to pass through the magnetic body portions 26a of the low speed magnet rotor 20. Further, the inductor rotor 30 allows the magnetic fluxes of the inductor rotor 30 to pass toward the magnet array 12 of the high speed magnet rotor 10 through the magnetic body portions 26a and 26b. In an inner periphery portion of the inductor rotor 30, twenty seven magnetic teeth 32 which project toward the inner periphery side are formed at fixed intervals and along the circumferential direction. The magnetic teeth 32 take in most of magnetic fluxes which pass through the magnetic body portions 26a of the low speed magnet rotor 20.

The number of magnetic teeth 32 provided to the inductor rotor 30 is set by taking into account the number of magnetic poles 2a of the high speed magnet rotor 10 and the number of magnetic poles 2b of the low speed magnet rotor 20 such that, when one of the high speed magnet rotor 10 and the low speed magnet rotor 20 is rotated, the other one can be rotated. More specifically, "c" magnetic teeth 18 which satisfy a relationship expressed in following equation 1 are formed. Although concave portions are formed between the magnetic teeth 18 and the magnetic teeth 18, eddy currents are produced in the concave portions when the low speed magnet rotor 20 rotates and air resistances are produced. Non-magnetic bodies such as an adhesive or a resin filler are filled in the concave portions to reduce the air resistances.

$$c=b+d*a(d=\pm 1) \tag{Equation 1}$$

Herein, "a" is the number of pairs of magnetic poles of the high speed magnet rotor 10, and "b" is the number of pairs of magnetic poles of the low speed magnet rotor 20.

In FIG. 1, as described above, the number of pairs a of the magnetic poles of the high speed magnet rotor 20 is one, and the number of pairs b of the magnetic poles of the low speed magnet rotor 20 is twenty six. Hence, upon d=−1, the number of the magnetic teeth 18 which need to be provided to the inductor rotor 30 is twenty five according to equation 1, and, upon d=+1, the number of the magnetic: teeth 18 which need to be provided to the inductor rotor 30 is twenty seven. In the power transmission device 50 in FIG. 1, the twenty seven magnetic teeth 18 are formed in the inductor rotor 30.

Similar to the high speed magnet rotor 10 and the low speed magnet rotor 20, the inductor rotor 30 is formed using a magnetic body such as a magnetic steel sheet, ferrosilicon, carbon silicon, electromagnetic stainless steel, a powder magnetic core or an amorphous core.

<Operation of Power Transmission Device>

(Formation of Closed Magnetic Fields)

First, closed magnetic fields formed in the power transmission device 50 will be described. FIG. 2 is the explanatory view of the closed magnetic fields formed in the power transmission device 50 in FIG. 1. In addition, arrows illustrated in FIG. 2 indicate magnetic force lines, and arrow directions of the arrows indicate directions of the magnetic force lines.

As illustrated in FIG. 2, in the high speed magnet rotor 10, magnetic fluxes φ10 which flow from the permanent magnet 14b to the permanent magnet 14a distribute in two ways of the right and the left in a cylinder of the high speed magnet rotor 10. The magnetic fluxes which flow from the permanent magnet 14a of the high speed magnet rotor 10 to the inductor rotor 30 pass through the magnetic body portions 26a of the low speed magnet rotor 20 from the two routes.

One route is a first route which goes into the permanent magnet 24a once from the permanent magnet 14a and reaches the magnetic tooth 32 of the inductor rotor 30 from the magnetic body portion 26a by way of induction by the permanent magnet 24a, and the other one route is a second route which directly goes into the magnetic body portion 26a from the permanent magnet 14a and reaches the magnetic tooth 32 of the inductor rotor 30 from the magnetic body portion 26a. The magnetic fluxes φ22 reach the magnetic teeth 32 of the inductor rotor 30 through the first route. The magnetic fluxes φ24a reach the magnetic teeth 32 of the inductor rotor 30 through the second route.

Across the magnetic body portion 26a of the low speed magnet rotor 20, the two permanent magnets 24a are arranged from both sides of the circumferential direction such that the N pole sides face each other. Further, across the magnetic body portion 26b of the low speed magnet rotor 20, the two permanent magnets 24b are arranged from both sides of the circumferential direction such that the S pole sides face each other. Consequently, it is possible to induce the magnetic fluxes φ22 from the permanent magnet 14a to the magnetic body portions 26a and it is possible to forcibly induce magnetic fluxes which flow into the magnetic body portions 26b from the permanent magnet 14a and reach the magnetic teeth 32 of the inductor rotor 30 and which are likely to become leakage magnetic fluxes, to the magnetic body portions 26a by the magnetic forces of the permanent magnets 24b.

Thus, the magnet array 22 aligns the magnetic fluxes φ22 and φ24a which pass through the low speed magnet rotor 20, toward the magnetic body portions 26a. The magnet array 22 aligns most of the magnetic fluxes which pass through the low speed magnet rotor 20, toward the magnetic body portions 26a and allows the magnetic fluxes to pass, so that it is possible to eliminate leakage magnetic fluxes and effectively convert the magnetic fluxes into a torque.

The magnetic fluxes φ22 and φ24a which pass through the magnetic body portions 26a of the low speed magnet rotor 20, and are induced to the magnetic teeth 32 of the inductor rotor 30 converge in a cylinder of the inductor rotor 30, become the magnetic fluxes φ30 and distribute in two ways of the right and the left in the inductor rotor 30. The magnetic fluxes φ30 flow toward the magnetic teeth 32 of the inductor rotor 30 which face the permanent magnet 14b of the high speed magnet rotor 10. The magnetic fluxes which flow from the magnetic teeth 32 of the inductor rotor 30 to the permanent magnet 14b of the high speed magnet rotor 10 pass through the magnetic body portions 26a and 26b of the low speed magnet rotor 20 from the two routes.

One route is a third route which goes into the permanent magnet 24a once from the magnetic tooth 32 and reaches the permanent magnet 14b from the magnetic body portion 26a by way of induction by the permanent magnet 24a, and the other one route is a fourth route which directly goes into the magnetic body portion 26b from the magnetic tooth 32 and reaches the permanent magnet 14b. The magnetic fluxes φ22 reach the permanent magnet 14b of the high speed magnet rotor 10 through the third route. The magnetic fluxes φ24a reach the permanent magnet 14b of the high speed magnet rotor 10 through the fourth route. In addition, loop magnetic fluxes φL flow from the permanent magnet 14a to the magnetic teeth 32 positioned at boundaries between the permanent magnets 14a and 14b of the magnet array 12 through the first and second routes, and the loop magnetic fluxes φL flow in the permanent magnet 14b from the neighboring magnetic teeth 32 through the third and fourth routes.

Thus, the magnet array 22 aligns the magnetic fluxes φ22 and φ24a which pass through the low speed magnet rotor 20, toward the magnetic body portions 26a and 26b. The magnet array 22 aligns most of the magnetic fluxes which pass through the low speed magnet rotor 20, toward the magnetic body portions 26a and 26b and allows the magnetic fluxes to pass, so that it is possible to eliminate leakage magnetic fluxes and effectively convert the magnetic fluxes into a torque.

As described above, in the power transmission device 50 according to the first embodiment, closed magnetic fluxes are effectively induced to the magnetic body portions 26a and 26b by the magnet array 22 of the low speed magnet rotor 20, so that it is possible to reduce leakage magnetic fluxes of the high speed magnet rotor 10, the low speed magnet rotor 20 and the inductor rotor 30. Further, it is possible to increase magnetic coupling strengths of these rotors and make the outer periphery portion side which is a yoke of the inductor rotor 30 thinner. Furthermore, the closed magnetic fluxes are effectively used and an outer shape of the inductor rotor 30 can be made smaller, so that it is possible to achieve a greater allowable torque while the power transmission device is small.

(Principle of Acceleration and Deceleration)

Next, as illustrated in FIG. 2, at what number of rotations other rotors rotate when the respective rotors are rotated in a state where closed magnetic fluxes are formed in the high speed magnet rotor 10, the low speed magnet rotor 20 and the inductor rotor 30 will be described.

FIG. 3 is the explanatory view of power transmission of the power transmission device 50.

Herein, the number of poles of the high speed magnet rotor 10 is 2a (a is a natural number), the number of poles of the low speed magnet rotor 20 is 2b (b is a natural number higher than a and a<b), the number of magnetic teeth of the inductor rotor 30 is c (c=b+d·a) and coefficient d=1 or −1 holds, and, further, the speed of the high speed magnet rotor 10 is α, the speed of the low speed magnet rotor 20 is β and
the speed of the inductor rotor 30 is γ.

The relationship between the speeds of the three rotors can be represented by the following equation.

$$a(\alpha-\beta)=c \cdot d(\gamma-\beta)$$

This equation can be developed and organized as the following equation.

$$a \cdot \alpha = (a-c \cdot d)\beta + c \cdot d \gamma \ldots \quad \text{(Equation 2)}$$

Although all of the three rotors are rotatably supported, one of the rotors can be fixed. The speed of each rotor in this case can be represented by the following equation.

When the high speed magnet rotor 10 is fixed, α=0 holds and then the speeds of the low speed magnet rotor 20 and the inductor rotor 30 are (c·d−a)β=c·d·γ.

Further, when the low speed magnet rotor 20 is fixed, β=0 holds and then the speeds of the high speed magnet rotor 10 and the inductor rotor 30 are a·α=c·d·γ.

Furthermore, when the inductor rotor 30 is fixed, γ=0 holds and a·α=(a−c·d)β holds.

In view of these equations, rotation speeds differ between the rotors and can be accelerated or decelerated between the rotors. In addition, that the reference numerals are reversed means that the rotors rotate in opposite directions.

In case of the power transmission device according to the first embodiment, the number of poles of the high speed magnet rotor 10 is 2a=2, the number of poles of the low speed magnet rotor 20 is 2b=52, the number of magnetic teeth of the inductor rotor 30 is c=27 and coefficient d=1 holds, and then, by substituting a=1, b=26, c=27 and d=1 in equation 2, α=−26·β+27·γ holds.

When one of the three rotors is fixed, the speeds of the other two rotors can be represented as follows.

When the high speed magnet rotor 10 is fixed, 26·β=27·γ holds, and, when the low speed magnet rotor 20 is rotated twenty seven times, the inductor rotor 30 is rotated twenty six times and, by contrast with this, when the inductor rotor 30 is rotated twenty six times, the low speed magnet rotor 20 is rotated twenty seven times.

When the low speed magnet rotor 20 is fixed, α=27·γ holds, and, when the high speed magnet rotor 10 is rotated twenty seven times, the inductor rotor 30 is rotated one time and, by contrast with this, when the inductor rotor 30 is rotated one time, the high speed magnet rotor 10 is rotated twenty seven times.

When the inductor rotor 30 is fixed, α=−26·β holds, and, when the high speed magnet rotor 10 is rotated twenty six times, the low speed magnet rotor 20 is rotated minus one time (one time in a direction opposite to the high speed magnet rotor 10) and, by contrast with this, when the low speed magnet rotor 20 is rotated one time, the high speed magnet rotor 10 is rotated minus twenty six times (twenty six times in a direction opposite to the low speed magnet rotor 20).

Next, the principle of acceleration and deceleration between the high speed magnet rotor 10, the low speed magnet rotor 20 and the inductor rotor 30 will be described in more detail.

FIGS. 4 to 6 illustrate only one enlarged portion of the power transmission device illustrated in FIGS. 1 and 2 for ease of understanding of a relative positional relationship between the rotors.

Figure 4A:
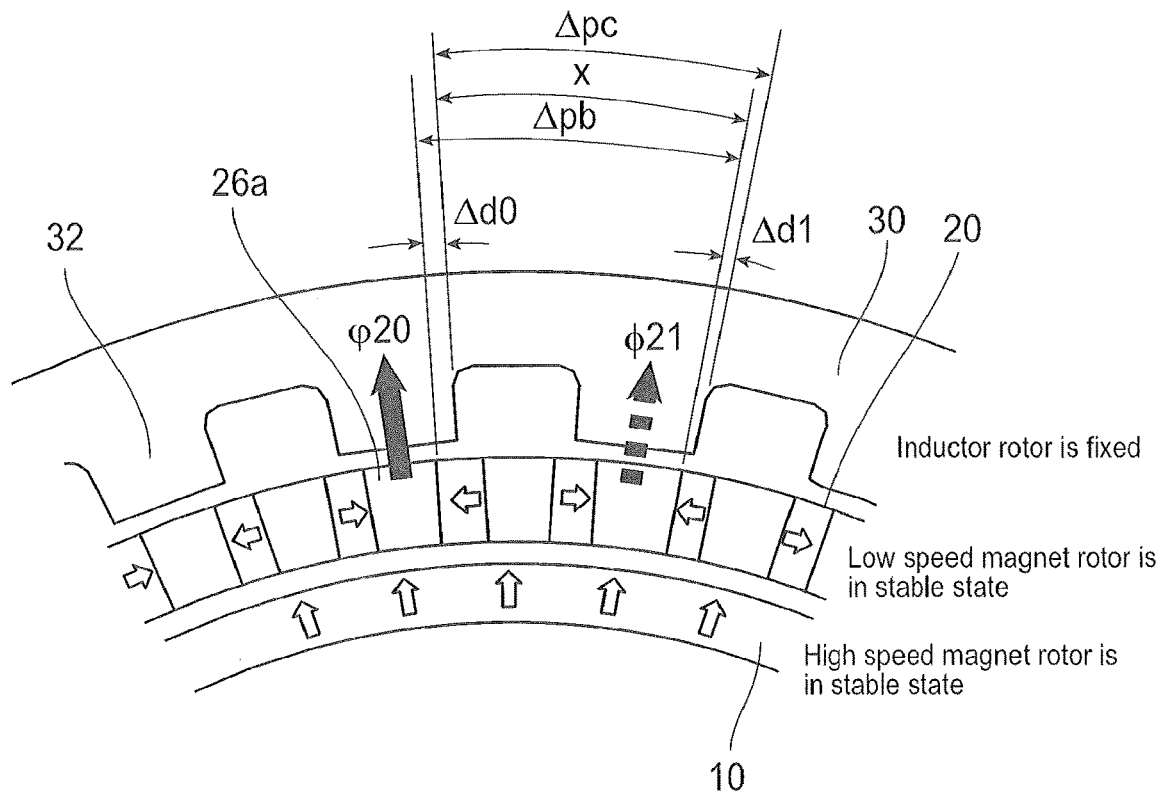
FIG. 4A is an explanatory view of a mechanism of power transmission of the power transmission device in FIG. 1.
Figure 4B:
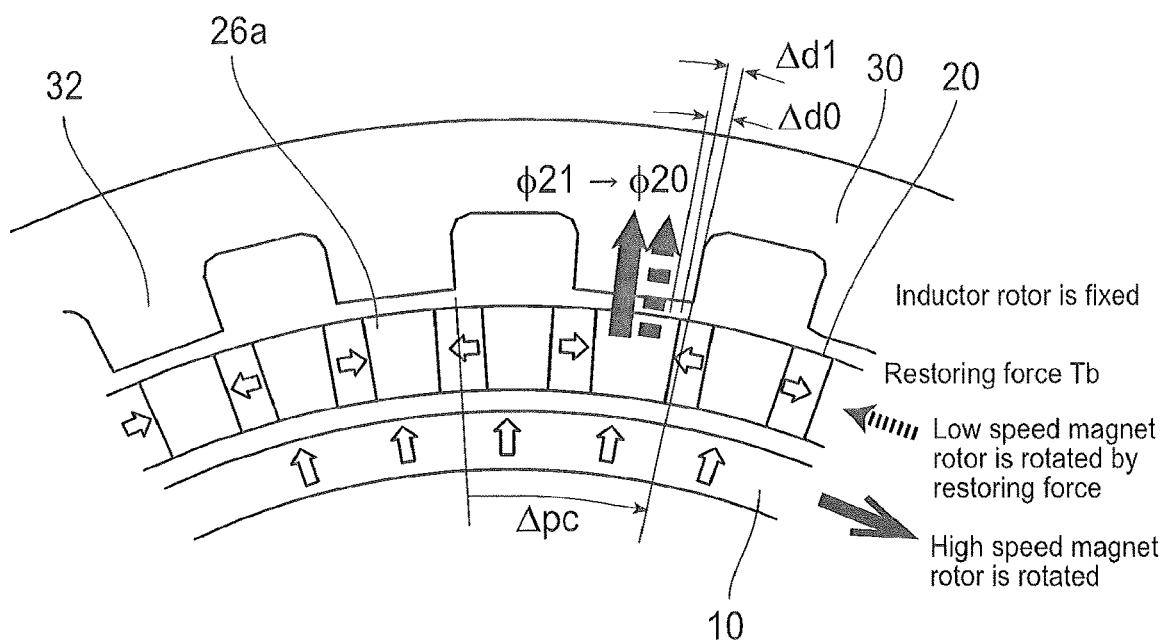
FIG. 4B is an explanatory view of a mechanism of power transmission of the power transmission device in FIG. 1.

FIG. 4A illustrates a relative positional relationship between the rotors when a balance between closed magnetic fields is kept, and FIG. 4B illustrates a relative positional relationship between the rotors when the balance between the closed magnetic fields is lost. φ20 and φ21 illustrated in FIGS. 4A and 4B indicate magnetic flux densities (the number of magnetic force lines) of the closed magnetic fields which flow into one magnetic tooth 32 through the magnetic body portion 26a. Further, Δpb indicates a pitch between magnetic poles whose polarities of the low speed magnet rotor 20 are the same, and Δpc indicates a pitch between the magnetic teeth 32 of the inductor rotor 30. Furthermore, Δd0 and Δd1 indicate relative positions of an edge on the right side of the magnetic body portion 26a and an edge on the right side of the magnetic tooth 32.

When an angle at a portion at which Δpb and Δpc overlap is x, positional relationships of following equations (3) and (4) hold.

$$\Delta pb = \Delta d0 + x \ldots \quad \text{(Equation 3)}$$

$$\Delta pc = \Delta d1 + x \ldots \quad \text{(Equation 4)}$$

A case will be described where the relative positional relationship between the rotors change as in FIG. 4A to FIG. 4B. As illustrated in FIG. 4A, when the balance between the closed magnetic fields is kept, the magnetic body portion 26a and the magnetic tooth 32 have a relative positional relationship of Δd0 in one magnetic tooth 32 through which the magnetic fluxes φ20 pass.

In FIG. 4A, when the inductor rotor 30 is fixed, the high speed magnet rotor 10 is rotated at the pitch Δpc of the magnetic teeth 32 in the arrow direction, the relative positional relationship between the rotors changes as illustrated in FIG. 4B. In FIG. 4B, a restoring force Tb of a magnetic field works such that the magnetic fluxes φ21 become the magnetic fluxes φ20 to keep the balance between the closed magnetic fields. The restoring force Tb rotates the low speed magnet rotor 20 from the above relative position Δd1 to Δd0 in a counterclockwise direction.

A rotation angle Δd of the low speed magnet rotor 20 is equation (5) according to the relationship between equations (3) and (4).

$$\Delta d = \Delta d1 - \Delta d0 = \Delta pc - \Delta pb \ldots \quad \text{(Equation 5)}$$

Herein, when the number of teeth of the magnetic teeth 32 is c and the number of pairs of magnetic poles of the low speed magnet rotor 20 is b, Δpc=360°/c and Δpb=360°/b hold and the rotation angle Δd is as represented by equation (6).

$$\Delta d = 360° * (b-c)/(b*c) \ldots \quad \text{(Equation 6)}$$

That is, when the high speed magnet rotor 10 is rotated at Δpc(360°/c), the low speed magnet rotor 20 is rotated at 360°*(b−c)/(b*c). Hence, when a rotation speed of the high speed magnet rotor 10 is α and a rotation speed of the low speed magnet rotor 20 is β, the high speed magnet rotor 10 and the low speed magnet rotor 20 have a speed relationship of following equation (7).

$$(b-c)*\alpha = b*\beta \ldots \quad \text{(Equation 7)}$$

Hence, a deceleration ratio α/β=b/(b−c) holds, the rotation speed α of the high speed magnet rotor 10 is decelerated to b/(b−c) times and is transmitted to the low speed magnet rotor 20. According to the power transmission device 50 in FIG. 1, the number of pairs b of magnetic poles of the low speed magnet rotor 20 is twenty six and the number c of magnetic teeth 32 of the inductor rotor 30 is twenty seven, and therefore the deceleration ratio is minus twenty six and, when the high speed magnet rotor 10 is rotated twenty six times, the low speed magnet rotor 20 is rotated one time in the direction opposite to the high speed magnet rotor 10.

Figure 5A:
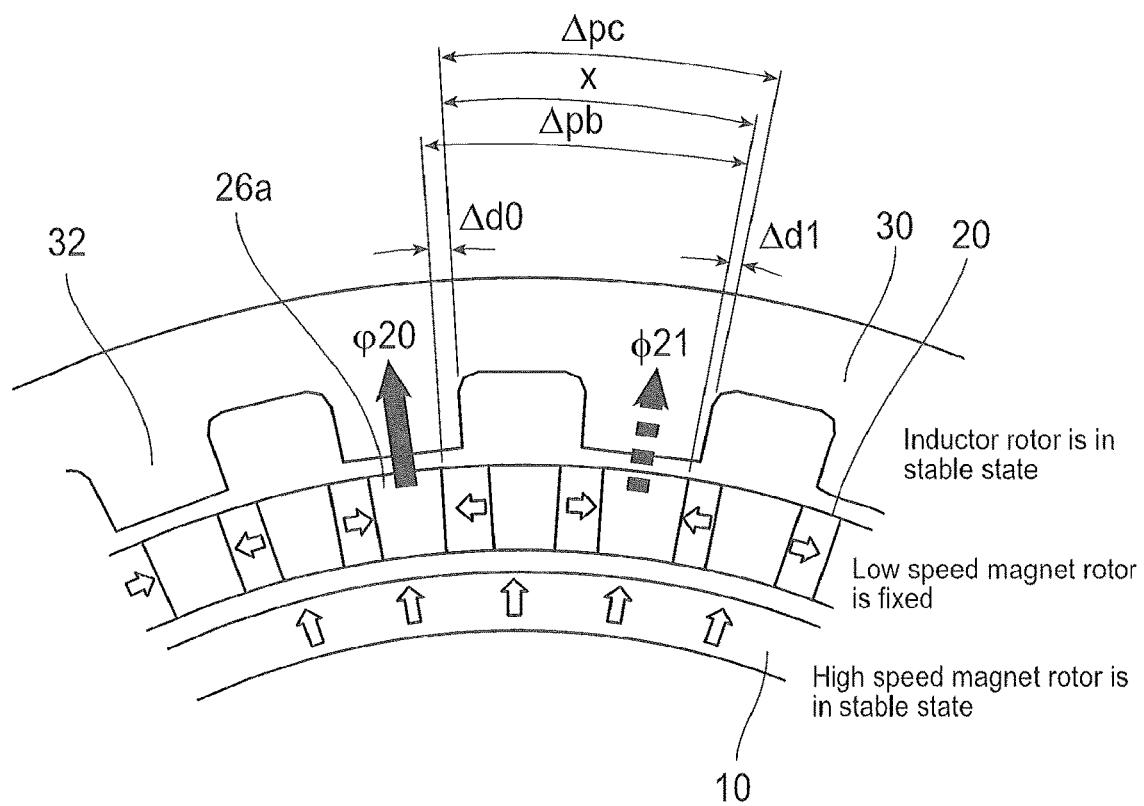
FIG. 5A is an explanatory view of a mechanism of power transmission of the power transmission device in FIG. 1.
Figure 5B:
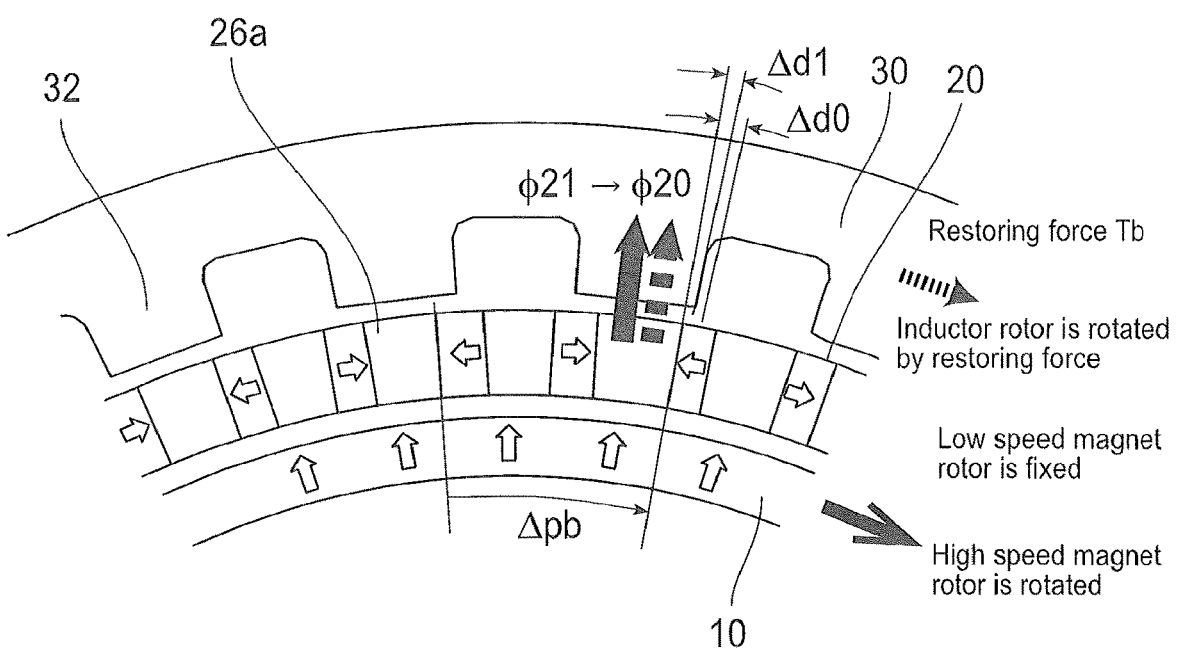
FIG. 5B is an explanatory view of a mechanism of power transmission of the power transmission device in FIG. 1.
Figure 6A:
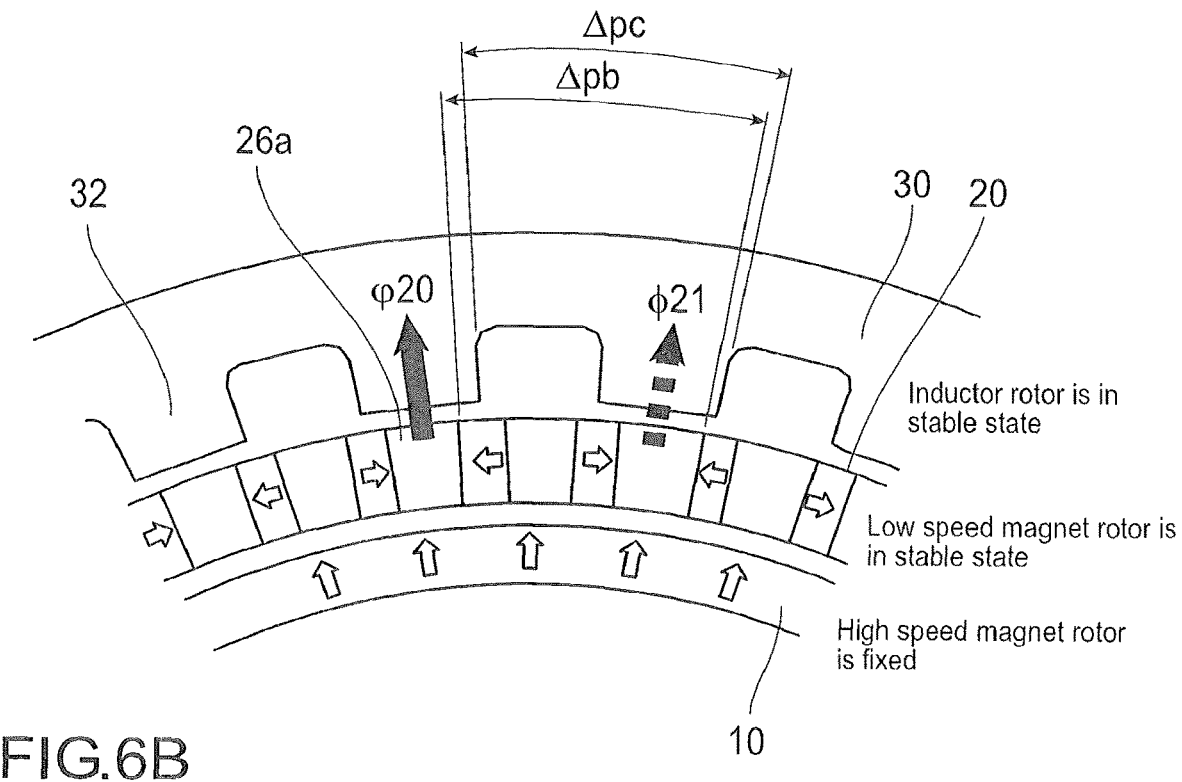
FIG. 6A is an explanatory view of a mechanism of power transmission of the power transmission device in FIG. 1.

FIG. 5A illustrates a relative positional relationship between the rotors when a balance between closed magnetic fields is kept, and FIG. 5B illustrates a relative positional relationship between the rotors when the balance between the closed magnetic fields is lost. Meanings of reference numerals φ20, φ21, Δpb, Δpc, Δd0 and Δd1 in FIG. 5 are the same as those in FIG. 4. As illustrated in FIG. 5A, when the balance between the closed magnetic fields is kept, the magnetic body portion 26a and the magnetic tooth 32 have a relative positional relationship of Δd0 in the magnetic tooth 32 through which the magnetic fluxes φ20 pass.

In FIG. 5A, when the low speed magnet rotor 20 is fixed and the high speed magnet rotor 10 is rotated at the pitch Δpb of the same magnetic pole of the low speed magnet rotor 20 in the arrow direction, the relative positional relationship between rotors is as illustrated in FIG. 5B.

Similar to FIG. 4, the restoring force Tb of the magnetic field works such that the magnetic fluxes φ21 become φ20 to keep a new balance. In case of FIG. 5, the restoring force Tb of the magnetic field functions with respect to the inductor rotor 30. Hence, the inductor rotor 30 rotates from the above relative position Δd1 to Δd0 in the same direction as the high speed magnet rotor 10. As to the rotation angle Δd, the same relationship as those of above equations (5) ad (6) holds.

That is, when the high speed magnet rotor 10 is rotated at Δpb(360°/b), the inductor rotor 30 is rotated at 360°*(b−c)/(b*c). Hence, when a rotation speed of the high speed magnet rotor 10 is α and a rotation speed of the inductor rotor 30 is γ, the high speed magnet rotor 10 and the inductor rotor 30 has a speed relationship of following equation (8).

$$(b-c)*\alpha = -c*\gamma \ldots \quad \text{(Equation 8)}$$

Hence, a deceleration ratio α/γ=−c/(b−c) holds, the rotation speed α of the high speed magnet rotor 10 is decelerated to −c/(b−c) times and is transmitted to the inductor rotor 30. According to the power transmission device 50 in FIG. 1, the number of pairs b of magnetic poles of the low speed magnet rotor 20 is twenty six and the number c of magnetic teeth of the inductor rotor 30 is twenty seven, and therefore the deceleration ratio is twenty seven and, when the high speed magnet rotor 10 is rotated twenty seven times, the inductor rotor 30 is rotated one time in the same direction as the rotation direction of the high speed magnet rotor 10.

Lastly, a case of FIG. 6 will be described. When the balance between the closed magnetic fields is kept, the magnetic body portion 26a and the magnetic tooth 32 have a fixed relative positional relationship in one magnetic tooth 32 through which the magnetic fluxes φ20 pass. Unlike FIGS. 4 and 5, in case of FIG. 6, the high speed magnet rotor 10 itself which forms the closed magnetic fields does not rotate, and therefore, as illustrated in FIGS. 4 and 5, there is no relative position at which a new balance between the closed magnetic fields is kept in a range of a predetermined interval (a pitch of the same magnetic pole of the low speed magnet rotor 20 or a pitch of the magnetic tooth 32) and then the low speed magnet rotor 20 and the inductor rotor 30 maintain a current relative positional relationship at all times.

Figure 6B:
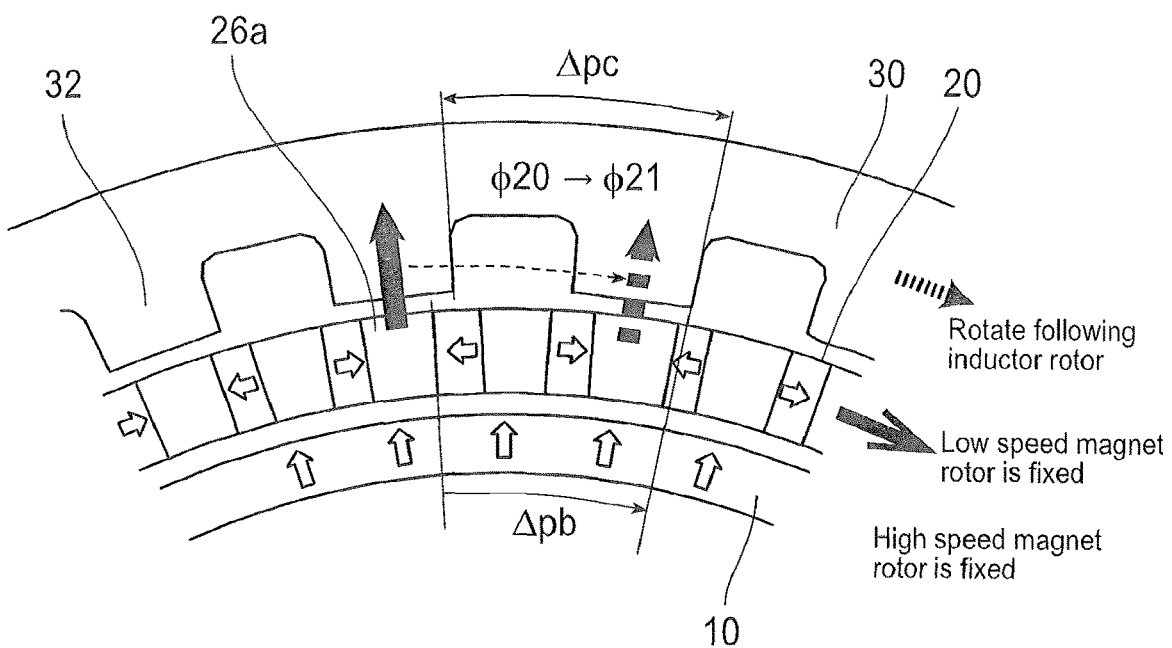
FIG. 6B is an explanatory view of a mechanism of power transmission of the power transmission device in FIG. 1.

Hence, when one of the low speed magnet rotor 20 and the inductor rotor 30 is rotated, the magnetic fluxes φ21 which flow into the magnetic teeth 32 at the current positions decrease as illustrated in FIG. 6B. In this case, a reluctance torque is produced such that magnetic fluxes more easily flow to rotate the other rotors and maintain the relative positional relationship. In this case, when the low speed magnet rotor 20 rotates at Δpb(=360°/b), the inductor rotor 30 rotates at Δpc(=360°/c). That is, the deceleration ratio is in equation (9).

$$\beta/\gamma = \Delta pb/\Delta pc = c/b \ldots \quad \text{(Equation 9)}$$

According to the power transmission device 50 in FIG. 1, the number of pairs b of magnetic poles of the low speed magnet rotor 20 is twenty six and the number c of magnetic teeth of the inductor rotor 30 is twenty seven, and therefore the deceleration ratio is 27/26 or 26/27. That is, when the low speed magnet rotor 20 is rotated twenty six times, the inductor rotor 30 rotates twenty seven times in the same direction following the low speed magnet rotor 20 and, when the inductor rotor 30 is rotated twenty seven times, the low speed magnet rotor 20 rotates twenty six times in the same direction as the inductor rotor 30.

The configuration and the operation of the power transmission device 50 according to the first embodiment have been described above. As illustrated in FIGS. 4 to 6, when one of the rotors is rotated, the balance between closed magnetic fields formed between the rotors is lost and the respective rotors rotate to keep the balance. The function of keeping the balance between closed magnetic fields between rotors provides a relationship between speeds of three respective rotors as expressed in equation 2.

As described above, in the power transmission device 50 according to the present embodiment, the low speed magnet rotor 20 includes the magnet array 22 which is magnetized in the circumferential direction and the magnet array 22 aligns magnetic fluxes which pass through the low speed magnet rotor 20, so that it is possible to minimize leakage magnetic fluxes and achieve a high allowable torque and a wide range of an acceleration and deceleration ratio.

Second Embodiment

Figure 7:
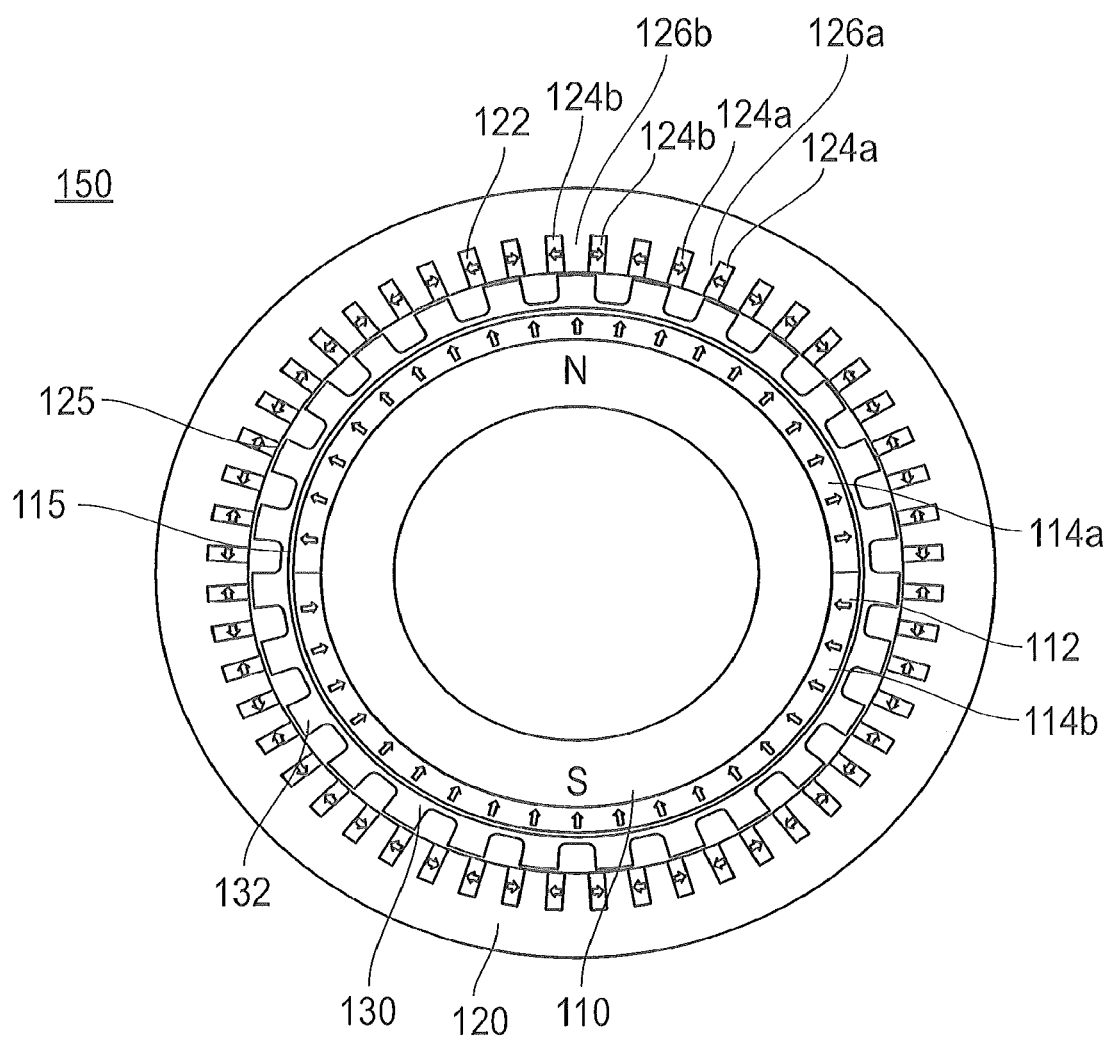
FIG. 7 is a configuration diagram of a power transmission device according to a second embodiment.
Figure 8:
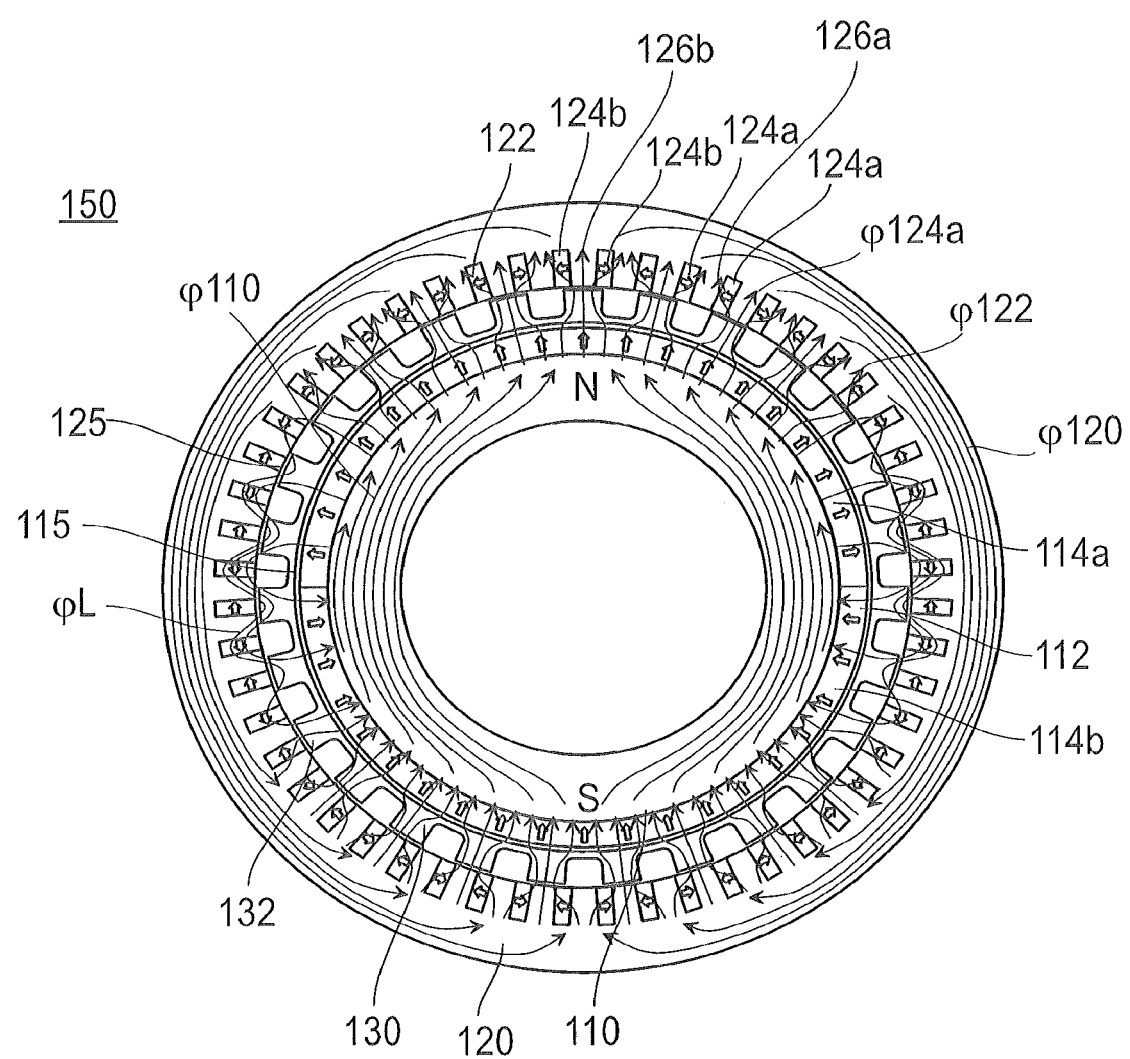
FIG. 8 is an explanatory view of closed magnetic fields formed in the power transmission device in FIG. 7.

Next, a power transmission device according to the second embodiment will be described. FIG. 7 is a configuration diagram of the power transmission device according to the second embodiment. FIG. 8 is an explanatory view of closed magnetic fields formed in the power transmission device in FIG. 7.

As illustrated in FIG. 7, a power transmission device 150 according to the second embodiment differs from a power transmission device 50 according to the first embodiment in switching positions of a low speed magnet rotor and an inductor rotor.

<Configuration of Power Transmission Device>

The power transmission device 150 includes a high speed magnet rotor 110, a low speed magnet rotor 120 and an inductor rotor 130. The high speed magnet rotor 110, the low speed magnet rotor 120 and the inductor rotor 130 are concentrically arranged. In the present embodiment, the high speed magnet rotor 110 of the smallest diameter is arranged on an innermost side, and the low speed magnet rotor 120 of the largest diameter is arranged on an outermost side. The inductor rotor 130 is arranged between the high speed magnet rotor 110 and the low speed magnet rotor 120 such that the high speed magnet rotor 110 and a gap 115 are formed and the low speed magnet rotor 120 and a gap 125 are formed. The three rotors are rotatably supported independently.

The high speed magnet rotor 110 includes a magnet array 112 which includes two semicircular permanent magnets 114a and 114b which are magnetized in the radial direction.

The other configuration of the high speed magnet rotor 110 is the same as that of the first embodiment.

Fifty two concave portions are formed in an inner periphery portion of the low speed magnet rotor 120 at fixed intervals and in the circumferential direction. In the respective concave portions, fifty two permanent magnets 124a, 124b and . . . magnetized in the circumferential direction are embedded. An outer periphery portion of the low speed magnet rotor 120 works as a yoke which allows magnetic fluxes to pass, and therefore the depth of the concave portions is about half as the thickness of the low speed magnet rotor 120.

The low speed magnet rotor 120 includes a magnet array 122 which is magnetized in a circumferential direction. The magnet array 122 aligns the magnetic fluxes which pass through the low speed magnet rotor 120. The magnet array 122 allows most of magnetic fluxes which pass through the low speed magnet rotor 120 to pass in an aligned state, and leakage magnetic fluxes decrease. In the magnet array 122 of the low speed magnet rotor 120, homopolar surfaces (N pole side) of neighboring permanent magnets 124a and 124a face across through a magnetic body portions 126a and in the circumferential direction, and homopolar surfaces (S pole side) of the neighboring permanent magnets 124b and 124b face across through the magnetic body portions 126b and in the circumferential direction. The other configuration of the low speed magnet rotor 120 is the same as that of the first embodiment.

The inductor rotor 130 allows magnetic fluxes from the magnet array 112 of the high speed magnet rotor 110 to pass toward the low speed magnet rotor 120. In an outer periphery portion of the inductor rotor 130, twenty seven magnetic teeth 132 which project toward the outer periphery side are formed at fixed intervals and along the circumferential direction. The other configuration of the inductor rotor 130 is the same as that of the first embodiment.

In the power transmission device 150 according to the second embodiment, the number of pairs of magnetic poles of the high speed magnet rotor 110, the number of pairs of magnetic poles of the low speed magnet rotor 120 and the number of magnetic teeth of the inductor rotor 130 are the same as those of the power transmission device 50 according to the first embodiment.

<Operation of Power Transmission Device>

First, closed magnetic fields formed in the power transmission device 150 will be described. FIG. 8 is an explanatory view of closed magnetic fields formed in the power transmission device 150 in FIG. 7. In addition, arrows illustrated in FIG. 8 indicate magnetic force lines, and arrow directions of the arrows indicate directions of the magnetic force lines.

As illustrated in FIG. 8, in the high speed magnet rotor 110, magnetic fluxes φ110 which flow from the permanent magnet 114b to the permanent magnet 114a distribute in two ways of the right and the left in a cylinder of the high speed magnet rotor 110. The magnetic fluxes which flow from the permanent magnet 114a of the high speed magnet rotor 110 to the low speed magnet rotor 120 pass through the magnetic teeth 132 of the inductor rotor 130. The magnetic fluxes which pass through the magnetic teeth 132 flow in the low speed magnet rotor 120 from the two routes.

One route is a first route which directly reaches the magnetic body portion 126b from the permanent magnet 114a through the magnetic tooth 32, and the other one route is a second route which reaches the magnetic teeth 32 from the permanent magnet 114a, goes into the permanent magnet 124a and 124b once from the magnetic teeth 32 and reaches the magnetic body portions 26a. Magnetic fluxes φ122 reach the low speed magnet rotor 120 through the first route. Magnetic fluxes φ124a reach the low speed magnet rotor 120 through the second route.

Across the magnetic body portion 126a of the low speed magnet rotor 120, the two permanent magnets 124a are arranged from both sides of the circumferential direction such that the N pole sides face each other. Further, across the magnetic body portion 126b of the low speed magnet rotor 120, the two permanent magnets 124b are arranged from both sides of the circumferential direction such that the S pole sides face each other. Hence, magnetic fluxes which likely to become leakage magnetic fluxes from the magnetic teeth 132 of the inductor rotor 130 can be induced to the magnetic body portions 126a and 126b by magnetic forces of the permanent magnets 124a and 124b.

Thus, the magnet array 122 aligns the magnetic fluxes φ122 and φ124a which reach the low speed magnet rotor 120, toward the magnetic body portions 126a and 126b. The magnet array 122 aligns most of the magnetic fluxes which pass through the low speed magnet rotor 120, toward the magnetic body portions 126a and 126b and allows the magnetic fluxes to pass, so that it is possible to eliminate leakage magnetic fluxes and effectively convert the magnetic fluxes into a torque.

The magnetic fluxes φ122 and φ124a induced to the low speed magnet rotor 120 converge in a cylinder of the low speed magnet rotor 120, become magnetic fluxes φ120 and distribute in two ways of the right and the left in the low speed magnet rotor 120. The magnetic fluxes φ120 flow toward the magnetic teeth 132 of the inductor rotor 130 which face the permanent magnet 114b of the high speed magnet rotor 110. The magnetic fluxes which flow from the low speed magnet rotor 120 to the permanent magnet 114b of the high speed magnet rotor 110 reach the magnetic teeth 132 of the inductor rotor 130. The magnetic fluxes φ120 which flow toward the magnetic teeth 132 from the low speed magnet rotor 120 flow in the inductor rotor 130 from the two routes.

One route is a third route which goes into the permanent magnets 124a and 124b once from the magnetic body portion 126b and reach the magnetic tooth 132, and the other one route is a fourth route which directly reaches the magnetic tooth 132 from the magnetic body portion 126a. The magnetic fluxes φ124a reach the permanent magnet 114b of the high speed magnet rotor 110 through the third route. The magnetic fluxes φ122 reach the permanent magnet 114b of the high speed magnet rotor 10 through the fourth route. In addition, in the magnetic teeth 132 and the low speed magnet rotor 120 which are positioned near the boundaries between the permanent magnets 114a and 114b of the magnet array 122, loop magnetic fluxes φL which transmit in a loop shape between the magnetic teeth 132, the magnetic body portions 126a and 126b and the permanent magnets 124a and 124b are produced.

Thus, the magnet array 122 aligns the magnetic fluxes φ122 and φ124a which pass through the low speed magnet rotor 120, toward the magnetic body portions 126a and 126b. The magnet array 122 aligns most of the magnetic fluxes which pass through the low speed magnet rotor 120, toward the magnetic body portions 126a and 126b and allows the magnetic fluxes to pass, so that it is possible to minimize leakage magnetic fluxes and achieve a high allowable torque and a wide range of an acceleration and deceleration ratio.

As described above, in the power transmission device 150 according to the second embodiment, closed magnetic fluxes are effectively induced to the magnetic body portions 126*a* and 126*b* by the magnet array 122 of the low speed magnet rotor 120, so that it is possible to reduce leakage magnetic fluxes of the high speed magnet rotor 110, the low speed magnet rotor 120 and the inductor rotor 130. Further, it is possible to increase magnetic coupling strengths of these rotors and make the outer periphery portion side which is a yoke of the low speed magnet rotor 120 thinner. Furthermore, the closed magnetic fluxes are effectively used and an outer shape of the low speed magnet rotor 120 can be made smaller, so that it is possible to achieve a greater allowable torque while the power transmission device is small.

A principle of acceleration and deceleration of the power transmission device 150 according to the second embodiment is the same as the principle of acceleration and deceleration of the power transmission device 50 according to the first embodiment.

Third Embodiment

Figure 9:
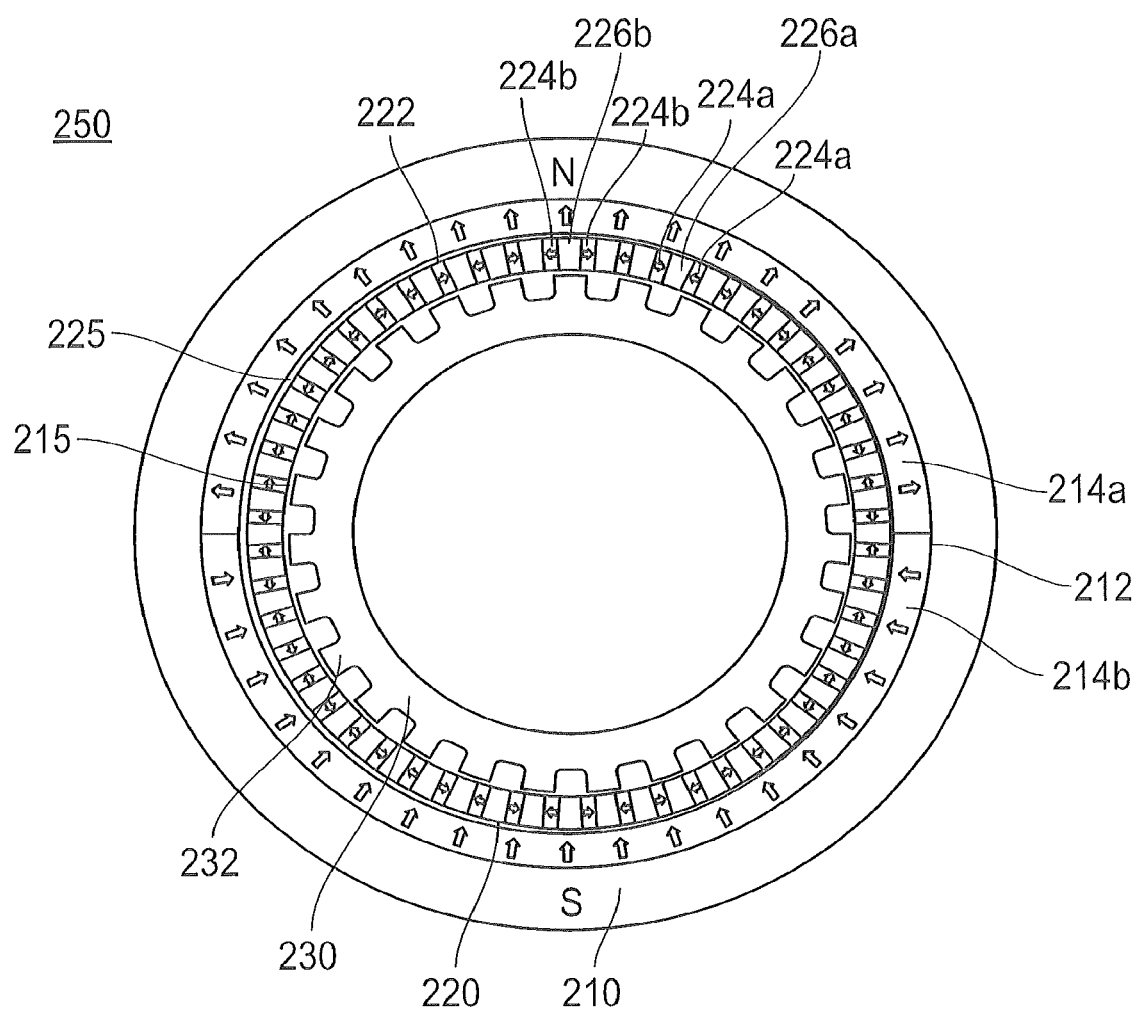
FIG. 9 is a configuration diagram of a power transmission device according to a third embodiment.

Next, a power transmission device according to the third embodiment will be described. FIG. 9 is a configuration diagram of the power transmission device according to the third embodiment.

As illustrated in FIG. 9, a power transmission device 250 according to the third embodiment differs from a power transmission device 50 according to the first embodiment in switching positions of a high speed magnet rotor and an inductor rotor.

<Configuration of Power Transmission Device>

The power transmission device 250 includes a high speed magnet rotor 210, a low speed magnet rotor 220 and an inductor rotor 230. The high speed magnet rotor 210, the low speed magnet rotor 220 and the inductor rotor 230 are concentrically arranged. In the present embodiment, the inductor rotor 230 of the smallest diameter is arranged on an innermost side, and the high speed magnet rotor 210 of the largest diameter is arranged on an outermost side. The low speed magnet rotor 220 is arranged between the high speed magnet rotor 210 and the inductor rotor 230 such that the inductor rotor 230 and a gap 215 are formed and the high speed magnet rotor 210 and a gap 225 are formed. The three rotors are rotatably supported independently.

The high speed magnet rotor 210 includes a magnet array 212 which has two semicircular permanent magnets 214*a* and 214*b* which are magnetized in the radial direction. The magnet array 212 is arranged in the inner periphery portion of the high speed magnet rotor 210. An inner periphery side of the permanent magnet 214*a* is magnetized as the S pole and the outer periphery side is magnetized as the N pole, and the inner periphery side of the permanent magnet 214*b* is magnetized as the N pole and the outer periphery side is magnetized as the S pole. Hence, the high speed magnet rotor 210 includes a pair of the N pole on the upper side and the S pole on the upper side in FIG. 9. The other configuration of the high speed magnet rotor 210 is the same as that of the first embodiment.

Across a magnetic body portion 226*a* of the low speed magnet rotor 220, the two permanent magnets 224*a* are arranged from both sides of the circumferential direction such that the N pole sides face each other. Further, across a magnetic body portion 226*b* of the low speed magnet rotor 220, the two permanent magnets 224*b* are arranged from both sides of the circumferential direction such that the S pole sides face each other. Consequently, it is possible to induce magnetic fluxes from magnetic teeth 232 of the inductor rotor 230 to the magnetic body portions 226*a*, and induce magnetic fluxes which flow into the magnetic body portions 226*b* from the magnetic teeth 232 and reach the permanent magnet 214*a* of the high speed magnet rotor 210 and which are likely to become leakage magnetic fluxes, to the magnetic body portions 226*a* by magnetic forces of the permanent magnets 224*b*.

Thus, the magnet array 222 aligns the magnetic fluxes which pass through the low speed magnet rotor 220, toward the magnetic body portions 226*a*. The magnet array 222 aligns most of the magnetic fluxes which pass through the low speed magnet rotor 220, toward the magnetic body portions 226*a* and allows the magnetic fluxes to pass, so that it is possible to eliminate leakage magnetic fluxes and effectively convert the magnetic fluxes into a torque.

The inductor rotor 230 allows magnetic fluxes from the magnet array 212 of the high speed magnet rotor 210 to pass toward the low speed magnet rotor 220. In an outer periphery portion of the inductor rotor 230, twenty seven magnetic teeth 232 which project toward the outer periphery side are formed at fixed intervals and along the circumferential direction. The other configuration of the inductor rotor 230 is the same as that of the first embodiment.

In the power transmission device 250 according to the third embodiment, the number of pairs of magnetic poles of the high speed magnet rotor 210, the number of pairs of magnetic poles of the low speed magnet rotor 220 and the number of magnetic teeth of the inductor rotor 230 are the same as those of the power transmission device 50 according to the first embodiment.

In the power transmission device 250 according to the third embodiment, the magnet array 222 of the low speed magnet rotor 220 effectively induces closed magnetic fluxes to the magnetic body portions 226*a*, so that it is possible to reduce leakage magnetic fluxes of the high speed magnet rotor 210, the low speed magnet rotor 220 and the inductor rotor 230. Further, it is possible to increase magnetic coupling strengths of these rotors and make the outer periphery portion side which is a yoke of the high speed magnet rotor 210 thinner. Furthermore, the closed magnetic fluxes are effectively used and an outer shape of the high speed magnet rotor 210 can be made smaller, so that it is possible to achieve a high allowable torque while the power transmission device is small.

<Operation of Power Transmission Device>

A principle of acceleration and deceleration of the power transmission device 250 according to the third embodiment is the same as the principle of acceleration and deceleration of the power transmission device 50 according to the first embodiment.

Fourth Embodiment

Figure 10:
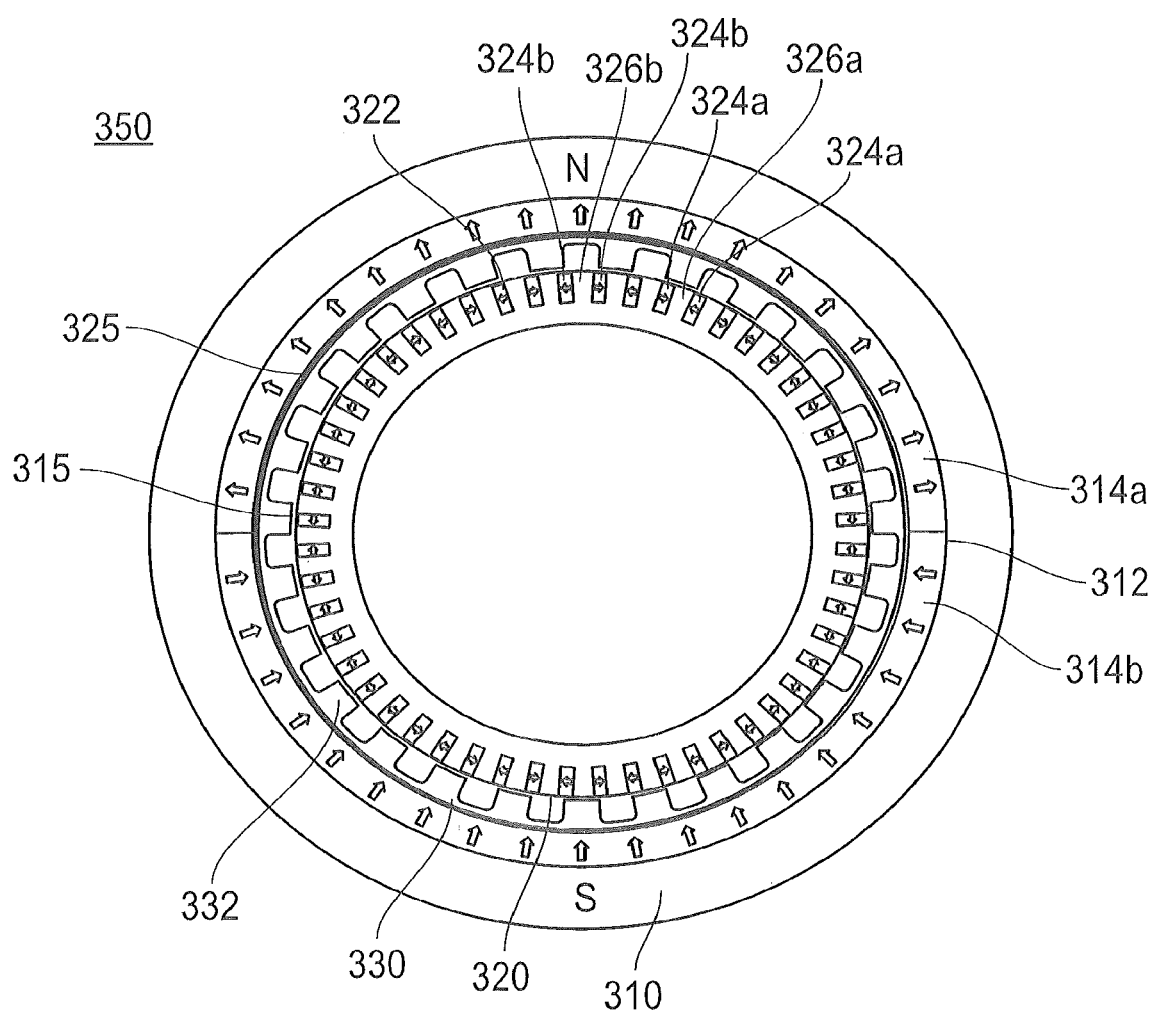
FIG. 10 is a configuration diagram of a power transmission device according to a fourth embodiment.

Next, a power transmission device according to the fourth embodiment will be described. FIG. 10 is a configuration diagram of the power transmission device according to the fourth embodiment.

As illustrated in FIG. 10, a power transmission device 350 according to the fourth embodiment differs from a power transmission device 250 according to the third embodiment in switching positions of a low speed magnet rotor and an inductor rotor.

<Configuration of Power Transmission Device>

The power transmission device 350 includes a high speed magnet rotor 310, a low speed magnet rotor 320 and an inductor rotor 330. The high speed magnet rotor 310, the low speed magnet rotor 320 and the inductor rotor 330 are concentrically arranged. In the present embodiment, the low speed magnet rotor 320 of the smallest diameter is arranged on an innermost side, and the high speed magnet rotor 310 of the largest diameter is arranged on an outermost side. The inductor rotor 330 is arranged between the low speed magnet rotor 320 and the high speed magnet rotor 310 such that the low speed magnet rotor 320 and a gap 315 are formed and the high speed magnet rotor 310 and a gap 325 are formed. The three rotors are rotatably supported independently.

The high speed magnet rotor 310 is the same as that of the power transmission device 250 according to the third embodiment.

Fifty two concave portions are formed in the low speed magnet rotor 320 at fixed intervals and in the circumferential direction. In the respective concave portions, fifty two permanent magnets 324a, 324b and . . . magnetized in the circumferential direction are embedded. An inner periphery portion of the low speed magnet rotor 320 needs to allow magnetic fluxes to pass, and therefore the depth of the concave portions is about half as the thickness of the low speed magnet rotor 320.

Across a magnetic body portion 326a, the two permanent magnets 324a are arranged from both sides of the circumferential direction such that the N pole sides face each other. Further, across a magnetic body portion 326b of the low speed magnet rotor 320, the two permanent magnets 324b are arranged from both sides of the circumferential direction such that the S pole sides face each other. Consequently, it is possible to induce magnetic fluxes of the magnetic body portions 326a to magnetic teeth 332 of the inductor rotor 330 and induce magnetic fluxes which flow into the magnetic body portions 326b from the magnetic teeth 332 and which are likely to become leakage magnetic fluxes, to the magnetic body portions 326a and 326b by magnetic forces of the permanent magnets 324a and 324b.

Thus, the magnet array 322 aligns the magnetic fluxes which pass through the low speed magnet rotor 320, toward the magnetic body portions 326a. The magnet array 322 aligns most of the magnetic fluxes which pass through the low speed magnet rotor 320, toward the magnetic body portions 326a and allows the magnetic fluxes to pass, so that it is possible to eliminate leakage magnetic fluxes and effectively convert the magnetic fluxes into a torque.

The inductor rotor 330 allows magnetic fluxes from the low speed magnet rotor 320 to pass toward the high speed magnet rotor 310. In an inner periphery portion of the inductor rotor 330, the twenty seven magnetic teeth 332 which project toward the inner periphery side are formed at fixed intervals and along the circumferential direction. The other configuration of the inductor rotor 330 is the same as that of the first embodiment.

In the power transmission device 350 according to the fourth embodiment, the number of pairs of magnetic poles of the high speed magnet rotor 310, the number of pairs of magnetic poles of the low speed magnet rotor 320 and the number of magnetic teeth of the inductor rotor 330 are the same as those of the power transmission device 50 according to the first embodiment.

In the power transmission device 350 according to the fourth embodiment, the magnet array 322 of the low speed magnet rotor 320 effectively induces closed magnetic fluxes to the magnetic body portions 326a, so that it is possible to reduce leakage magnetic fluxes of the high speed magnet rotor 310, the low speed magnet rotor 320 and the inductor rotor 330. Further, it is possible to increase magnetic coupling strengths between these rotors and make the outer periphery portion side which is a yoke of the high speed magnet rotor 310 thinner. Furthermore, the closed magnetic fluxes are effectively used and an outer shape of the high speed magnet rotor 310 can be made smaller, so that it is possible to achieve a high allowable torque while the power transmission device is small.

<Operation of Power Transmission Device>

A principle of acceleration and deceleration of the power transmission device 350 according to the fourth embodiment is the same as the principle of acceleration and deceleration of the power transmission device 50 according to the first embodiment.

Fifth Embodiment

Figure 11:
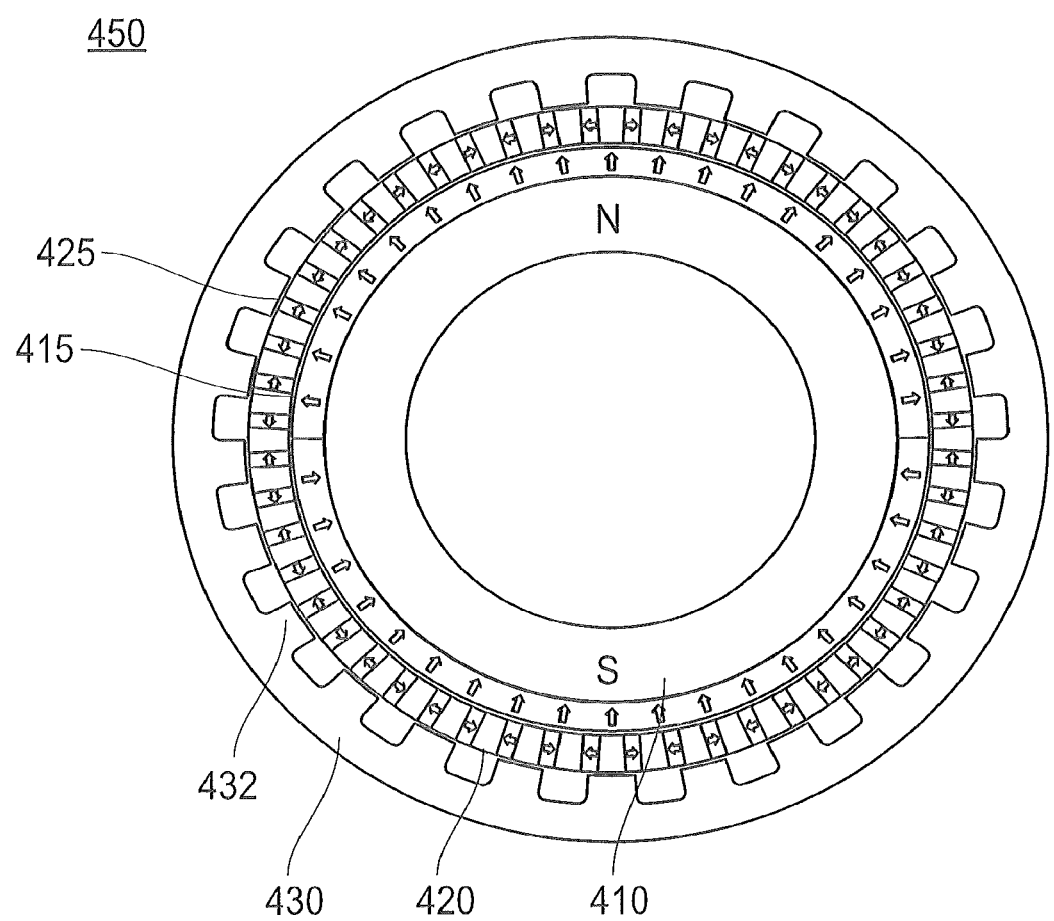
FIG. 11 is a configuration diagram of a power transmission device according to a fifth embodiment.

Next, a power transmission device according to the fifth embodiment will be described. FIG. 11 is a configuration diagram of the power transmission device according to the fifth embodiment.

A configuration and an operation of a power transmission device 450 according to the present embodiment are substantially the same as a configuration and an operation of a power transmission device 50 according to the first embodiment.

<Configuration of Power Transmission Device>

A power transmission device 450 includes a high speed magnet rotor 410, a low speed magnet rotor 420 and an inductor rotor 430. The high speed magnet rotor 410, the low speed magnet rotor 420 and the inductor rotor 430 are concentrically arranged. The low speed magnet rotor 420 is arranged between the high speed magnet rotor 410 and the inductor rotor 430 such that the high speed magnet rotor 410 and a gap 415 areformed and the inductor rotor 430 and a gap 425 are formed.

Configurations of the high speed magnet rotor 410 and the low speed magnet rotor 420 are the same as configurations of a high speed magnet rotor 10 and a low speed magnet rotor 20 of the power transmission device 50 according to the first embodiment. Further, a configuration of the inductor rotor 430 differs from a configuration (the number of magnetic teeth is twenty seven) of an inductor rotor 30 of the power transmission device 50 according to the first embodiment in that the number of teeth of magnetic teeth 432 is twenty five. The other configuration is the same as the configuration of the power transmission device 50 according to the first embodiment.

In case of the power transmission device 450 according to the fifth embodiment, the number of poles of the high speed magnet rotor 410 is 2a=2, the number of poles of the low speed magnet rotor 420 is 2b=52, the number of magnetic teeth of the inductor rotor 430 is c=25, and coefficient d=−1 holds, and then, by substituting a=1, b=26, c=25 and d=−1 in above equation 2, $\alpha = -26 \cdot \beta - 25 \cdot \gamma$ holds.

When one of the three rotors is fixed, the speeds of the other two rotors can be represented as follows.

When the high speed magnet rotor 410 is fixed, $26 \cdot \beta = 25 \cdot \gamma$ holds, and, when the low speed magnet rotor 420 is rotated twenty five times, the inductor rotor 430 is rotated twenty six times and, by contrast with this, when the inductor rotor 430 is rotated twenty six times, the low speed magnet rotor 420 is rotated twenty five times.

When the low speed magnet rotor 420 is fixed, $\alpha = -25 \cdot \gamma$ holds, and, when the high speed magnet rotor 410 is rotated twenty five times, the inductor rotor 430 is rotated one time in a direction opposite to the high speed magnet rotor 410 and, by contrast with this, when the inductor rotor 430 is rotated one time, the high speed magnet rotor 410 is rotated twenty-five times in a direction opposite to the inductor rotor 430.

When the inductor rotor 430 is fixed, α=26·β holds, and, when the high speed magnet rotor 410 is rotated twenty six times, the low speed magnet rotor 420 is rotated one time and, by contrast with this, when the low speed magnet rotor 420 is rotated one time, the high speed magnet rotor 410 is rotated twenty six times.

<Operation of Power Transmission Device>

Figure 12:
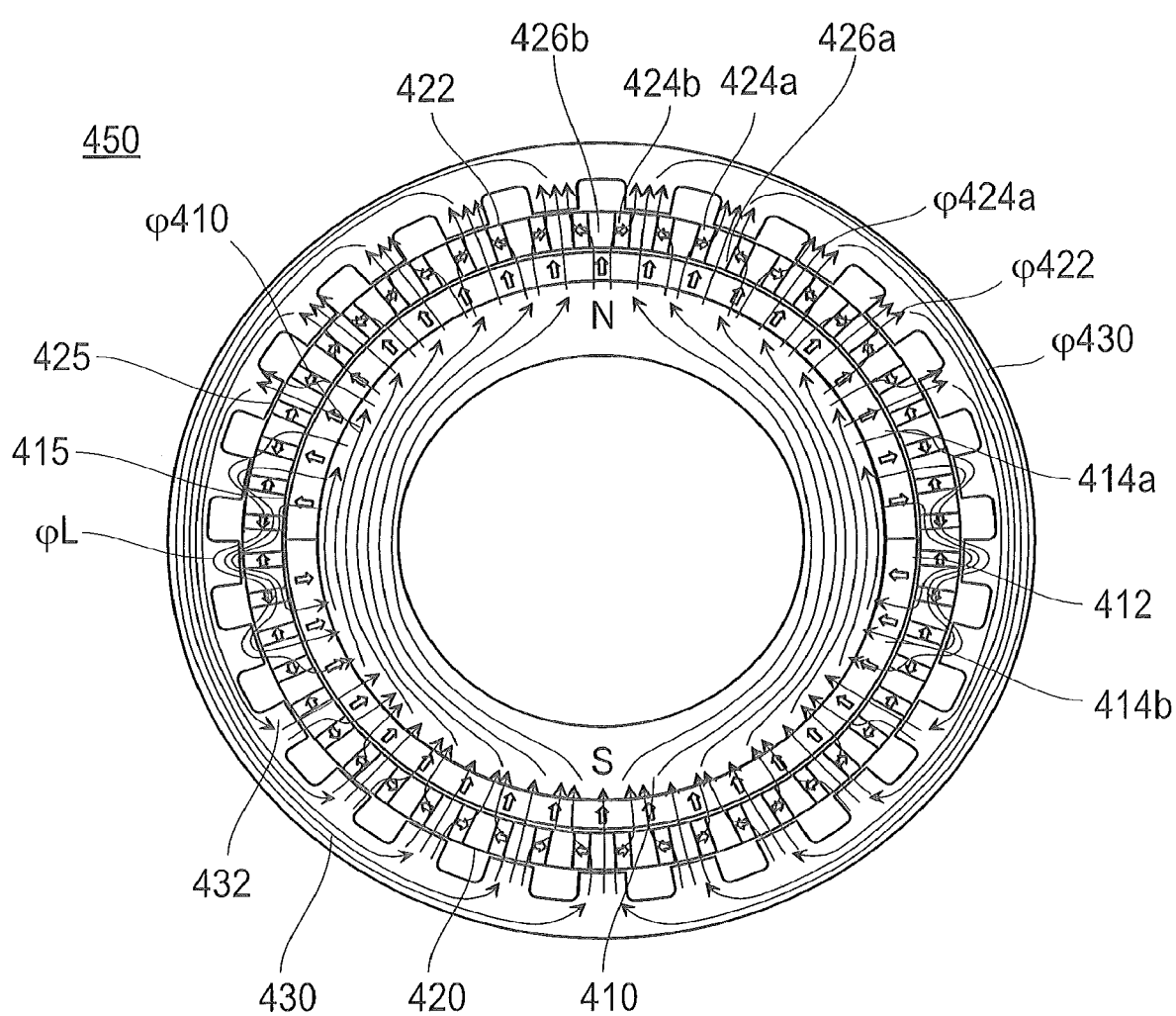
FIG. 12 is an explanatory view of closed magnetic fields formed in the power transmission device in FIG. 11.

Next, closed magnetic fields formed in the power transmission device 450 will be described. FIG. 12 is an explanatory view of closed magnetic fields formed in the power transmission device 450 in FIG. 11.

As illustrated in FIG. 12, in the high speed magnet rotor 410, magnetic fluxes φ410 which flow from a permanent magnet 414b to a permanent magnet 414a distribute in two ways of the right and the left in a cylinder of the high speed magnet rotor 410. The magnetic fluxes which flow from the permanent magnet 414a of the high speed magnet rotor 410 to the inductor rotor 430 pass through magnetic body portions 426a of the low speed magnet rotor 420 from the two routes.

One route is a first route which goes into the permanent magnet 424a once from the permanent magnet 414a and reaches the magnetic tooth 432 of the inductor rotor 430 from the magnetic body portion 426a by way of induction by the permanent magnet 424a, and the other one route is a second route which directly goes into the magnetic body portion 426a from the permanent magnet 414a and reaches the magnetic tooth 432 of the inductor rotor 430 from the magnetic body portion 426a. Magnetic fluxes φ424a reach the magnetic teeth 432 of the inductor rotor 430 through the first route. Magnetic fluxes φ422 reach the magnetic teeth 432 of the inductor rotor 430 through the second route.

Across the magnetic body portion 426a of the low speed magnet rotor 420, the two permanent magnets 424a are arranged from both sides of the circumferential direction such that the N pole sides face each other. Further, across the magnetic body portion 426b of the low speed magnet rotor 420, the two permanent magnets 424b are arranged from both sides of the circumferential direction such that the S pole sides face each other. Consequently, it is possible to induce the magnetic fluxes φ422 from the permanent magnet 414a to the magnetic body portions 426a and it is possible to forcibly induce magnetic fluxes which flow into the magnetic body portions 426b from the permanent magnet 414a and reach the magnetic teeth 432 of the inductor rotor 430 and which are likely to become leakage magnetic fluxes, to the magnetic body portions 426a by the magnetic forces of the permanent magnets 424b.

Thus, the magnet array 422 aligns the magnetic fluxes φ422 and φ424a which pass through the low speed magnet rotor 420, toward the magnetic body portions 426a. The magnet array 422 aligns most of the magnetic fluxes which pass through the low speed magnet rotor 420, toward the magnetic body portions 426a and allows the magnetic fluxes to pass, so that it is possible to eliminate leakage magnetic fluxes and effectively convert the magnetic fluxes into a torque.

The magnetic fluxes φ422 and φ424a which pass through the magnetic body portions 426a of the low speed magnet rotor 420 and are induced to the magnetic teeth 432 of the inductor rotor 430 converge in a cylinder of the inductor rotor 430 and become the magnetic fluxes φ430 and distribute in two ways of the right and the left in the inductor rotor 430. The magnetic fluxes φ430 flow toward the magnetic teeth 432 of the inductor rotor 430 which face the permanent magnet 414b of the high speed magnet rotor 410. The magnetic fluxes which flow from the magnetic teeth 432 of the inductor rotor 430 to the permanent magnet 414b of the high speed magnet rotor 410 pass through magnetic body portions 426a and 426b of the low speed magnet rotor 420 from the two routes.

One route is a third route which goes into the permanent magnet 424a once from the magnetic tooth 432 and reaches the permanent magnet 414b from the magnetic body portion 426a by way of induction by the permanent magnet 424a, and the other one route is a fourth route which directly goes into the magnetic body portion 426b from the magnetic tooth 432 and reaches the permanent magnet 414b. The magnetic fluxes φ424a reach the permanent magnet 414b of the high speed magnet rotor 410 through the third route. The magnetic fluxes φ422 reach the permanent magnet 414b of the high speed magnet rotor 410 through the fourth route. In addition, in the magnetic teeth 432 and the low speed magnet rotor 420 positioned at boundaries between the permanent magnets 414a and 414b of the magnetic array 412, loop magnetic fluxes φL which transmit in a loop shape between the magnetic teeth 432, the magnetic body portions 426a and 426b and the permanent magnets 424a and 424b are produced.

Thus, the magnet array 422 aligns the magnetic fluxes φ422 and φ424a which pass through the low speed magnet rotor 420, toward the magnetic body portions 426a and 426b. The magnet array 422 aligns most of the magnetic fluxes which pass through the low speed magnet rotor 420, toward the magnetic body portions 426a and 426b and allow the magnetic fluxes to pass, so that it is possible to minimize leakage magnetic fluxes and achieve a high allowable torque and a wide range of an acceleration and deceleration ratio.

In the power transmission device 450 according to the fifth embodiment, it is possible to reduce leakage magnetic fluxes between the high speed magnet rotor 410, the low speed magnet rotor 420 and the inductor rotor 430 and it is possible to increase magnetic coupling strengths between these rotors and make the outer periphery portion side which is a yoke of the inductor rotor 430 thinner. Further, the closed magnetic fluxes are effectively used and an outer shape of the inductor rotor 430 can be made smaller, so that it is possible to achieve a high allowable torque while the power transmission device is small.

Sixth Embodiment

Figure 13:
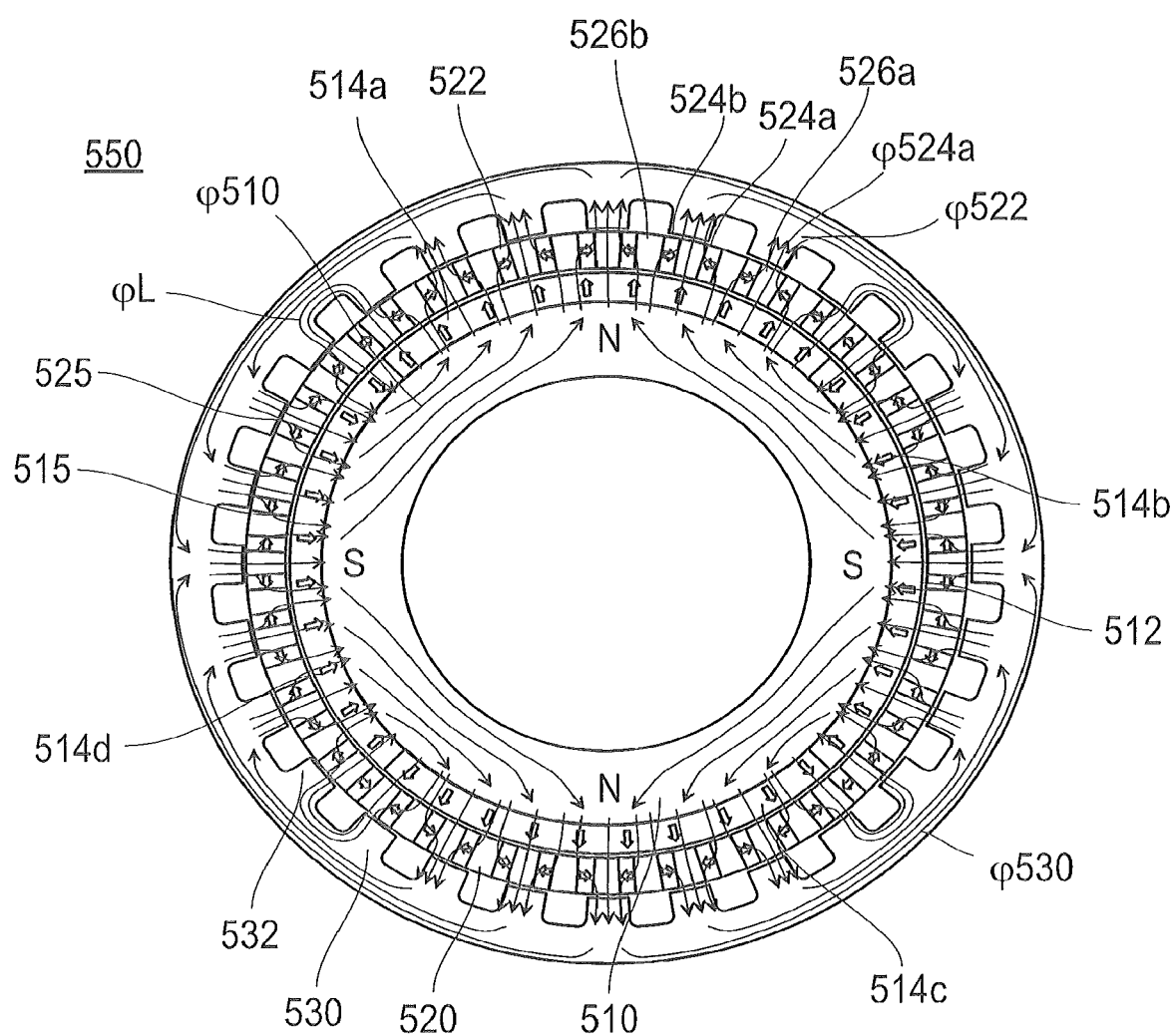
FIG. 13 is an explanatory view of closed magnetic fields formed in the power transmission device according to a sixth embodiment.

Next, a power transmission device according to the sixth embodiment will be described. FIG. 13 is an explanatory view of closed magnetic fields formed in the power transmission device according to the sixth embodiment.

<Configuration of Power Transmission Device>

A power transmission device 550 includes a high speed magnet rotor 510, a low speed magnet rotor 520 and an inductor rotor 530. The high speed magnet rotor 510, the low speed magnet rotor 520 and the inductor rotor 530 are concentrically arranged. The low speed magnet rotor 520 is arranged between the high speed magnet rotor 510 and the inductor rotor 530 such that the high speed magnet rotor 510 and a gap 515 are formed and the inductor rotor 530 and a gap 525 are formed.

In the present embodiment, the number of poles of the high speed magnet rotor 510 is four, the number of poles of the low speed magnet rotor 520 is fifty two and the number of magnetic teeth of the inductor rotor 530 is twenty eight. The other configuration is the same as the configuration of the power transmission device 50 according to the first embodiment.

In case of the power transmission device 550 according to the sixth embodiment, the number of poles of the high speed magnet rotor 510 is 2a=4, the number of poles of the low speed magnet rotor 520 is 2b=52, the number of magnetic teeth of the inductor rotor 530 is c=28 and coefficient d=1, and then, by substituting a=2, b=26, c=28 and d=1 in above equation 2, α=−13·β+14·γ holds.

When one of the three rotors is fixed, the speeds of the other two rotors can be represented as follows.

When the high speed magnet rotor 510 is fixed, 13·β=14·γ holds, and, when the low speed magnet rotor 520 is rotated fourteen times, the inductor rotor 530 is rotated thirteen times and, by contrast with this, when the inductor rotor 530 is rotated thirteen times, the low speed magnet rotor 520 is rotated fourteen times.

When the low speed magnet rotor 520 is fixed, α=14·γ holds, and, when the high speed magnet rotor 510 is rotated fourteen times, the inductor rotor 530 is rotated one time and, by contrast with this, when the inductor rotor 530 is rotated one time, the high speed magnet rotor 510 is rotated fourteen times.

When the inductor rotor 530 is fixed, α=−13·β holds, and, when the high speed magnet rotor 510 is rotated thirteen times, the low speed magnet rotor 520 is rotated one time in a direction opposite to the high speed magnet rotor 510 and, by contrast with this, when the low speed magnet rotor 520 is rotated one time, the high speed magnet rotor 510 is rotated thirteen times in a direction opposite to the low speed magnet rotor 520.

<Operation of Power Transmission Device>

Next, closed magnetic fields formed in the power transmission device 550 will be described.

As illustrated in FIG. 13, magnetic fluxes φ510 which include magnetic fluxes which flow from permanent magnets 514*b* and 514*d* toward a permanent magnet 514*a* and magnetic fluxes which flow from the permanent magnets 514*b* and 514*d* toward a permanent magnet 514*c* are formed in the high speed magnet rotor 510. Hence, in the high speed magnet rotor 510, magnetic fluxes distribute such that four areas are equally divided. The magnetic fluxes which flow from the permanent magnet 514*a* and 514*c* of the high speed magnet rotor 510 to the inductor rotor 530 pass through the magnetic body portions 526*a* of the low speed magnet rotor 520 from the two routes.

One route is a first route which goes into a permanent magnet 524*a* once from the permanent magnets 514*a* and 514*c* and reaches a magnetic tooth 532 of the inductor rotor 530 from the magnetic body portion 526*a* by way of induction by the permanent magnet 524*a*, and the other one route is a second route directly goes into the magnetic body portion 526*a* from the permanent magnets 514*a* and 514*c* and reaches the magnetic tooth 532 of the inductor rotor 530 from the magnetic body portion 526*a*. Magnetic fluxes φ524*a* reach the magnetic teeth 532 of the inductor rotor 530 through the first route. Magnetic fluxes φ522 reach the magnetic teeth 532 of the inductor rotor 530 through the second route.

Across the magnetic body portion 526*a* of the low speed magnet rotor 520, the two permanent magnets 524*a* are arranged from both sides of the circumferential direction such that the N pole sides face each other. Further, across the magnetic body portion 526*b* of the low speed magnet rotor 520, the two permanent magnets 524*b* are arranged from both sides of the circumferential direction such that the S pole sides face each other. Consequently, it is possible to induce the magnetic fluxes φ522 from the permanent magnet 514*a* and 514*c* to the magnetic body portions 526*a* and it is possible to forcibly induce magnetic fluxes which flow into the magnetic body portions 526*b* from the permanent magnet 514*a* and reach the magnetic teeth 532 of the inductor rotor 530 and which are likely to become leakage magnetic fluxes, to the magnetic body portions 526*a* by the magnetic forces of the permanent magnets 524*b*.

Thus, the magnet array 522 aligns the magnetic fluxes φ522 and φ524*a* which pass through the low speed magnet rotor 520, toward the magnetic body portions 526*a*. The magnet array 522 aligns most of the magnetic fluxes which pass through the low speed magnet rotor 520, toward the magnetic body portions 526*a* and allows the magnetic fluxes to pass, so that it is possible to eliminate leakage magnetic fluxes and effectively convert the magnetic fluxes into a torque.

The magnetic fluxes φ522 and φ524*a* which pass through the magnetic body portions 526*a* of the low speed magnet rotor 520 and are induced to the magnetic teeth 532 of the inductor rotor 530 converge in a cylinder of the inductor rotor 530, become magnetic fluxes φ530 and distribute in four areas in the inductor rotor 530. The magnetic fluxes φ530 flow toward the magnetic teeth 532 of the inductor rotor 530 which face the permanent magnet 514*b* and 514*d* of the high speed magnet rotor 510. The magnetic fluxes which flow from the magnetic teeth 532 of the inductor rotor 530 to the permanent magnet 514*b* and 514*d* of the high speed magnet rotor 510 pass through the magnetic body portions 526*a* and 526*b* of the low speed magnet rotor 520 from the two routes.

One route is a third route which goes into the permanent magnet 524*a* once from the magnetic tooth 532 and reaches the permanent magnet 514*b* and 514*d* from the magnetic body portion 526*a* by way of induction by the permanent magnet 524*a*, and the other one route is a fourth route which directly goes into the magnetic body portion 526*b* from the magnetic tooth 532 and reaches the permanent magnet 514*b* and 514*d*. The magnetic fluxes φ524*a* reach the permanent magnet 514*b* and 514*d* of the high speed magnet rotor 510 through the third route. The magnetic fluxes φ522 reach the permanent magnet 514*b* and 514*d* of the high speed magnet rotor 510 through the fourth route. In addition, in the magnetic teeth 532 and the low speed magnet rotor 520 positioned at a boundary between the permanent magnet 514*a* and 514*b* of the magnet array 512, a boundary between the permanent magnet 514*a* and 514*d*, a boundary between permanent magnets 514*c* and 514*b* and a boundary between permanent magnets 514*c* and 514*d*, loop magnetic fluxes φL, which transmit in a loop shape between the magnetic teeth 532, the magnetic body portions 526*a* and 526*b* and the permanent magnets 424*a*, 424*b*, 424*c* and, 424*d* are produced.

Thus, the magnet array 522 aligns the magnetic fluxes φ522 and φ524*a* which pass through the low speed magnet rotor 520, toward the magnetic body portions 526*a* and 526*b*. The magnet array 522 aligns most of the magnetic fluxes which pass through the low speed magnet rotor 520, toward the magnetic body portions 526*a* and 526*b* and allows the magnetic fluxes to pass, so that it is possible to minimize leakage magnetic fluxes and achieve a high allowable torque and a wide range of an acceleration and deceleration ratio.

The power transmission device 550 according to the sixth embodiment can reduce leakage magnetic fluxes between the high speed magnet rotor 510, the low speed magnet rotor 520 and the inductor rotor 530, and increase magnetic coupling strengths between these rotors. By making the thickness of the outer periphery side which is a yoke of the inductor rotor 530 adequate, it is possible to achieve a high allowable torque while the power transmission device is small.

Seventh Embodiment

Figure 14:
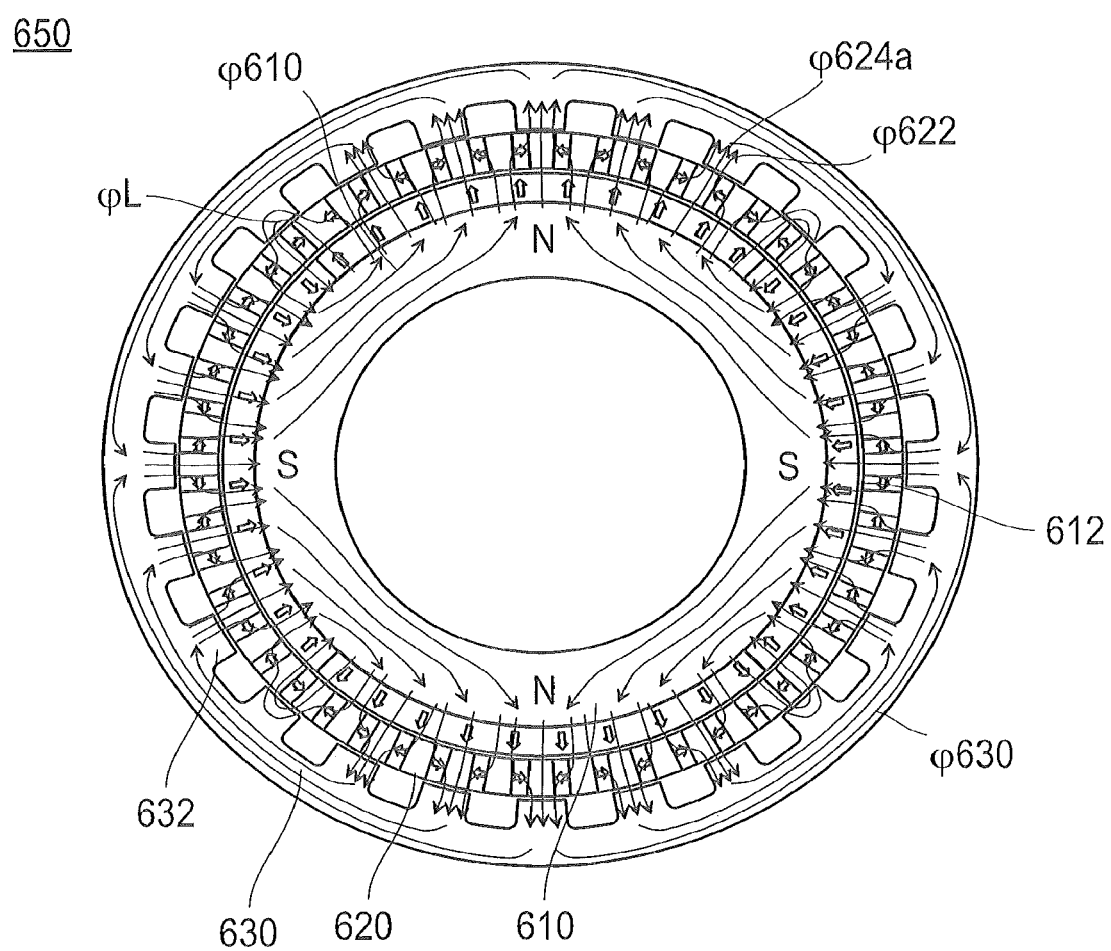
FIG. 14 is an explanatory view of closed magnetic fields formed in the power transmission device according to a seventh embodiment.

Next, a power transmission device according to the seventh embodiment will be described. FIG. 14 is an explanatory view of closed magnetic fields formed in the power transmission device according to the seventh embodiment.

<Configuration of Power Transmission Device>

A configuration of a power transmission device 650 is substantially the same as a configuration of a power transmission device 550 according to the sixth embodiment. That is, in the present embodiment, the number of poles of a high speed magnet rotor 610 is four, the number of poles of a low speed magnet rotor 620 is fifty two and the number of magnetic teeth of an inductor rotor 630 is twenty five. The other configuration is the same as the configuration of the power transmission device 550 according to the sixth embodiment.

In case of the power transmission device 650 according to the seventh embodiment, the number of poles of the high speed magnet rotor 510 is 2a=4, the number of poles of the low speed magnet rotor 520 is 2b=52, the number of magnetic teeth of the inductor rotor 530 is c=24 and coefficient d=−1 holds, and then, by substituting a=2, b=26, c=24 and d=−1 in above equation 2, $\alpha=13\cdot\beta-12\cdot\gamma$ holds.

When one of the three rotors is fixed, the speeds of the other two rotors can be represented as follows.

When the high speed magnet rotor 610 is fixed, $13\cdot\beta=12\cdot\gamma$ holds, and, when the low speed magnet rotor 620 is rotated twelve times, the inductor rotor 630 is rotated thirteen times and, by contrast with this, when the inductor rotor 630 is rotated thirteen times, the low speed magnet rotor 620 is rotated twelve times.

When the low speed magnet rotor 620 is fixed, $\alpha=-12\cdot\gamma$ holds, and, when the high speed magnet rotor 610 is rotated twenty twelve times, the inductor rotor 630 is rotated one time in a direction opposite to the high speed magnet rotor 610 and, by contrast with this, when the inductor rotor 630 is rotated one time, the high speed magnet rotor 610 is rotated twelve times in a direction opposite to the inductor rotor 630.

When the inductor rotor 630 is fixed, $\alpha=13\cdot\beta$ holds, and, when the high speed magnet rotor 610 is rotated thirteen times, the low speed magnet rotor 620 is rotated one time and, by contrast with this, when the low speed magnet rotor 620 is rotated one time, the high speed magnet rotor 610 is rotated thirteen times.

<Operation of Power Transmission Device>

Next, closed magnetic fields formed in the power transmission device 650 will be described.

As illustrated in FIG. 14, magnetic fluxes $\varphi 610$ formed in the high speed magnet rotor 610 are the same as magnetic fluxes $\varphi 510$ in FIG. 13 described in the sixth embodiment. Further, magnetic fluxes $\varphi 622$ and $\varphi 624a$ formed between the low speed magnet rotor 620 and the inductor rotor 630 are substantially the same as magnetic fluxes $\varphi 522$ and $\varphi 524a$ in FIG. 13 described in the sixth embodiment. Furthermore, magnetic fluxes $\varphi 630$ formed in the inductor rotor 630 are also substantially the same as magnetic fluxes $\varphi 530$ in FIG. 13 described in the sixth embodiment.

In addition, although loop magnetic fluxes $\varphi L$ which is illustrated in FIG. 14 are produced in magnetic teeth 632 and the low speed magnet rotor 620 positioned at each boundary between four permanent magnets which form a magnet array 612, the loop magnetic fluxes $\varphi L$ are also substantially the same as loop magnetic fluxes $\varphi L$ in FIG. 13 described in the sixth embodiment.

The power transmission device 650 according to the seventh embodiment can reduce leakage magnetic fluxes between the high speed magnet rotor 610, the low speed magnet rotor 620 and the inductor rotor 630, and increase magnetic coupling strengths between these rotors. By making the thickness of the outer periphery side which is a yoke of the inductor rotor 630 adequate, it is possible to achieve a high allowable torque while the power transmission device is small.

Eighth Embodiment

Next, a power transmission device according to the eighth embodiment will be described. Unlike power transmission devices according to the first to seventh embodiments, the power transmission device according to the eighth embodiment has four rotors. When the power transmission device includes four rotors, surfaces to which a torque is applied are two top and back surfaces of two rotors, so that it is possible to produce a greater allowable torque and achieve further miniaturization.

Figure 15:
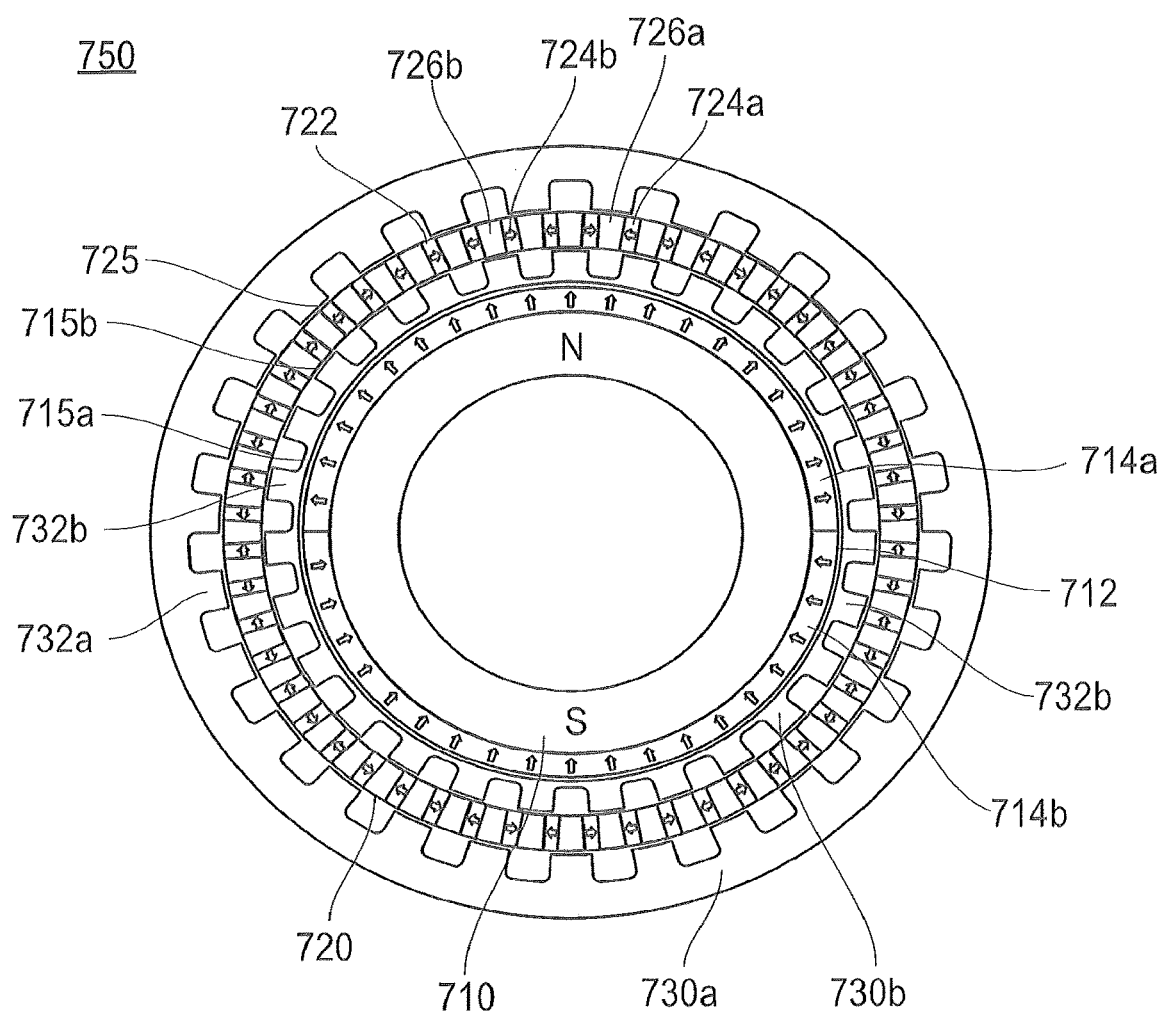
FIG. 15 is a configuration diagram of a power transmission device according to an eighth embodiment.
Figure 16:
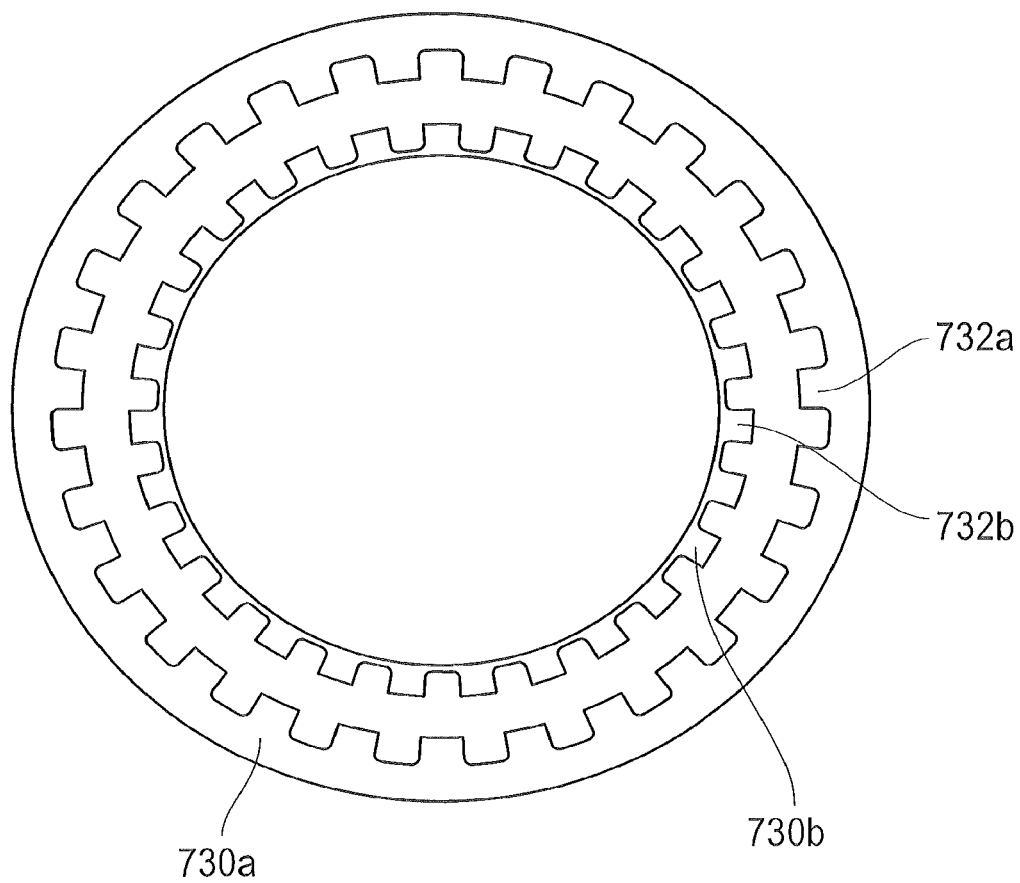
FIG. 16 is a configuration diagram of contra-inductor rotors of the power transmission device in FIG. 15.

FIG. 15 is a configuration diagram of the power transmission device according to the eighth embodiment. FIG. 16 is a configuration diagram of contra-inductor rotors of the power transmission device in FIG. 15. Hereinafter, a configuration and an operation of the power transmission device according to the present embodiment will be described.

<Configuration of Power Transmission Device>

FIG. 15 is a configuration diagram of the power transmission device according to the present embodiment, and illustrates a cross section obtained by cutting the power transmission device in a direction orthogonal to a rotation axis direction of the power transmission device. In addition, directions of arrows illustrated in FIG. 15 are magnetizing directions of permanent magnets, and arrow directions of the arrows indicate the N pole and base directions of the arrows indicate the S pole.

A power transmission device 750 includes a high speed magnet rotor 710, a low speed magnet rotor 720 and contra-inductor rotor 730a and 730b. The high speed magnet rotor 710, the low speed magnet rotor 720 and the contra-inductor rotor 730a and 730b are concentrically arranged. In the present embodiment, the high speed magnet rotor 710 of the smallest diameter is arranged on an innermost side, and the contra-inductor rotor 730a of the largest diameter is arranged on an outermost side. The contra-inductor rotor 730b of a larger diameter than that of the high speed magnet rotor 710 and the low speed magnet rotor 720 of a larger diameter than that of the contra-inductor rotor 730b are arranged between the high speed magnet rotor 710 and the contra-inductor rotor 730a. The contra-inductor rotor 730b is arranged such that the high speed magnet rotor 710 and a gap 715a are formed, the low speed magnet rotor 720 is arranged such that the contra-inductor rotor 730b and a gap 715b are formed and the contra-inductor rotor 730a and a gap 725 are formed, respectively. The high speed magnet rotor 710, the low speed magnet rotor 720 and the contra-inductor rotors 730a and 730b are rotatably supported independently. In addition, the contra-inductor rotors 730a and 730b may be a mechanically connected double structure.

The high speed magnet rotor 710 includes a magnet array 712 which includes two semicircular permanent magnets 714a and 714b which are magnetized in the radial direction. An inner periphery side of the permanent magnet 714a is magnetized as the S pole and the outer periphery side is magnetized as the N pole, and the inner periphery side of the permanent magnet 714b is magnetized as the N pole and the outer periphery side is magnetized as the S pole Hence, the high speed magnet rotor 710 includes a pair of the N pole on the upper side and the S pole on the lower side in FIG. 15.

Further, although FIG. 15 illustrates as an example that the number of poles of the high speed magnet rotor 710 is two, the number of poles of the high speed magnet rotor 710 may be other than two and, in addition, 2a (a is a natural number equal to or more than two) as described in the sixth and seventh embodiments. When the poles the number of which is 2a are provided in the high speed magnet rotor 710, closed magnetic fields which are described below are formed in 2a areas of the high speed magnet rotor 710.

The high speed magnet rotor 710 is formed using a magnetic body such as a magnetic steel sheet, ferrosilicon, carbon silicon, electromagnetic stainless steel, a powder magnetic core or an amorphous core.

Fifty two concave portions are formed in the low speed magnet rotor 720 at fixed intervals and in the circumferential direction. In the respective concave portions, fifty two permanent magnets 724a, 724b and . . . magnetized in the circumferential direction are embedded. When the permanent magnets 724a, 724b and . . . are embedded in the concave portions, the permanent magnets 724a, 724b and . . . and magnetic body portions 726a, 726b and . . . are alternately arranged in the low speed magnet rotor 720 in the circumferential direction.

The low speed magnet rotor 720 includes a magnet array 722 which is magnetized in a circumferential direction. The magnet array 722 aligns the magnetic fluxes which pass through the low speed magnet rotor 720. The magnet array 722 allows most of magnetic fluxes which pass through the low speed magnet rotor 720 to pass in an aligned state, and, consequently, leakage magnetic fluxes decrease. In the magnet array 722 of the low speed magnet rotor 720, homopolar surfaces (N pole side) of the neighboring permanent magnets 724a and 724a face across through the magnetic body portions 726a and in the circumferential direction, and homopolar surfaces (S pole side) of the neighboring permanent magnets 724b and 724b face across through the magnetic body portions 726b and in the circumferential direction. As to magnetizing directions of the permanent magnets of the low speed magnet rotor 720, arrow directions of the arrows indicate the N pole and base directions of the arrows indicate the S pole. Hence, the two permanent magnets 724a whose N poles face each other are arranged beside the magnetic body portion 726a, and the two permanent magnets 724b whose S poles face each other are arranged beside the magnetic body portion 726b.

In the low speed magnet rotor 720, the magnetic body portions 726a which are sandwiched by the N pole permanent permanents 724a facing each other and the magnetic body portions 726b which are sandwiched by the S pole permanent magnets 724b facing each other are alternately arranged in the circumferential direction of the low speed magnet rotor 720. The fifty two permanent magnets 724a, 724b and . . . are embedded in the low speed magnet rotor 720, and so fifty two magnetic poles are formed.

Similar to the high speed magnet rotor 710, the low speed magnet rotor 720 is formed using a magnetic body such as a magnetic steel sheet, ferrosilicon, carbon silicon, electromagnetic stainless steel, a powder magnetic core or an amorphous core.

The contra-inductor rotor 730b passes magnetic fluxes from the magnet array 712 of the high speed magnet rotor 710, to the magnetic body portions 726a of the low speed magnet rotor 720. Further, the contra-inductor rotor 730b passes magnetic fluxes from the low speed magnet rotor 720, to the magnet array 712 of the high speed magnet rotor 710. In an outer periphery portion of the contra-inductor rotor 730b, twenty seven magnetic teeth 732b which project toward the inner periphery side are formed at fixed intervals and along the circumferential direction. The magnetic teeth 732b take in most of the magnetic fluxes from the high speed magnet rotor 710 and the low speed magnet rotor 720.

Further, the contra-inductor rotor 730a takes in the magnetic fluxes from the low speed magnet rotor 720 through the magnetic body portions, 726a of the low speed magnet rotor 720. Furthermore, the contra-inductor rotor 730a passes magnetic fluxes of the inductor rotor 730a to the magnet array 722 of the low speed magnet rotor 720 through the magnetic body portions 726a and 726b. In an inner periphery portion of the contra-inductor rotor 730a, twenty seven magnetic teeth 732a which project toward the inner periphery side are formed at fixed intervals and along the circumferential direction. The magnetic teeth 732a take in most of magnetic fluxes which pass through the magnetic body portion 726a of the low speed magnet rotor 720.

As illustrated in FIG. 16, the magnetic teeth 732a of the contra-inductor rotor 730a and the magnetic teeth 732b of the contra-inductor rotor 730b are shifted by half a pitch from each other. Hence, as illustrated in FIG. 15, the magnetic teeth 732b of the contra-inductor rotor 730b are positioned between the magnetic teeth 732a of the contra-inductor rotor 730a.

The number of magnetic teeth 732 provided to the contra-inductor rotor 730a and 730b is set by taking into account the number of magnetic poles 2a of the high speed magnet rotor 710 and the number of magnetic poles 2b of the low speed magnet rotor 720 such that, when one of the high speed magnet rotor 710 and the low speed magnet rotor 720 is rotated, the other one can be rotated.

Similar to the high speed magnet rotor 710 and the low speed magnet rotor 720, the contra-inductor rotors 730a and 730b are formed using a magnetic body such as a magnetic steel sheet, ferrosilicon, carbon silicon, electromagnetic stainless steel, a powder magnetic core or an amorphous core.

<Operation of Power Transmission Device>

(Formation of Closed Magnetic Fields)

Figure 17:
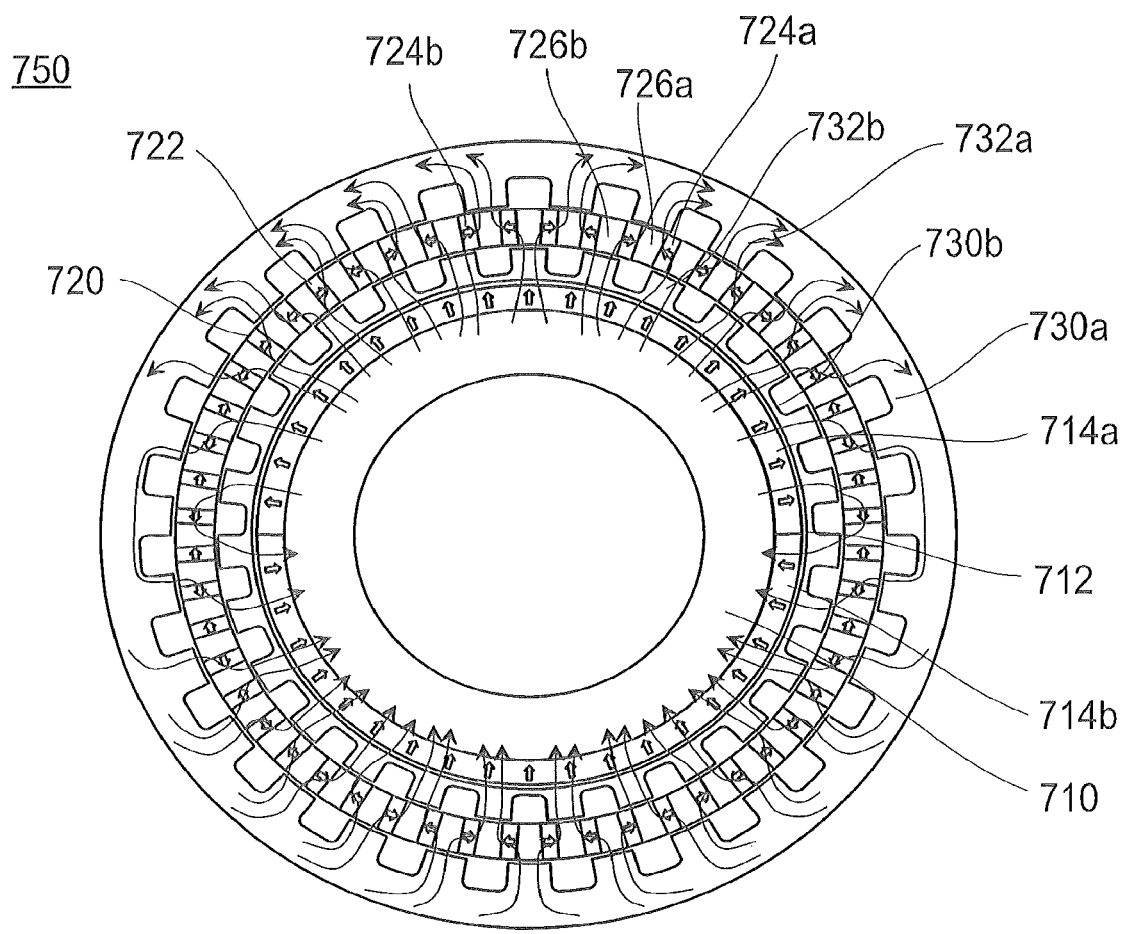
FIG. 17 is an explanatory view of closed magnetic fields formed in the power transmission device in FIG. 15.

First, closed magnetic fields formed in the power transmission device 750 will be described. FIG. 17 is an explanatory view of closed magnetic fields formed in the power transmission device 750 in FIG. 15. In addition, arrows illustrated in FIG. 17 indicate magnetic force lines, and arrow directions of the arrows indicate directions of the magnetic force lines.

In the high speed magnet rotor 710, magnetic fluxes which flow from the permanent magnet 714b to the permanent magnet 714a distribute in two ways of the right and the left in a cylinder of the high speed magnet rotor 710.

The magnetic fluxes from the permanent magnet 714a are induced to the magnetic teeth 732b of the contra-inductor rotor 730b. The magnetic fluxes from the magnetic teeth 732b are induced from the magnetic body portions 726b to the permanent magnets 724a, and reach the magnetic teeth 732a of the contra-inductor rotor 730a from the magnetic body portion 726a.

Across the magnetic body portion 726a of the low speed magnet rotor 720, the two permanent magnets 724a are arranged from both sides of the circumferential direction such that the N pole sides face each other. Further, across the magnetic body portion 726b of the low speed magnet rotor 720, the two permanent magnets 724b are arranged from both sides of the circumferential direction such that the S pole sides face each other. Consequently, it is possible to induce magnetic fluxes from the permanent magnet 714a to the magnetic body portions 726a, and forcibly induce the magnetic fluxes which flow into the magnetic body portions 726b from the permanent magnet 714a and which are likely to become leakage magnetic fluxes, to the magnetic body portions 726a by magnetic forces of the permanent magnets 724a.

Thus, the magnet array 722 aligns the magnetic fluxes which pass through the low speed magnet rotor 720, toward the magnetic body portions 726a. The magnet array 722 aligns most of the magnetic fluxes which pass through the low speed magnet rotor 720, toward the magnetic body portions 726a and allows the magnetic fluxes to pass, so that it is possible to eliminate leakage magnetic fluxes and effectively convert the magnetic fluxes into a torque.

The magnetic fluxes which pass through the magnetic body portions 726a of the low speed magnet rotor 720 and are induced to the magnetic teeth 732a of the contra-inductor rotor 730a converge in a cylinder of the contra-inductor rotor 730a and distribute in two ways of the right and the left in the contra-inductor 730a. The distributed magnetic fluxes flow toward the magnetic teeth 732a of the contra-inductor rotor 730a on a side which faces the permanent magnet 714b of the high speed magnet rotor 710.

Thus, the magnet array 722 aligns the magnetic fluxes which pass through the low speed magnet rotor 720, toward the magnetic body portions 726a and 726b. The magnet array 722 aligns most of the magnetic fluxes which pass through the low speed magnet rotor 720, toward the magnetic body portions 726a and 726b and allows the magnetic fluxes to pass, so that it is possible to eliminate leakage magnetic fluxes and effectively convert the magnetic fluxes into a torque.

(Principle of Acceleration and Deceleration)

Next, as illustrated in FIG. 17, at what number of rotations other rotors rotate when the respective rotors are rotated in a state where closed magnetic fluxes are formed in the high speed magnet rotor 710, the low speed magnet rotor 720 and the contra-inductor rotors 730a and 730b will be described.

In case of the power transmission device according to the eighth embodiment, the number of poles of the high speed magnet rotor 710 is 2a=2, the number of poles of the low speed magnet rotor 720 is 2b=52, the numbers of magnetic teeth of the contra-inductor rotor 730a and 730b are c=27 and coefficient d=1 holds, and then, by substituting a=1, b=26, c=27 and d=1 in equation 2, $\alpha = -26 \cdot \beta + 27 \cdot \gamma$ holds.

When one of the three rotors is fixed, the speeds of the other two rotors can be represented as follows.

When the high speed magnet rotor 710 is fixed, $26 \cdot \beta = 27 \cdot \gamma$ holds, and, when the low speed magnet rotor 720 is rotated twenty seven times, the contra-inductor rotors 730a and 730b are rotated twenty six times and, by contrast with this, when the contra-inductor rotors 730a and 730b are rotated twenty six times, the low speed magnet rotor 720 is rotated twenty seven times.

When the low speed magnet rotor 720 is fixed, $\alpha = 27 \cdot \gamma$ holds, and, when the high speed magnet rotor 710 is rotated twenty seven times, the contra-inductor rotors 730a and 730b are rotated one time and, by contrast with this, when the contra-inductor rotors 730a and 730b are rotated one time, the high speed magnet rotor 710 is rotated twenty seven times.

When the contra-inductor rotors 730a and 730b are fixed, $\alpha = -26 \cdot \beta$ holds, and, when the high speed magnet rotor 710 is rotated twenty six times, the low speed magnet rotor 720 is rotated minus one time (one time in a direction opposite to the high speed magnet rotor 710) and, by contrast with this, when the low speed magnet rotor 720 is rotated one time, the high speed magnet rotor 710 is rotated minus twenty six times (twenty six times in a direction opposite to the low speed magnet rotor 720).

The power transmission device 750 according to the eighth embodiment uses the contra-inductor rotors 730a and 730b. Consequently, surfaces to which a torque is applied are two top and back surfaces of the low speed magnet rotor 720, so that it is possible to produce a greater allowable torque and further miniaturize the power transmission device 750.

Ninth Embodiment

Figure 18:
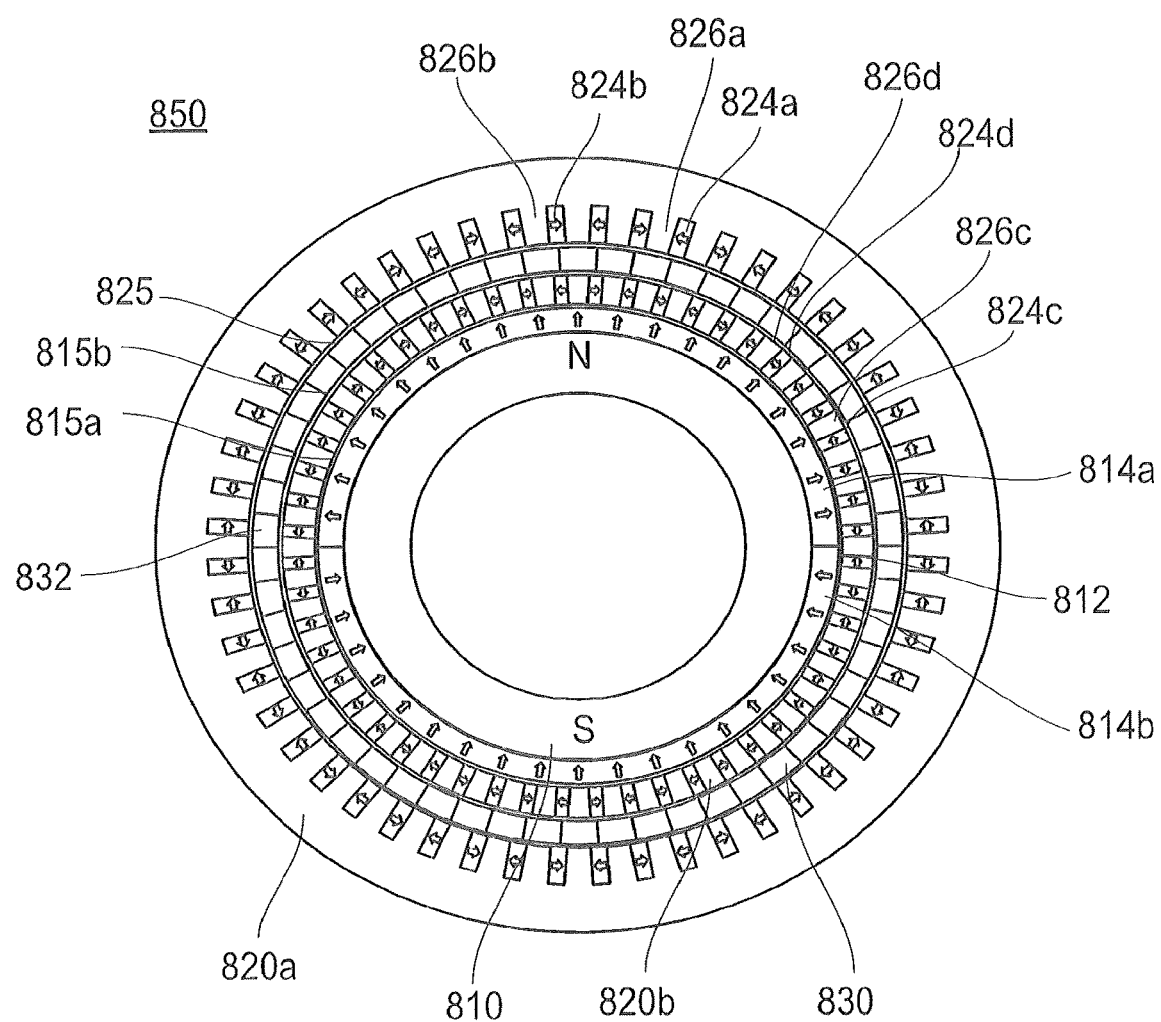
FIG. 18 is a configuration diagram of a power transmission device according to a ninth embodiment.
Figure 19:
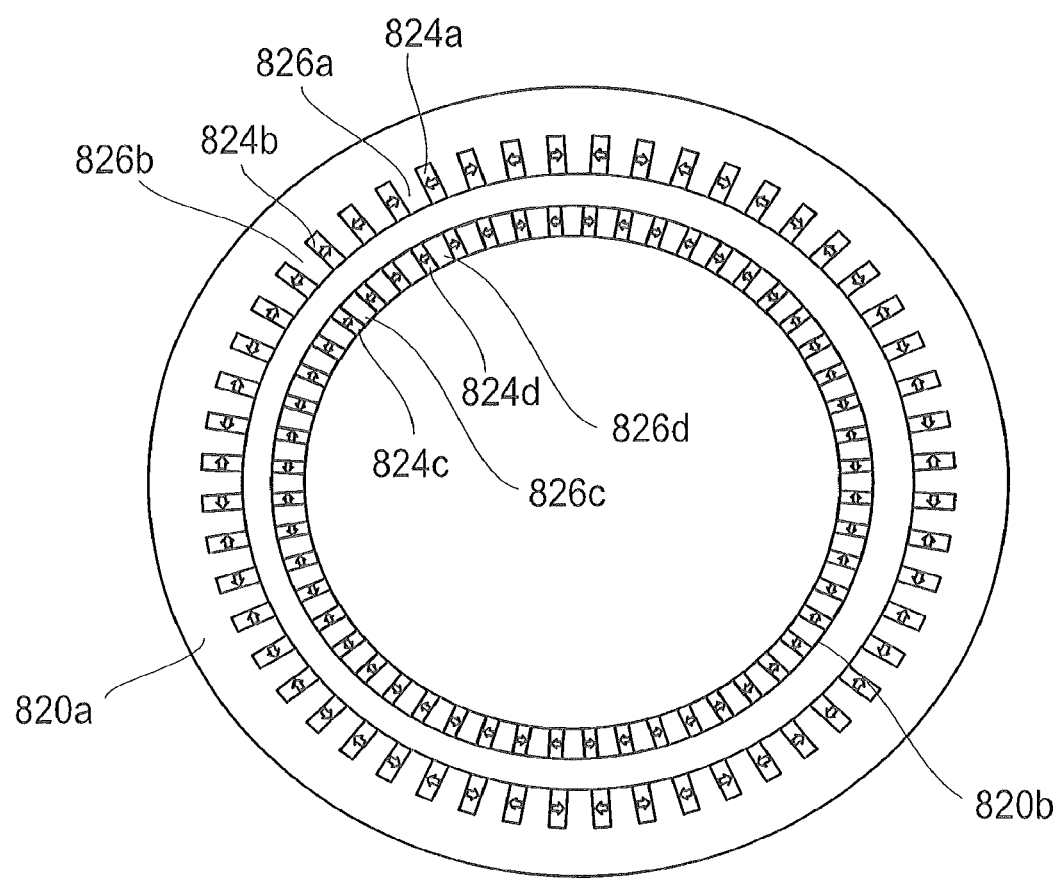
FIG. 19 is a configuration diagram of contra-low speed magnet rotors of the power transmission device in FIG. 18.

Next, a power transmission device according to the ninth embodiment will be described. FIG. 18 is a configuration diagram of the power transmission device according to the ninth embodiment. FIG. 19 is a configuration diagram of contra-low speed magnet rotors of the power transmission device in FIG. 18. Hereinafter, a configuration and an operation of the power transmission device according to the present embodiment will be described.

<Configuration of Power Transmission Device>

A power transmission device 850 includes a high speed magnet rotor 810, contra-low speed magnet rotors 820a and 820b and an inductor rotor 830. The high speed magnet rotor 810, the contra-low speed magnet rotors 820a and 820b and the inductor rotor 830 are concentrically arranged. In the present embodiment, the high speed magnet rotor 810 of the smallest diameter is arranged on an innermost side, and the contra-low speed magnet rotor 820a of the largest diameter is arranged on an outermost side.

The contra-low speed magnet rotor 820b of a larger diameter than that of the high speed magnet rotor 810 and the inductor rotor 830 of a larger diameter than that of the contra-low speed magnet rotor 820b are arranged between the high speed magnet rotor 810 and the contra-low speed magnet rotor 820a. The contra-low speed magnet rotor 820b is arranged such that the high speed magnet rotor 810 and a gap 815a are formed, and the inductor rotor 830 is arranged such that the contra-low speed magnet rotor 820b and a gap

815b, and the contra-low speed magnet rotor 820a and a gap 825 are formed. The high speed magnet rotor 810, the contra-low speed magnet rotors 820a and 820b and the inductor rotor 830 are rotatably supported independently. In addition, the contra-low speed magnet rotors 820a and 820b may be a mechanically connected double structure.

A configuration of the high speed magnet rotor 810 and a configuration of the contra-low speed magnet rotor 820b are the same as configurations of a high speed magnet rotor 710 and a low speed magnet rotor 720 of a power transmission device 750 according to the eighth embodiment.

A configuration of the contra-low speed magnet rotor 820a is the same as a configuration of a low speed magnet rotor 120 of a power transmission device 150 according to the second embodiment.

Across a magnetic body portion 826a of the contra-low speed magnet rotor 820a, the two permanent magnets 824a are arranged from both sides of the circumferential direction such that the N pole sides face each other. Further, across a magnetic body portion 826b of the contra-low speed magnet rotor 820a, the two permanent magnets 824b are arranged from both sides of the circumferential direction such that the S pole sides face each other.

Across a magnetic body portion 826c of the contra-low speed magnet rotor 820b, the two permanent magnets 824c are arranged from both sides of the circumferential direction such that the N pole sides face each other. Further, across a magnetic body portion 826d of the contra-low speed magnet rotor 820b, the two permanent magnets 824d are arranged from both sides of the circumferential direction such that the S pole sides face each other.

Consequently, it is possible to induce magnetic fluxes which pass through the contra-low speed magnet rotors 820a and 820b, to the magnetic body portion 826a, 826c, 826b and 826d. Further, it is possible to forcibly induce magnetic fluxes which are likely to become leakage magnetic fluxes, to the magnetic body portions 826a and 826c by magnetic forces of the permanent magnets 824a and 824b.

As illustrated in FIG. 19, the magnetic body portions 826a and 824b of the contra-low speed magnet rotor 820a and the magnetic body portions 826c and 824d of the contra-low speed magnet rotor 820b are shifted by one pitch from each other.

The inductor rotor 830 includes magnetic teeth 832 which cause magnetic fluxes to pass between the contra-low speed magnet rotors 820a and 820b. A function of the inductor rotor 830 is the same as functions of inductor rotors described in the first to seventh embodiments.

The high speed magnet rotor 810, the contra-low speed magnet rotors 820a and 820b and the inductor rotor 830 are formed using a magnetic body such as a magnetic steel sheet, ferrosilicon, carbon silicon, electromagnetic stainless steel, a powder magnetic core or an amorphous core.

<Operation of Power Transmission Device>

Similar to a power transmission device 750 according to the eighth embodiment, in the power transmission device 850 according to the present embodiment, the number of poles of the high speed magnet rotor 810 is 2a=2, the numbers of poles of the contra-low speed magnet rotors 820a and 820b are 2b=52, the number of magnetic teeth of the inductor rotor 830 is c=27 and coefficient d=1 holds.

Consequently, the power transmission device 850 according to the present embodiment functions in the same way as the power transmission device 750 according to the eighth embodiment.

The power transmission device 850 according to the ninth embodiment uses the contra-low speed magnet rotors 820a and 820b. Consequently, surfaces to which a torque is applied are two top and back surfaces of the contra-low speed magnet rotor 820a and 820b, so that it is possible to produce a greater allowable torque and further miniaturize the power transmission device 850.

[Tenth Embodiment]

A configuration of a power transmission device according to the tenth embodiment includes switching the rotor positioned at the innermost periphery to a rotor positioned at an outermost periphery from the inner periphery side to the outer periphery side in a configuration of a power transmission device according to the ninth embodiment.

Figure 20:
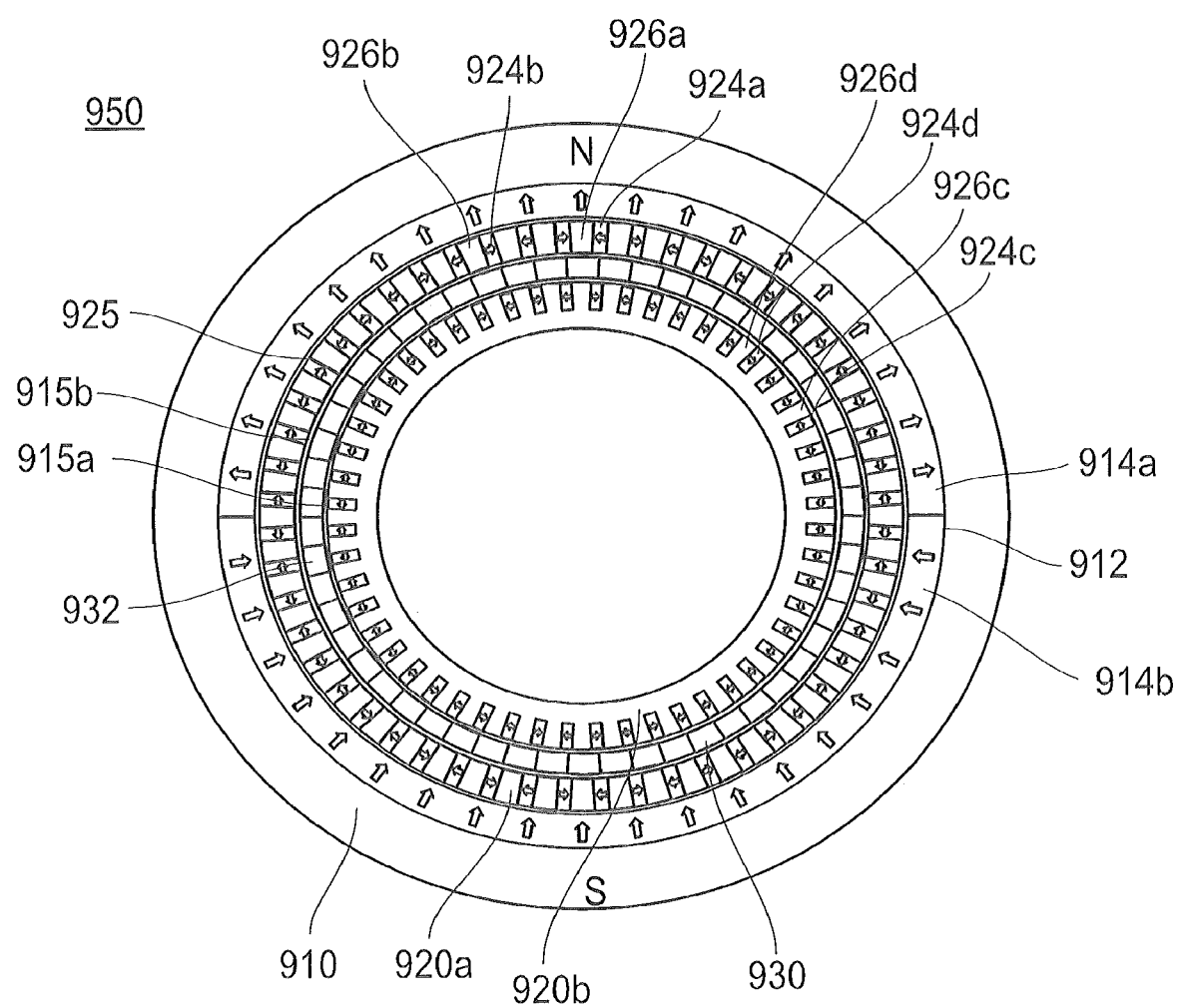
FIG. 20 is a configuration diagram of a power transmission device according to a tenth embodiment.
Figure 21:
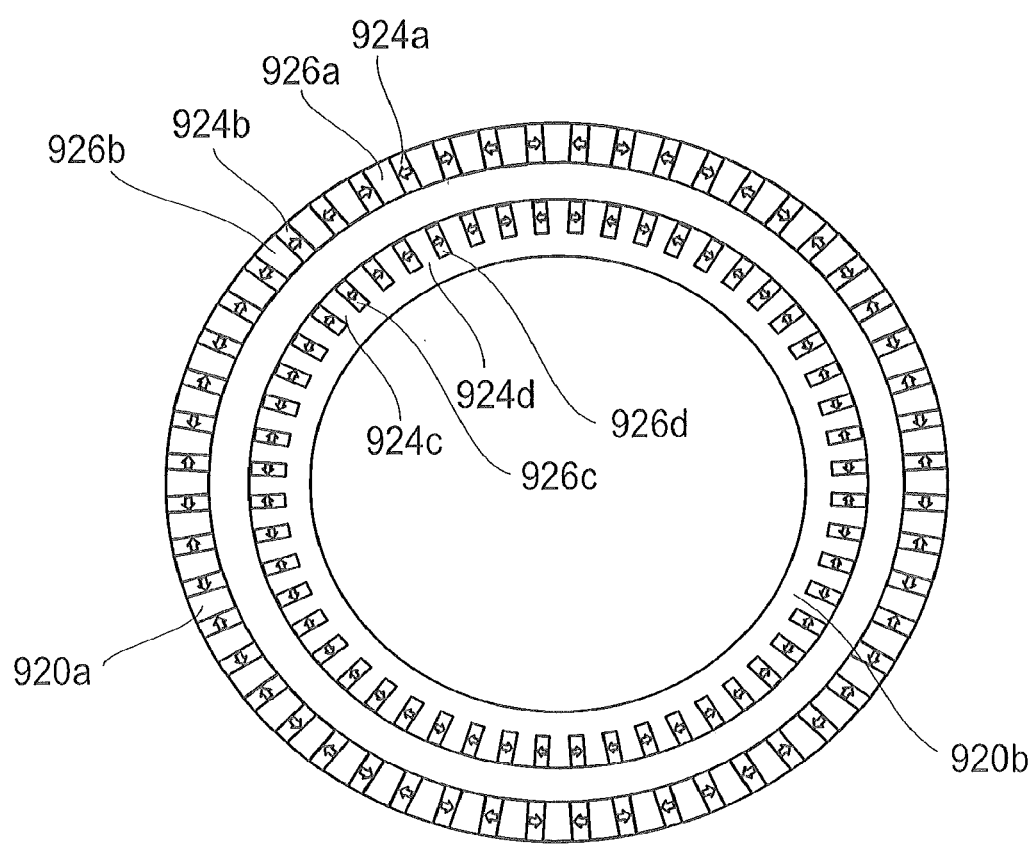
FIG. 21 is a configuration diagram of contra-low speed magnet rotors of the power transmission device in FIG. 20.

A power transmission device according to the tenth embodiment will be described. FIG. 20 is a configuration diagram of the power transmission device according to the tenth embodiment. FIG. 21 is a configuration diagram of contra-low speed magnet rotors of the power transmission device in FIG. 20. Hereinafter, a configuration and an operation of the power transmission device according to the present embodiment will be described.

<Configuration of Power Transmission Device>

A power transmission device 950 includes a high speed magnet rotor 910, contra-low speed magnet rotors 920a and 920b and an inductor rotor 930. The high speed magnet rotor 910, the contra-low speed magnet rotors 920a and 920b and the inductor rotor 930 are concentrically arranged. In the present embodiment, the low speed magnet rotor 920b of the smallest diameter is arranged on an innermost side, and the high speed magnet rotor 910 of the largest diameter is arranged on an outermost side.

The inductor rotor 930 of a larger diameter than that of the contra-low speed magnet rotor 920b and the contra-low speed magnet rotor 920a of a larger diameter than that of the inductor rotor 930 are arranged between the contra-low speed magnet rotor 920b and the high speed magnet rotor 910. The contra-low speed magnet rotor 920b is arranged such that the inductor rotor 930 and a gap 915a are formed, and the contra-low speed magnet rotor 920a is arranged such that the inductor rotor 930 and a gap 915b, and the high speed magnet rotor 910 and a gap 925 are formed. The high speed magnet rotor 910, the contra-low speed magnet rotors 920a and 920b and the inductor rotor 930 are rotatably supported independently. In addition, the contra-low speed magnet rotors 920a and 920b may be a mechanically connected double structure.

A configuration of the high speed magnet rotor 910 and a configuration of the contra-low speed magnet rotor 920b are the same as configurations of a high speed magnet rotor 310 and a low speed magnet rotor 320 of a power transmission device 350 according to the fourth embodiment.

A configuration of the contra-low speed magnet rotor 920a is the same as a configuration of a low speed magnet rotor 720 of a power transmission device 750 according to the eighth embodiment.

Across the magnetic body portion 926a of the contra-low speed magnet rotor 920a, the two permanent magnets 924a are arranged from both sides of the circumferential direction such that the N pole sides face each other. Further, across the magnetic body portion 926b of the contra-low speed magnet rotor 920a, the two permanent magnets 924b are arranged from both sides of the circumferential direction such that the S pole sides face each other.

Across the magnetic body portion 926c of the contra-low speed magnet rotor 920b, the two permanent magnets 924c are arranged from both sides of the circumferential direction such that the N pole sides face each other. Further, across the magnetic body portion 926d of the contra-low speed magnet rotor 920*b*, the two permanent magnets 924*d* are arranged from both sides of the circumferential direction such that the S pole sides face each other.

Consequently, it is possible to induce magnetic fluxes which pass through the contra-low speed magnet rotors 920*a* and 920*b*, to the magnetic body portion 926*a*, 926*c*, 926*b* and 926*d*. Further, it is possible to forcibly induce magnetic fluxes which are likely to become leakage magnetic fluxes, to the magnetic body portions 926*a* and 926*c* by magnetic forces of the permanent magnets 924*a* and 924*b*.

As illustrated in FIG. 21, the magnetic body portions 926*a* and 924*b* of the contra-low speed magnet rotor 920*a* and the magnetic body portions 926*c* and 924*d* of the contra-low speed magnet rotor 920*b* are shifted by one pitch from each other.

The inductor rotor 930 includes magnetic teeth 932 which cause magnetic fluxes to pass between the contra-low speed magnet rotors 920*a* and 920*b*. A function of the inductor rotor 930 is the same as functions of inductor rotors described in the first to seventh embodiments.

The high speed magnet rotor 910, the contra-low speed magnet rotors 920*a* and 920*b* and the inductor rotor 930 are formed using a magnetic body such as a magnetic steel sheet, ferrosilicon, carbon silicon, electromagnetic stainless steel, a powder magnetic core or an amorphous core.

<Operation of Power Transmission Device>

Similar to the power transmission device 750 according to the eighth embodiment, in the power transmission device 950 according to the present embodiment, the number of poles of the high speed magnet rotor 910 is 2a=2, the numbers of poles of the contra-low speed magnet rotors 920*a* and 920*b* are 2b=52, the number of magnetic teeth of the inductor rotor 930 is c=27 and coefficient d=1 holds.

Consequently, the power transmission device 950 according to the present embodiment functions in the same way as the power transmission device 750 according to the eighth embodiment.

The power transmission device 950 according to the tenth embodiment uses the contra-low speed magnet rotors 920*a* and 920*b*. Consequently, surfaces to which a torque is applied are two top and back surfaces of the contra-low speed magnet rotor 920*a* and 920*b*, so that it is possible to produce a greater allowable torque and further miniaturize the power transmission device 950.

Eleventh Embodiment

A configuration of a power transmission device according to the eleventh embodiment includes switching the rotor positioned at the innermost periphery to a rotor positioned at an outermost periphery from the inner periphery side to the outer periphery side in a configuration of a power transmission device according to the eighth embodiment.

Figure 22:
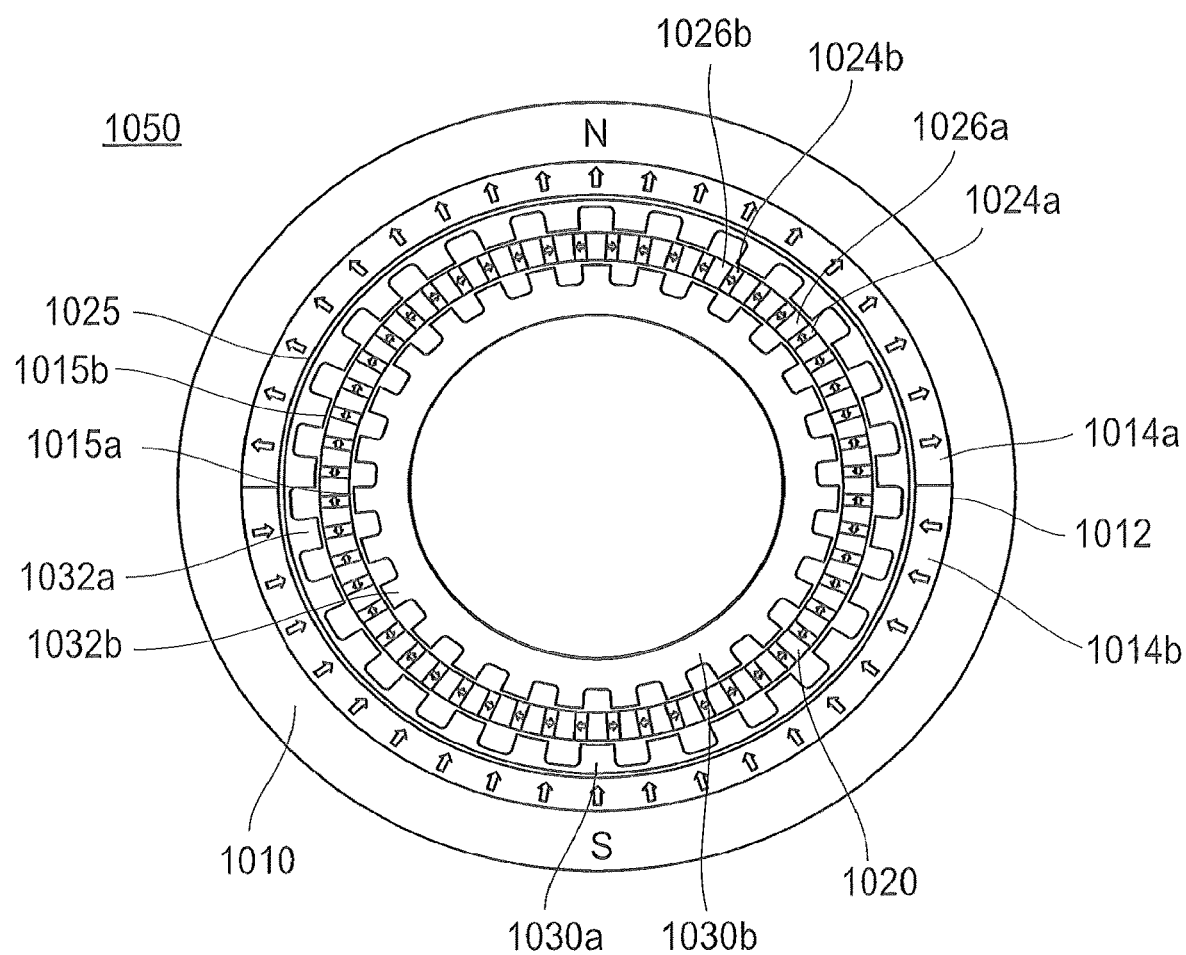
FIG. 22 is a configuration diagram of a power transmission device according to an eleventh embodiment.
Figure 23:
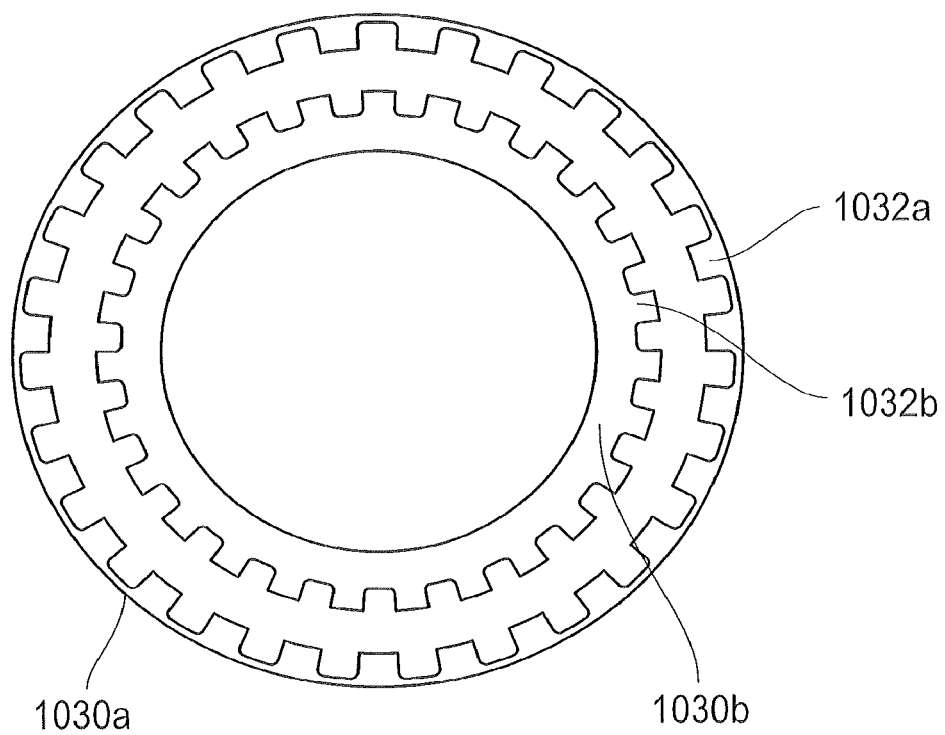
FIG. 23 is a configuration diagram of contra-inductor rotors of the power transmission device in FIG. 22.

The power transmission device according to the eleventh embodiment will be described. FIG. 22 is a configuration diagram of the power transmission device according to the eleventh embodiment. FIG. 23 is a configuration diagram of contra-inductor rotors of the power transmission device in FIG. 22. Hereinafter, a configuration and an operation of the power transmission device according to the present embodiment will be described.

<Configuration of Power Transmission Device>

A power transmission device 1050 includes a high speed magnet rotor 1010, a low speed magnet rotor 1020 and contra-inductor rotor 1030*a* and 1030*b*. The high speed magnet rotor 1010, the low speed magnet rotor 1020 and the contra-inductor rotor 1030*a* and 1030*b* are concentrically arranged. In the present embodiment, the contra-inductor rotor 1030*b* of the smallest diameter is arranged on an innermost side, and the high speed magnet rotor 1010 of the largest diameter is arranged on an outermost side.

The low speed magnet rotor 1020 of a larger diameter than that of the contra-inductor rotor 1030*b* and the contra-inductor rotor 1030*a* of a larger diameter than that of the low speed magnet rotor 1020 are arranged between the contra-inductor rotor 1030*b* and the high speed magnet rotor 1010. The low speed magnet rotor 1020 is arranged such that the contra-inductor rotor 1030*b* and a gap 1015*a* are formed, and the contra-inductor rotor 1030*a* is arranged such that the low speed magnet rotor 1020 and a gap 1015*b*, and the high speed magnet rotor 1010 and a gap 1025 are formed. The high speed magnet rotor 1010, the low speed magnet rotor 1020 and the contra-inductor rotors 1030*a* and 1030*b* are rotatably supported independently. In addition, the contra-inductor rotors 1030*a* and 1030*b* may be a mechanically connected double structure.

A configuration of the high speed magnet rotor 1010 is the same as a configuration of a high speed magnet rotor 210 of a power transmission device 350 according to the fourth embodiment. Configurations of the contra-inductor rotors 1030*a* and 1030*b* are substantially the same as contra-inductor rotor 730*a* and 730*b* of a power transmission device 750 according to the eighth embodiment.

Across a magnetic body portion 1026*a* of the low speed magnet rotor 1020, the two permanent magnets 1024*a* are arranged from both sides of the circumferential direction such that the N pole sides face each other. Further, across a magnetic body portion 1026*b* of the low speed magnet rotor 1020, the two permanent magnets 1024*b* are arranged from both sides of the circumferential direction such that the S pole sides face each other.

Consequently, it is possible to induce magnetic fluxes which pass through the low speed magnet rotors 1020, to the magnetic body portion 1026*a* and 1026*b*. Further, it is possible to forcibly induce magnetic fluxes which are likely to become leakage magnetic fluxes, to the magnetic body portions 1026*a* by magnetic forces of the permanent magnets 1024*a*.

As illustrated in FIG. 23, magnetic teeth 1032*a* of the contra-inductor rotor 1030*a* and the magnetic teeth 1032*b* of the contra-inductor rotor 1032*b* are shifted by half a pitch from each other. Hence, as illustrated in FIG. 23, the magnetic teeth 1032*b* of the contra-inductor rotor 1030*b* are positioned between the magnetic teeth 1032*a* of the contra-inductor rotor 1030*a*.

The high speed magnet rotor 1010, the low speed magnet rotor 1020 and the contra-inductor rotors 1030*a* and 1030*b* are formed using a magnetic body such as a magnetic steel sheet, ferrosilicon, carbon silicon, electromagnetic stainless steel, a powder magnetic core or an amorphous core.

<Operation of Power Transmission Device>

Similar to a power transmission device 750 according to the eighth embodiment, in the power transmission device 1050 according to the present embodiment, the number of poles of the high speed magnet rotor 1010 is 2a=2, the number of poles of the contra-low speed magnet rotors 1020 is 2b=52, the numbers of magnetic teeth of the inductor rotor 1030*a* and 1030*b* are c=27 and coefficient d=1 holds.

Consequently, the power transmission device 1050 according to the present embodiment functions in the same way as the power transmission device 750 according to the eighth embodiment.

The power transmission device 1050 according to the eleventh embodiment uses the contra-inductor rotors 1030*a* and 1030b. Consequently, surfaces to which a torque is applied are two top and back surfaces of the low speed magnet rotor 1020, so that it is possible to produce a greater allowable torque and further miniaturize the power transmission device 1050.

Although power transmission devices of various modes have been described in the above first to eleventh embodiments, high speed magnet rotors having different numbers of poles have only been described, and different configurations of high speed magnet rotors have not been described. Next, four modified examples of high speed magnet rotors will be described.

MODIFIED EXAMPLE OF HIGH SPEED MAGNET ROTOR

Modified Example 1

Figure 24:
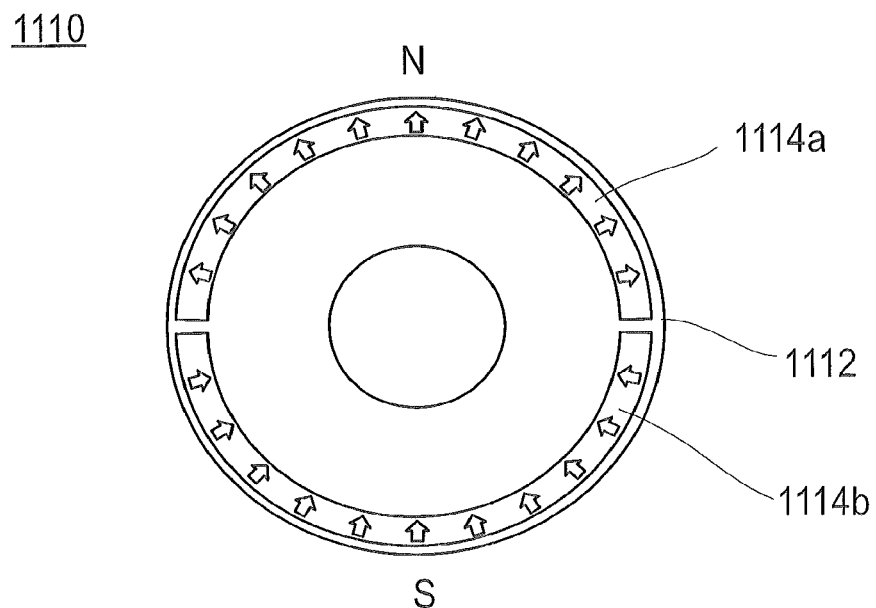
FIG. 24 is a configuration diagram of a high speed magnet rotor according to Modified Example 1.

FIG. 24 is a configuration diagram of a high speed magnet rotor according to Modified Example 1. A high speed magnet rotor 1110 illustrated in FIG. 24 has an internal magnet structure different from that of high speed magnet rotors described in the first to eleventh embodiments.

The high speed magnet rotor 1110 is formed by accommodating two permanent magnets 1114a and 1114b of arc shapes in grooves which are formed in or a rotor 1112 of a columnar shape and which have the same shapes as those of the permanent magnets 1114a and 1114b.

An inner periphery side of the permanent magnet 1114a is magnetized as the S pole and the outer periphery side is magnetized as the N pole, and the inner periphery side of the permanent magnet 1114b is magnetized as the N pole and the outer periphery side is magnetized as the S pole. Hence, the high speed magnet rotor 1110 includes a pair of the N pole on the upper side and the S pole on the lower side in FIG. 24.

This high speed magnet rotor 1110 may be used instead of high speed magnet rotors described in the above embodiments.

Modified Example 2

Figure 25:
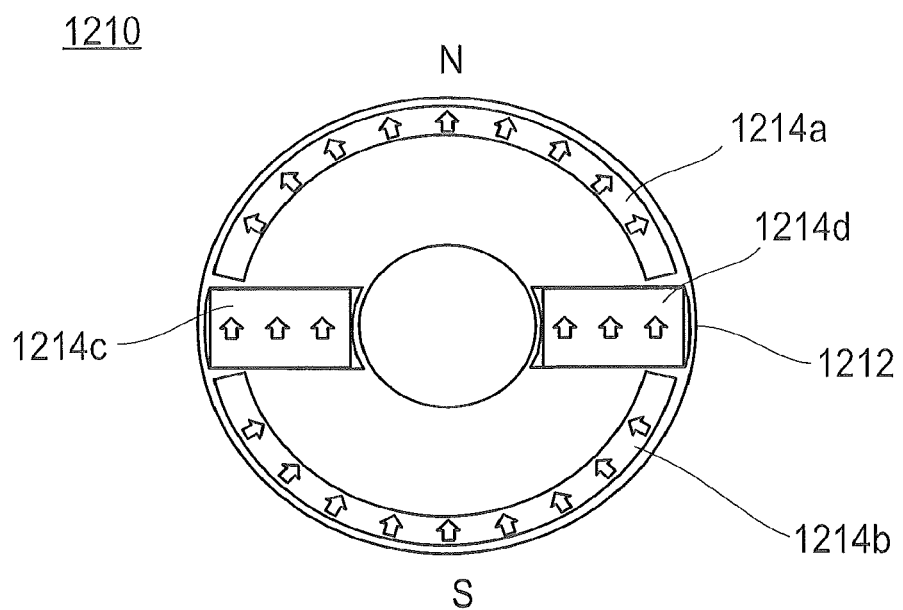
FIG. 25 is a configuration diagram of a high speed magnet rotor according to Modified Example 2.

FIG. 25 is a configuration diagram of a high speed magnet rotor according to Modified Example 2. A high speed magnet rotor 1210 illustrated in FIG. 25 adopts an internal magnet structure similar to Modified Example 1.

A high speed magnet rotor 1210 is formed by accommodating two permanent magnets 1214a and 1214b of arc shapes in grooves which are formed in a high speed magnet rotor 1212 of a columnar shape and which have the same shapes as those of the permanent magnets 1214a and 1214b. Further, the high speed magnet rotor 1210 is formed by accommodating two permanent magnets 1214c and 1214d of quadrangular prism shapes in grooves which are formed in the high speed magnet rotor 1212 and which have the same shapes as those of the permanent magnets 1214c and 1214d.

An inner periphery side of the permanent magnet 1214a is magnetized as the S pole and the outer periphery side is magnetized as the N pole, and the inner periphery side of the permanent magnet 1214b is magnetized as the N pole and the outer periphery si de is magnetized as the S pole. Further, as to the permanent magnets 1214c and 1214d, the same direction side as the N pole side of the permanent magnets 1214a and 1214b is magnetized as the N pole and a side opposite to the same direction side is magnetized as the S pole. Hence, the high speed magnet rotor 1210 includes a pair of the N pole on the upper side and the S pole on the lower side in FIG. 25.

Compared to a high speed magnet rotor 1110 according to Modified Example 1, the high speed magnet rotor 1210 according to Modified Example 2 provides a stronger magnetic force since there are the two permanent magnets 1214c and 1214d of the quadrangular prism shapes. This high speed magnet rotor 1210 may be used instead of high speed magnet rotors described in the above embodiments.

Modified Example 3

Figure 26:
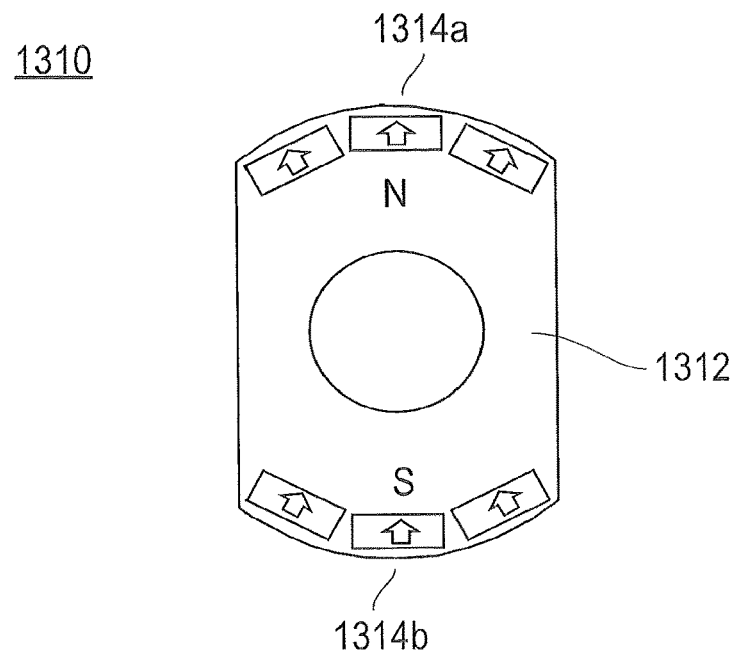
FIG. 26 is a configuration diagram of a high speed magnet rotor according to Modified Example 3.

FIG. 26 is a configuration diagram of a high speed magnet rotor according to Modified Example 3. A high speed magnet rotor 1310 illustrated in FIG. 26 has an internal magnet structure similar to Modified Examples 1 and 2.

The high speed magnet rotor 1310 is formed by forming three permanent magnets 1314a and 1314b of flat shapes in grooves which are formed in a rotor 1312 of a quadrangular prism shape and have the same shapes as those of the permanent magnets 1314a and 1314b. An accommodation surface of the rotor 1312 which accommodates the permanent magnets 1314a and 1314b is formed in an arc shape, so that arrangement angles of the three flat permanent magnets 1314a and 1314b are slightly shifted to match the shape of the accommodation surface.

The respective permanent magnets 1314a and 1314b are accommodated in grooves such that one surface of the permanent magnets 1314a and 1314b are magnetized as the N pole, the other surfaces are magnetized as the S pole and the same magnetization sides are directed to the same direction. Hence, the high speed magnet rotor 1310 includes a pair of the N pole on the upper side and the S pole on the lower side in FIG. 26.

This high speed magnet rotor 1310 may be used instead of high speed magnet rotors described in the above embodiments.

Modified Example 4

Figure 27:
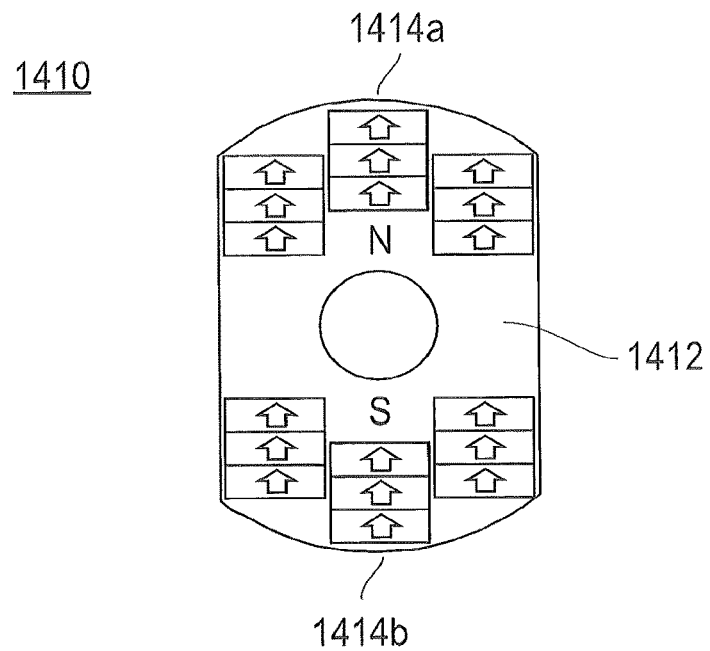
FIG. 27 is a configuration diagram of a high speed magnet rotor according to Modified Example 4.

FIG. 27 is a configuration diagram of a high speed magnet rotor according to Modified Example 4. A high speed magnet rotor 1410 illustrated in FIG. 27 has an internal magnet structure similar to Modified Examples 1 to 3.

The high speed magnet rotor 1410 is formed by accommodating permanent magnets 1414a and 1414b which are formed by combining three combinations whose one combination includes three permanent magnets of flat shapes, in grooves which are formed in a rotor 1412 of a quadrangular prism shape and have the same shapes as those of the permanent magnets 1414a and 1414b similar Lo Modified Example 3.

The respective permanent magnets 1414a and 1414b are accommodated in grooves such that one surface of the permanent magnets 1414a and 1414b are magnetized as the N pole, the other surfaces are magnetized as the S pole and the same magnetization sides are directed to the same direction. Hence, the high speed magnet rotor 1410 includes a pair of the N pole on the upper side and the S pole on the lower side in FIG. 27.

Compared to a high speed magnet rotor 1310 according to Modified Example 3, the high speed magnet rotor 1410 according to Modified Example 4 provides a stronger magnetic force since the number of flat permanent magnets is greater. This high speed magnet rotor 1410 may be used instead of high speed magnet rotors described in the above embodiments.

In the above examples, high speed magnet rotors (the above first, second and fifth to ninth embodiments) of types positioned at the innermost portions of power transmission devices have been described. However, for high speed magnet rotors (the above third, fourth, tenth and eleventh embodiments) of types positioned at an outermost portion of the power transmission device, high speed magnet rotors of various types can be formed under the same idea as those of the modified examples.

APPLICATION EXAMPLE OF POWER TRANSMISSION DEVICE ACCORDING TO PRESENT INVENTION

Next, an application example of a power transmission device which employs the above-described configuration will be briefly described.

Application Example 1

Figure 28:
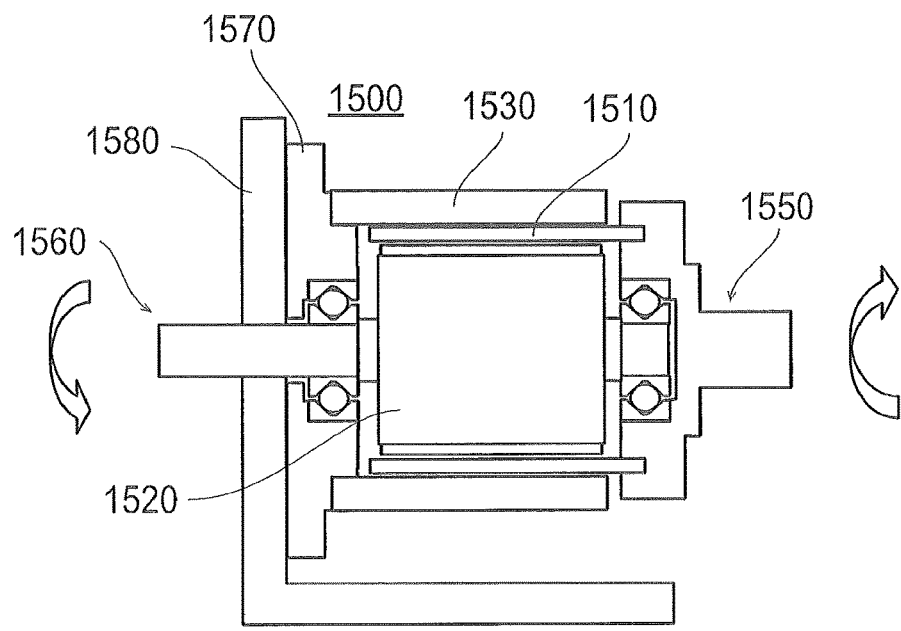
FIG. 28 is a view illustrating Application Example 1 of a power transmission device according to the present invention.

FIG. 28 is a view illustrating Application Example 1 of a power transmission device according to the present invention.

As illustrated in FIG. 28, a power transmission device 1500 (for example, a configuration in the first embodiment) includes a power input unit 1550 to which a power generator such as a motor (not illustrated) is connected, and a power output unit 1560 (not illustrated) which outputs power to a load. In addition, the power input unit 1550 and the power output unit 1560 can be switched and used, and a side to which the power generator is connected is the power input unit and a side to which the load is connected is the power output unit.

An inductor rotor 1530 of the power transmission device 1500 is attached to a bracket 1570, and the bracket 1570 is attached to a base 1580 which holds the power transmission device 1500. Hence, the inductor rotor 1530 of the power transmission device 1500 is a stator.

A high speed magnet rotor 1510 of the power transmission device 1500 is connected to the power input unit 1550. Further, the low speed magnet rotor 1520 of the power transmission device 1500 is connected to the power output unit 1560. Hence, the power input unit 1550 rotates following rotation of the high speed magnet rotor 1510, and the power output unit 1560 rotates following rotation of the low speed magnet rotor 1520. The high speed magnet rotor 1510 and the low speed magnet rotor 1520 are individually supported, and rotation of the power input unit 1550 and rotation of the power output unit 1560 are independent.

When the motor is attached to the power input unit 1550 and the load is connected to the power output unit 1560, rotation of the motor is decelerated at a deceleration ratio and is transmitted to the load. In case of a power transmission device 50 according to the first embodiment, the deceleration ratio is −1/26, and, when a shaft of the motor rotates twenty six times, a shaft of the power output unit 1560 rotates one time in a direction opposite to the rotation direction of the shaft of the power input unit 1550. The power transmission device 1500 according to the present invention is attached to the bracket 1570 and the base 1580 to use.

Application Example 2

Figure 29:
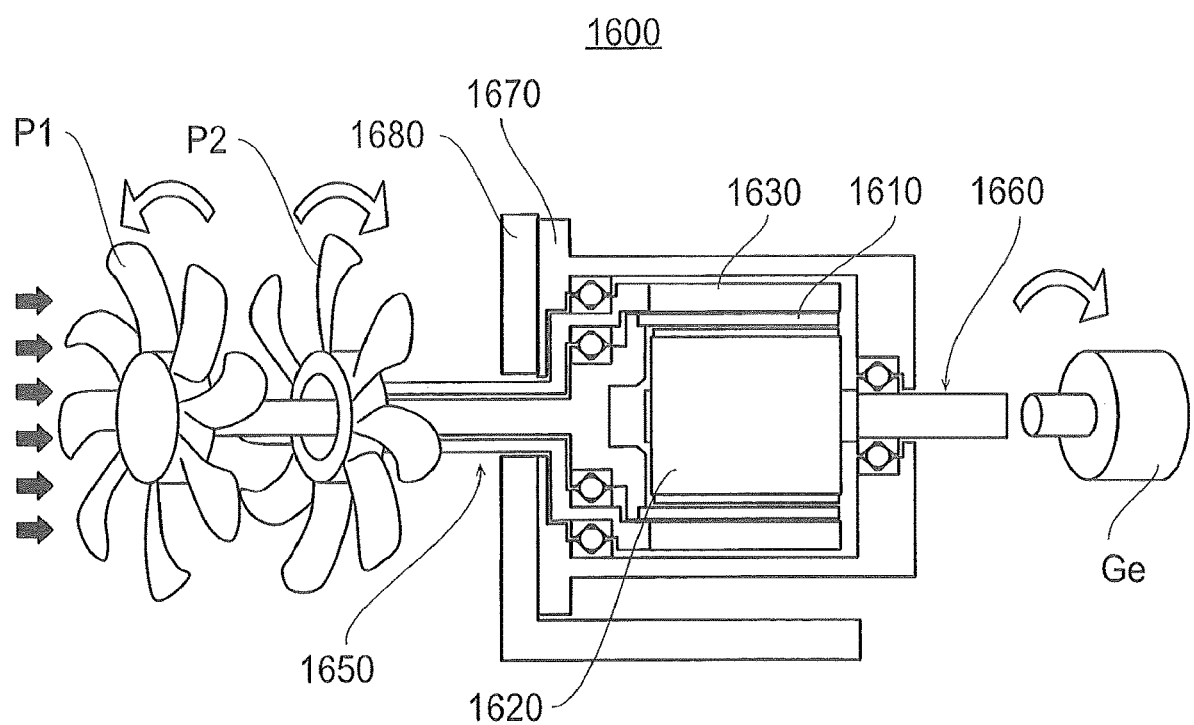
FIG. 29 is a view illustrating Application Example 2 of a power transmission device according to the present invention.

FIG. 29 is a view illustrating Application Example 2 of a power transmission device according to the present invention. Application example 2 is an example where a power transmission device according to the present invention is applied to a wind turbine generator.

As illustrated in FIG. 29, a power transmission device 1600 (for example, a configuration in the first embodiment) has a power input unit 1650 to which contra-rotating propellers P1 and P2 are connected, and a power output unit 1660 which outputs power from the contra-rotating propellers P1 and P2 to a power generator Ge.

An inductor rotor 1630 of the power transmission device 1600 is rotatably attached to a bracket 1670. The bracket 1670 is attached to a base 1680 which holds the power transmission device 1600. The propeller P2 is attached to the inductor rotor 1630 through the power input unit 1650 (a shaft of the propeller P2). Hence, when the propeller P2 rotates, the inductor rotor 1630 rotates.

A high speed magnet rotor 1610 of the power transmission device 1600 is connected to the propeller P1 through the power input unit 1650 (the shaft of the propeller P1). The shaft of the propeller P1 is connected to the high speed magnet rotor 1610 through an inner diameter of the shaft of the propeller P2. Hence, when the propeller P1 rotates, the high speed magnet rotor 1610 rotates.

When wind blows against the contra-rotating propellers P1 and P2 from an arrow direction illustrated in FIG. 29, the propellers rotate in opposite directions. As illustrated in FIG. 29, from a view of the propeller side, the propeller P1 rotates in a left direction and the propeller P2 rotates in a right direction. Hence, when wind blows from the arrow direction illustrated in FIG. 29, the inductor rotor 1630 rotates rightward and the high speed magnet rotor 1610 rotates leftward.

The low speed magnet rotor 1620 of the power transmission device 1600 is connected to a power generator Ge through the power output unit 1660. The inductor rotor 1630, the high speed magnet rotor 1610 and the low speed magnet rotor 1620 are rotatably supported, respectively, and then the power generator Ge rotates at a speed matching rotation speeds of the propellers P1 and P2.

When a power transmission device 50 according to the first embodiment is used as the power transmission device 1600 in the wind turbine generator configured as described above, the power generator Ge rotates such that above (equation 2) $a \cdot \alpha = (a-c \cdot d)\beta + c \cdot d \cdot \gamma$ is satisfied. More specifically, the power transmission device 1600 accelerates rotation speeds of the propellers P1 and P2, and rotates the power generator Ge. That is, the power transmission device 1600 functions as a magnetic accelerating mechanism.

Thus, when the power transmission device according to the present invention is applied to a wind turbine generator, it is possible to accelerate the rotation speeds of the propellers P1 and P2 and rotate the power generator Ge without using a mechanical gear mechanism, and remarkably improve efficiency, durability and maintenance.

Application Example 3

Figure 30:
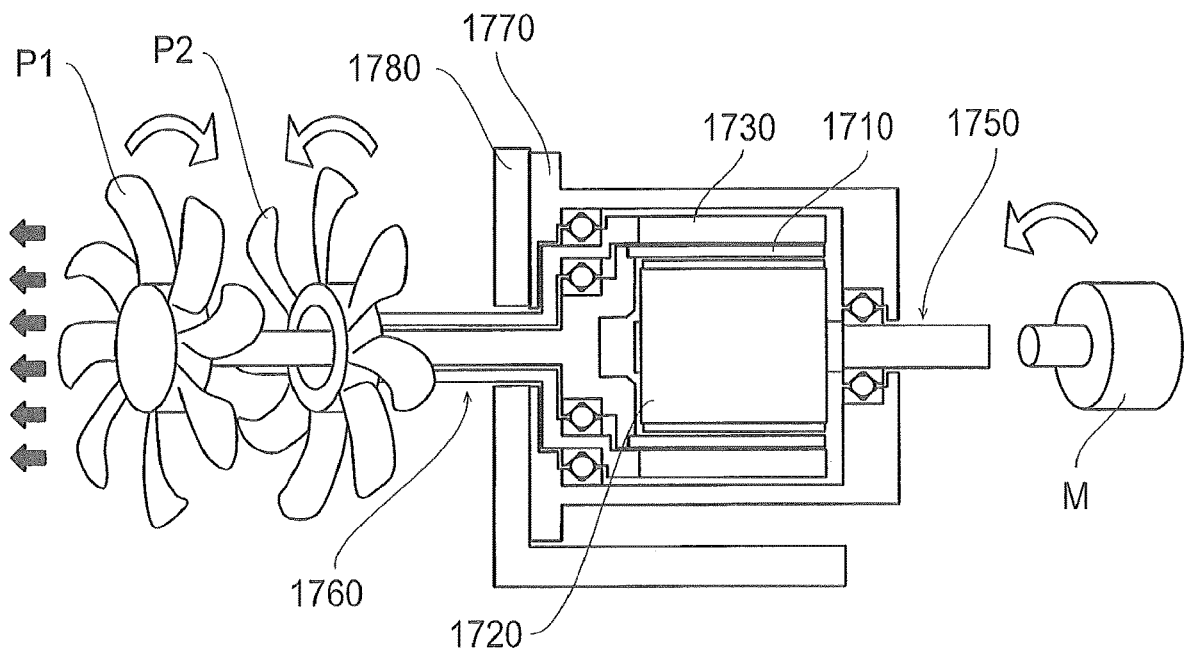
FIG. 30 is a view illustrating Application Example 3 of a power transmission device according to the present invention.

FIG. 30 is a view illustrating Application Example 3 of a power transmission device according to the present invention. Application example 3 is an example where the power transmission device according to the present invention is applied to an air blowing device.

As illustrated in FIG. 30, a power transmission device 1700 (for example, a configuration in the first embodiment) has a power output unit 1760 to which contra-rotating propellers P1 and P2 are connected, and a power input unit 1750 which provides power to the contra-rotating propellers P1 and P2 from a motor M.

An inductor rotor 1730 of the power transmission device 1700 is rotatably attached to a bracket 1770. The bracket 1770 is attached to a base 1780 which holds the power transmission device 1700. The propeller P2 is attached to the inductor rotor 1730 through the power output unit 1760 (a shaft of the propeller P2). Hence, when the inductor rotor 1730 rotates, the propeller P2 rotates.

A high speed magnet rotor 1710 of the power transmission device 1700 is connected to the propeller P1 through the power output unit 1760 (the shaft of the propeller P1). The shaft of the propeller P1 is connected to the high speed magnet rotor 1710 through an inner diameter of the shaft of the propeller P2. Hence, when the inductor rotor 1730 rotates, the propeller P1 rotates.

When the contra-rotating propellers P1 and P2 rotate in the arrow direction illustrated in FIG. 30 (opposite directions of the each propeller), wind is outputted in the arrow direction illustrated in FIG. 30. Hence, from a view of the propeller side, when the inductor rotor 1730 rotates leftward and the high speed magnet rotor 1710 rotates rightward, the propeller P1 rotates in the right direction and the propeller P2 rotates in the right direction.

The low speed magnet rotor 1720 of the power transmission device 1700 is connected to the motor M through the power input unit 1750. The inductor rotor 1730, the high speed magnet rotor 1710 and the low speed magnet rotor 1720 are rotatably supported, respectively, and then the propellers P1 and P2 rotate at a speed matching a rotation speed of the motor M.

When a power transmission device 50 according to the first embodiment is used as the power transmission device 1700 in the wind turbine generator configured as described above, the propellers P1 and P2 rotate such that above (equation 2) a·α=(a−c·d)β+c·d·γ is satisfied. More specifically, the power transmission device 1700 accelerates the rotation speed of the motor M, and rotates the propellers P1 and P2. That is, the power transmission device 1700 functions as a magnetic decelerating mechanism.

Thus, when the power transmission device according to the present invention is applied to an air blower, it is possible to decelerate the rotation speed of the motor and rotate the propellers P1 and P2 at a high torque without using a mechanical gear mechanism, and remarkably improve efficiency, durability and maintenance.

Application Example 4

Figure 31:
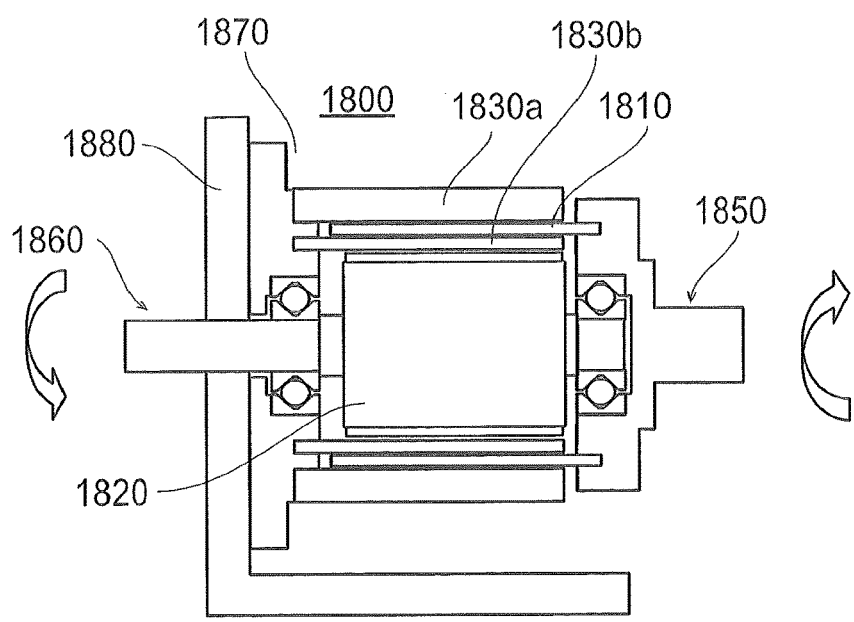
FIG. 31 is a view illustrating Application Example 4 of a power transmission device according to the present invention.

FIG. 31 is a view illustrating Application Example 4 of a power transmission device according to the present invention.

As illustrated in FIG. 31, a power transmission device 1800 (for example, a configuration in the eighth embodiment) includes a power input unit 1850 to which a power generator such as a motor (not illustrated) is connected, and a power output unit 1860 (not illustrated) which outputs power to a load. In addition, the power input unit 1850 and the power output unit 1860 can be switched and used, and a side to which the power generator is connected is the power input unit and a side to which the load is connected is the power output unit.

A contra-inductor rotor 1830a of the power transmission device 1800 is attached to a bracket 1870, and the bracket 1870 is attached to a base 1880 which holds the power transmission device 1800. The contra-inductor rotor 1830a and the contra-inductor rotor 1830b are mechanically connected. Hence, the inductor rotors 1830a and 1830b of the power transmission device 1800 are stators.

A high speed magnet rotor 1810 of the power transmission device 1800 is connected to the power input unit 1850. Further, a low speed magnet rotor 1820 of the power transmission device 1800 is connected to the power output unit 1860. Hence, the power input unit 1850 rotates following rotation of the high speed magnet rotor 1810, and the power output unit 1860 rotates following rotation of the low speed magnet rotor 1820. The high speed magnet rotor 1810 and the low speed magnet rotor 1820 are individually supported, and rotation of the power input unit 1850 and rotation of the power output unit 1860 are independent.

When the motor is attached to the power input unit 1850 and the load is connected to the power output unit 1860, rotation of the motor is decelerated at a predetermined deceleration ratio and is transmitted to the load. In case of a power transmission device 750 according to the eighth embodiment, the deceleration ratio is −1/26, and, when a shaft of the motor rotates twenty six times, a shaft of the power output unit 1860 rotates one time in a direction opposite to the rotation direction of the shaft of the power input unit 1850. The power transmission device 1800 according to the present invention is attached to the bracket 1870 and the base 1880 to use.

Application Example 5

Figure 32:
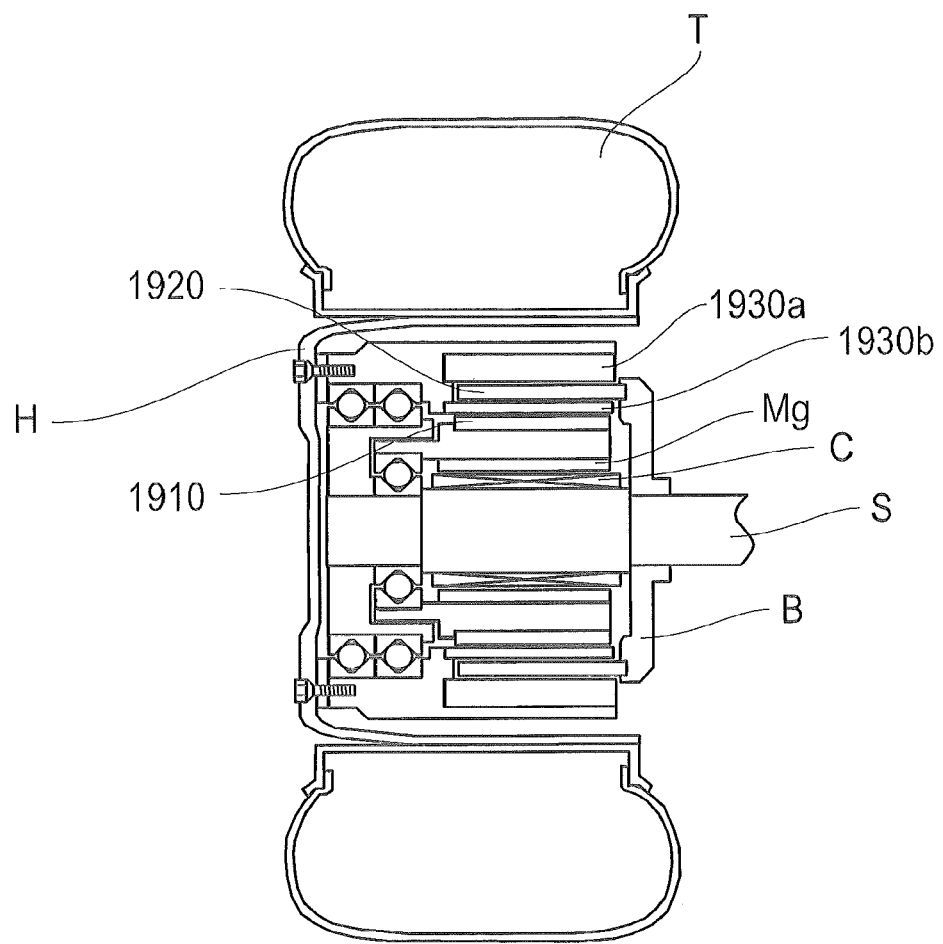
FIG. 32 is a view illustrating Application Example 5 of a power transmission device according to the present invention.

FIG. 32 is a view illustrating Application Example 5 of a power transmission device according to the present invention. Application example 5 is an example where the power transmission device according to the present invention is applied to an in-wheel motor.

Although an in-wheel motor is a direct drive type in many cases, what is illustrated in FIG. 32 is the in-wheel motor configured by applying a power transmission device 750 according to the eighth embodiment. A coil C is formed around a shaft S which applies a torque to a tire T, and along a longitudinal direction of the shaft S. The coil C receives a supply of a current of an optimal magnitude matching an accelerator position. At a position which opposes to the coil C, a high speed magnet rotor 1910 to which a permanent magnet Mg is attached is arranged rotatably with respect to the shaft S.

The tire T is attached to a wheel H which fixes a contra-inductor rotor 1930a. A low speed magnet rotor 1920 is attached to a bracket B which is attached to the shaft S. Hence, the shaft S, the bracket B and the low speed magnet rotor 1920 do not rotate, and the low speed magnet rotor 1920 is a stator. That is, this in-wheel motor includes a structure in which an outer rotor motor is arranged inside the power transmission device 750 according to the eighth embodiment.

In the in-wheel motor employing the above configuration, the tire T rotates as follows.

When the current matching the accelerator position flows in the coil C, an electromagnetic force is produced between the coil C and the permanent magnet Mg to rotate the high speed magnet rotor 1910. When the high speed magnet rotor 1910 rotates, the low speed magnet rotor 1920 does not rotate since the low speed magnet rotor 1920 is attached to the shaft S, and therefore the contra-inductor rotor 1930a and 1930b rotate.

Thus, when the power transmission device according to the present invention is applied to the in-wheel motor, the contra-inductor rotors 1930a and 1930b function to convert an allowable torque into a high torque, so that it is possible to provide an in-wheel motor which is suitable to drive a vehicle and have substantially improved efficiency, durability and maintenance.

Although the preferred embodiments of the present invention have been described above, these embodiments are exemplary embodiments for description of the present invention and by no means limit the scope of the present invention only to the embodiments. The present invention can be implemented in various modes different from the embodiments in a range which does not deviate from the spirit of the present invention.

What is claimed is:

1. A power transmission device comprising:
a high speed magnet rotor which comprises a magnet array which is magnetized in a radial direction;
a low speed magnet rotor which comprises a magnet array which is magnetized in a circumferential direction; and
first and second contra-inductor rotors which allow a magnetic flux of the magnet array of the high speed magnet rotor to pass;
wherein the high speed magnet rotor, the low speed magnet rotor and the first and second contra-inductor rotors are concentrically arranged, and
the magnet array of the low speed magnet rotor is formed such that homopolar surfaces of neighboring magnets face each other in the circumferential direction;
wherein the second contra-inductor rotor is arranged in an innermost periphery portion, the high speed magnet rotor is arranged in an outermost periphery portion, the first contra-inductor rotor is arranged on an inner side of the high speed magnet rotor and the low speed magnet rotor is arranged between the first and second contra-inductor rotors.

2. The power transmission device according to claim 1, wherein the first and second contra-inductor rotors are mechanically connected.

3. The power transmission device according to claim 1, further comprising the first contra-inductor rotor having a plurality of magnetic teeth which project radially inward, and the second contra-inductor rotor having a plurality of magnetic teeth which project radially outward.

4. The power transmission device according to claim 3, wherein the magnetic teeth of the first and second contra-inductor rotors are offset by ½ of a pitch from each other.

5. The power transmission device according to claim 1, wherein
a number of poles of the high speed magnet rotor is 2a (a is a natural number),
a number of poles of the low speed magnet rotor is 2b (b is a natural number higher than a),
a number of poles of the first contra-inductor rotor is c (c=b+d*a where d=±1),
a rotation speed of the high speed magnet rotor is $\alpha$,
a rotation speed of the low speed magnet rotor is $\beta$, and
a rotation speed of the inductor rotor is $\gamma$,
a relationship between the rotation speeds of the rotors satisfies a following equation:

$$a \cdot \alpha = (a - c \cdot d) \cdot \beta + c \cdot d \cdot \gamma.$$

6. A power transmission device comprising:
a high speed magnet rotor which comprises a magnet array which is magnetized in a radial direction;
a low speed magnet rotor which comprises a magnet array which is magnetized in a circumferential direction; and
first and second contra-inductor rotors which allow a magnetic flux of the magnet array of the high speed magnet rotor to pass;
wherein the high speed magnet rotor, the low speed magnet rotor and the first and second contra-inductor rotors are concentrically arranged, and
the magnet array of the low speed magnet rotor is formed such that homopolar surfaces of neighboring magnets face each other in the circumferential direction;
wherein the first contra-inductor rotor is arranged in an outermost periphery portion, the high speed magnet rotor is arranged in an innermost periphery portion, the second contra-inductor rotor is arranged on an outer side of the high speed magnet rotor and the low speed magnet rotor is arranged between the first and second contra-inductor rotors.

7. The power transmission device according to claim 6, wherein
a number of poles of the high speed magnet rotor is 2a (a is a natural number),
a number of poles of the low speed magnet rotor is 2b (b is a natural number higher than a),
a number of poles of the first contra-inductor rotor is c (c=b+d*a where d=±1),
a rotation speed of the high speed magnet rotor is $\alpha$,
a rotation speed of the low speed magnet rotor is $\beta$, and
a rotation speed of the inductor rotor is $\gamma$,
a relationship between the rotation speeds of the rotors satisfies a following equation:

$$a \cdot \alpha = (a - c \cdot d) \cdot \beta + c \cdot d \cdot \gamma.$$

8. The power transmission device according to claim 6, wherein the second contra-inductor rotor passes magnetic flux from (a) the magnets array of the high speed magnet rotor to magnetic body portions of the low speed magnet rotor, and (b) the low speed magnet rotor to the magnet array of the high speed magnet rotor.

9. The power transmission device according to claim 6 further comprising, the first contra-inductor rotor having a plurality of magnetic teeth which project radially inward, and the second contra-inductor rotor having a plurality of magnetic teeth which project radially outward.

10. The power transmission device according to claim 9, wherein the magnetic teeth of the first and second contra-inductor rotors are offset by ½ of a pitch from each other.

* * * * *